United States Patent
Kakutani

(10) Patent No.: US 8,023,154 B2
(45) Date of Patent: Sep. 20, 2011

(54) IMAGE OUTPUT SYSTEM FOR OUTPUTTING IMAGE BASED ON INFORMATION OF NUMBER OF DOTS TO BE FORMED IN PREDETERMINED AREA

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/925,234

(22) Filed: Oct. 15, 2010

(65) Prior Publication Data

US 2011/0032574 A1 Feb. 10, 2011

Related U.S. Application Data

(62) Division of application No. 10/589,069, filed on Aug. 10, 2006, now Pat. No. 7,830,553.

(30) Foreign Application Priority Data

| Feb. 10, 2004 | (JP) | ................................ 2004-033487 |
| Feb. 20, 2004 | (JP) | ................................ 2004-044649 |
| Mar. 22, 2004 | (JP) | ................................ 2004-082709 |

(51) Int. Cl.
*H04N 1/405* (2006.01)
(52) U.S. Cl. ....................................... 358/3.14; 358/3.16
(58) Field of Classification Search .................... 358/1.9, 358/2.1, 3.01, 3.06–3.09, 3.13–3.14, 3.16–3.18, 358/3.2, 3.24, 1.18
See application file for complete search history.

(56) References Cited

U.S. PATENT DOCUMENTS 4,667,251 A 5/1987 Hasegawa
(Continued)

FOREIGN PATENT DOCUMENTS

EP 0 683 599 11/1995
(Continued)

OTHER PUBLICATIONS

Abstract of Japanese Patent Publication No. 62-176371, Pub. Date: Aug. 3, 1987, esp@cenet database.
(Continued)

*Primary Examiner* — Tommy D Lee
*Assistant Examiner* — Stephen M Brinich
(74) *Attorney, Agent, or Firm* — Martine Penilla & Gencarella, LLP

(57) ABSTRACT

The image output system of the invention collects a preset number of adjacent pixels to one pixel group to divide a number of pixels constituting an image into multiple pixel groups and specifies a pixel group tone value as a representative tone value of each pixel group. The image output system refers to a conversion table to generate dot number data of each pixel group. The conversion table stores dot number data, which represents number of dots to be created in one pixel group, in relation to a combination of a pixel group classification number allocated to each pixel group and the specified pixel group tone value of the pixel group. The image output system then refers to a priority order of pixels representing potentials of dot creation in respective pixels of one pixel group, determines the positions of dot-on pixels in each pixel group according to the generated dot number data of the pixel group, and actually creates dots according to the determined positions of the dot-on pixels. The dot number data does not include information on the positions of the dot-on pixels and has a small data volume, thus enabling high-speed data transfer. The dot number data is readily obtained by simply referring to the conversion table. This leads to high-speed output of high-quality image data. The technique of the invention thus enables easy and high-speed output of a high-quality image.

12 Claims, 52 Drawing Sheets

U.S. PATENT DOCUMENTS

| | | | |
|---|---|---|---|
| 4,760,460 | A | 7/1988 | Shimotohno |
| 5,359,430 | A | 10/1994 | Zhang |
| 5,463,703 | A | 10/1995 | Lin |
| 6,154,568 | A | 11/2000 | Chen et al. |

FOREIGN PATENT DOCUMENTS

| | | |
|---|---|---|
| EP | 0 902 398 | 3/1999 |
| JP | 62-176371 | 8/1987 |
| JP | 08-065511 | 3/1996 |
| JP | 08-116440 | 5/1996 |
| JP | 08-307720 | 11/1996 |
| JP | 10-262151 | 9/1998 |
| JP | 2000-332995 | 11/2000 |
| JP | 2002-185789 | 6/2002 |
| JP | 2002-271623 | 9/2002 |

OTHER PUBLICATIONS

Abstract of Japanese Patent Publication No. 08-065511, Pub. Date: Mar. 8, 1996, Patent Abstracts of Japan.

Abstract of Japanese Patent Publication No. 08-116440, Pub. Date: May 7, 1996, Patent Abstracts of Japan.

Abstract of Japanese Patent Publication No. 08-307720, Pub. Date: Nov. 22, 1996, Patent Abstracts of Japan.

Abstract of Japanese Patent Publication No. 10-262151, Pub. Date: Sep. 29, 1998, Patent Abstracts of Japan.

Abstract of Japanese Patent Publication No. 2000-332995 Pub. Date: Nov. 30, 2000, Patent Abstracts of Japan.

Abstract of Japanese Patent Publication No. 2002-185789, Pub. Date: Jun. 28, 2002, Patent Abstracts of Japan.

Abstract of Japanese Patent Publication No. 2002-271623 Pub. Date: Sep. 20, 2002, Patent Abstracts of Japan.

MAIN SCANNING
DIRECTION

SUB-SCANNING
DIRECTION

Fig.8a

| 97 | 97 | 98 | 98 | 98 | 98 | 98 | 98 |
|----|----|----|----|----|----|----|----|
| 97 | 97 | 97 | 97 | 97 | 97 | 98 | 98 |
| 97 | 97 | 97 | 97 | 97 | 97 | 97 | 97 |
| 96 | 96 | 97 | 97 | 97 | 97 | 97 | 97 |

Fig.8b

| 1   | 177 | 58  | 170 | 70  | 186 | 79  | 161 |
|-----|-----|-----|-----|-----|-----|-----|-----|
| 255 | 109 | 212 | 42  | 242 | 5   | 223 | 48  |
| 123 | 33  | 127 | 181 | 83  | 155 | 105 | 140 |
| 219 | 91  | 237 | 22  | 121 | 198 | 61  | 188 |

| 3 | 4 |
|---|---|
| 3 | 2 |

Fig.9a
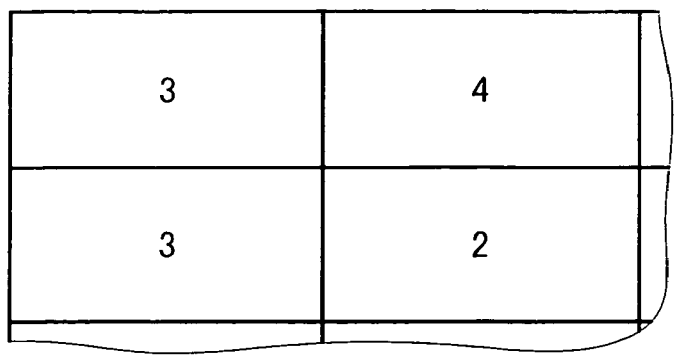
Fig.9b
| 1 | 177 | 58 | 170 | 70 | 186 | 79 | 161 |
|---|---|---|---|---|---|---|---|
| 255 | 109 | 212 | 42 | 242 | 5 | 223 | 48 |
| 123 | 33 | 127 | 181 | 83 | 155 | 105 | 140 |
| 219 | 91 | 237 | 22 | 121 | 198 | 61 | 188 |
Fig.9c
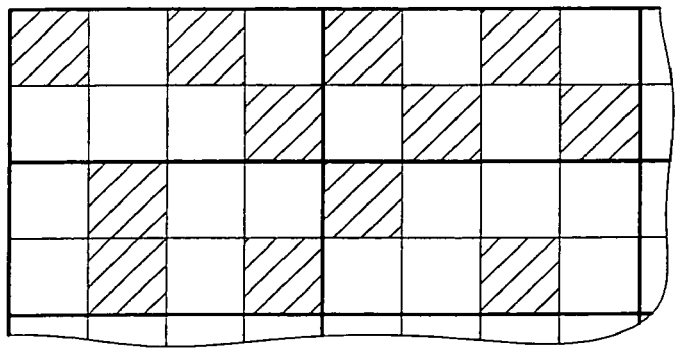
Fig.9d
| 1 | 6 | 3 | 5 | 3 | 6 | 4 | 5 |
|---|---|---|---|---|---|---|---|
| 8 | 4 | 7 | 2 | 8 | 1 | 7 | 2 |
| 4 | 2 | 5 | 6 | 2 | 6 | 3 | 5 |
| 7 | 3 | 8 | 1 | 4 | 8 | 1 | 7 |

Fig.12a
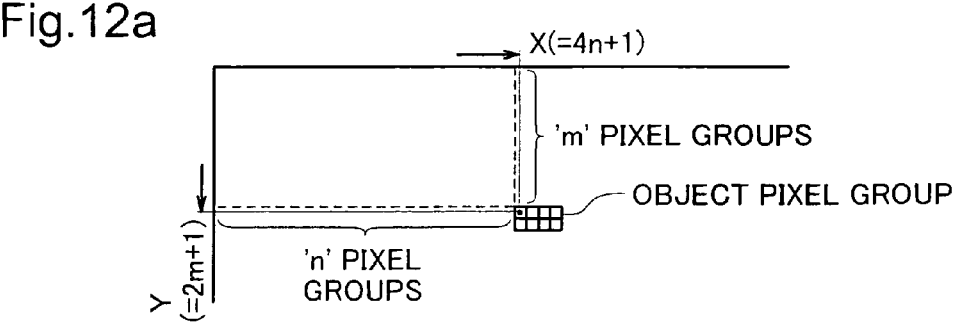
Fig.12b
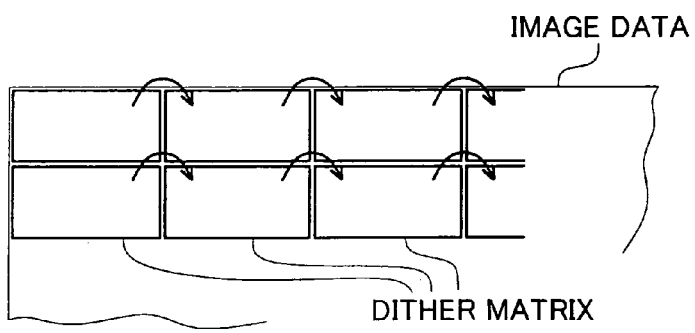
Fig.12c
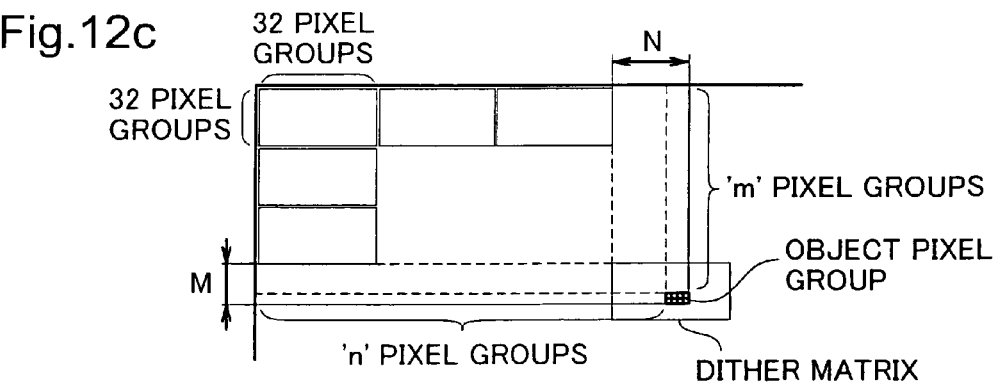
Fig.12d
$$\begin{cases} N = n - \text{int}(n/32) \times 32 + 1 \\ M = m - \text{int}(m/32) \times 32 + 1 \end{cases}$$

Fig.13

(a) X : |1|2|3|4|5|6|7|8|9|10|
  ⟩ RIGHTWARD SHIFT BY 2 BITS
(b) n : |0|0|1|2|3|4|5|6|7|8|
  ⟩ RIGHTWARD SHIFT BY 5 BITS
(c) int (n/32) : |0|0|0|0|0|0|0|1|2|3|
  ⟩ LEFTWARD SHIFT BY 5 BITS
(d) int (n/32) × 32 : |0|0|1|2|3|0|0|0|0|0|

(e) n − int (n/32) × 32 : |0|0|0|0|0|4|5|6|7|8|

(f) MASK DATA : |0|0|0|0|0|1|1|1|1|1|

(g) MASK DATA : |0|0|0|1|1|1|1|1|0|0|

| SIZE OF DITHER MATRIX (PIXELS) | | SIZE OF PIXEL GROUP (PIXELS) | | BLOCK NUMBER | DATA VOLUME OF CONVERSION TABLE (BYTES) | NUMBER OF STATES / PIXEL GROUP | NUMBER OF USED BITS |
|---|---|---|---|---|---|---|---|
| MAIN SCANNING DIRECTION | SUB-SCANNING DIRECTION | MAIN SCANNING DIRECTION | SUB-SCANNING DIRECTION | | | | |
| 64 | 64 | 2 | 2 | 1024 | 256K | 5 | 3 |
| | | 4 | 2 | 512 | 128K | 9 | 4 |
| | | 4 | 4 | 256 | 64K | 17 | 5 |
| 128 | 64 | 2 | 2 | 2048 | 512K | 5 | 3 |
| | | 4 | 2 | 1024 | 256K | 9 | 4 |
| | | 4 | 4 | 512 | 128K | 17 | 5 |
| 128 | 128 | 2 | 2 | 4096 | 1024K | 5 | 3 |
| | | 4 | 2 | 2048 | 512K | 9 | 4 |
| | | 4 | 4 | 1024 | 256K | 17 | 5 |

Fig.19a

| 97 | 98 | 98 | 98 |
|---|---|---|---|
| 97 | 97 | 97 | 98 |
| 96 | 97 | 97 | 97 |

Fig.19b

| 97 | 98 | 98 |
|---|---|---|
| 97 | 97 | 98 |
| 96 | 97 | 97 |

Fig.19c

| 97 | 97 | 97 | 97 | 98 | 98 | 98 | 98 | 98 | 98 | 98 | 98 |
|---|---|---|---|---|---|---|---|---|---|---|---|
| 97 | 97 | 97 | 97 | 98 | 98 | 98 | 98 | 98 | 98 | 98 | 98 |
| 97 | 97 | 97 | 97 | 97 | 97 | 97 | 97 | 98 | 98 | 98 | 98 |
| 97 | 97 | 97 | 97 | 97 | 97 | 97 | 97 | 98 | 98 | 98 | 98 |
| 96 | 96 | 96 | 96 | 97 | 97 | 97 | 97 | 97 | 97 | 97 | 97 |
| 96 | 96 | 96 | 96 | 97 | 97 | 97 | 97 | 97 | 97 | 97 | 97 |

Fig.25

| (LARGE, MEDIUM, SMALL) = (1,2,1) | (0,4,0) | (0,3,1) |
|---|---|---|
| (0,3,0) | (0,2,1) | (1,1,0) |
| (0,2,3) | (1,2,1) | (0,3,0) |

Fig.26

| NUMBERS OF DOTS | | | ENCODED DOT NUMBER DATA |
|---|---|---|---|
| LARGE-SIZE DOT | MEDIUM-SIZE DOT | SMALL-SIZE DOT | |
| 0 | 0 | 0 | 0 |
| 0 | 0 | 1 | 1 |
| 0 | 0 | 2 | 2 |
| 0 | 0 | 3 | 3 |
| 6 | 2 | 0 | 160 |
| 7 | 0 | 0 | 161 |
| 7 | 0 | 1 | 162 |
| 7 | 1 | 0 | 163 |
| 8 | 0 | 0 | 164 |

Fig.28

| | PIXEL GROUP TONE VALUE | | | | | | | 253 | 254 | 255 |
|---|---|---|---|---|---|---|---|---|---|---|
| | 0 | 1 | 2 | 3 | 4 | 5 | ..... | | | |
| 1 | 0 | 1 | 1 | 2 | 2 | 2 | | 163 | 163 | 164 |
| 2 | 0 | 0 | 0 | 0 | 1 | 1 | | 163 | 164 | 164 |
| 3 | 0 | 0 | 1 | 1 | 1 | | | 163 | 164 | 164 |
| 4 | 0 | 0 | 1 | 1 | | | | | 163 | 164 |
| 5 | 0 | 0 | 0 | 1 | | | | | 164 | 164 |
| 6 | 0 | 1 | 1 | | | | | | 163 | 164 |
| 7 | 0 | 0 | | | | | | | | |
| 8 | 0 | | | | | | | | | |
| 9 | 0 | | | | | | | | | |
| 10 | | | | | | | | | | |

PIXEL GROUP CLASSIFICATION NUMBER

| ENCODED DOT NUMBER DATA | NUMBERS OF DOTS | | |
|---|---|---|---|
| | LARGE-SIZE DOT | MEDIUM-SIZE DOT | SMALL-SIZE DOT |
| 0 | 0 | 0 | 0 |
| 1 | 0 | 0 | 1 |
| 2 | 0 | 0 | 2 |
| 3 | 0 | 0 | 3 |
| 160 | 6 | 2 | 0 |
| 161 | 7 | 0 | 0 |
| 162 | 7 | 0 | 1 |
| 163 | 7 | 1 | 0 |
| 164 | 8 | 0 | 0 |

Fig.32

| ENCODED DOT NUMBER DATA | NUMBERS OF DOTS | | |
|---|---|---|---|
| | LARGE-SIZE DOT | LARGE-SIZE DOT + MEDIUM-SIZE DOT | LARGE-SIZE DOT + MEDIUM-SIZE DOT + SMALL-SIZE DOT |
| 0 | 0 | 0 | 0 |
| 1 | 0 | 0 | 1 |
| 2 | 0 | 0 | 2 |
| 3 | 0 | 0 | 3 |
| 160 | 6 | 8 | 8 |
| 161 | 7 | 7 | 7 |
| 162 | 7 | 7 | 8 |
| 163 | 7 | 8 | 8 |
| 164 | 8 | 8 | 8 |

Fig.33

| SIZE OF DITHER MATRIX | | SIZE OF PIXEL GROUP (PIXELS) | | BLOCK NUMBER | DATA VOLUME OF CONVERSION TABLE (BYTES) | NUMBER OF STATES / PIXEL GROUP | NUMBER OF USED BITS | DATA COMPRESSION RATE |
|---|---|---|---|---|---|---|---|---|
| MAIN SCANNING DIRECTION | SUB- SCANNING DIRECTION | MAIN SCANNING DIRECTION | SUB- SCANNING DIRECTION | | | | | |
| 64 | 64 | 2 | 2 | 1024 | 256K | 35 | 6 | 0.75 |
| | | 4 | 2 | 512 | 128K | 165 | 8 | 0.5 |
| | | 4 | 4 | 256 | 128K | 969 | 10 | 0.31 |
| 128 | 64 | 2 | 2 | 2048 | 512K | 35 | 6 | 0.75 |
| | | 4 | 2 | 1024 | 256K | 165 | 8 | 0.5 |
| | | 4 | 4 | 512 | 256K | 969 | 10 | 0.31 |
| 128 | 128 | 2 | 2 | 4096 | 1024K | 35 | 6 | 0.75 |
| | | 4 | 2 | 2048 | 512K | 165 | 8 | 0.5 |
| | | 4 | 4 | 1024 | 512K | 969 | 10 | 0.31 |

Fig.38a
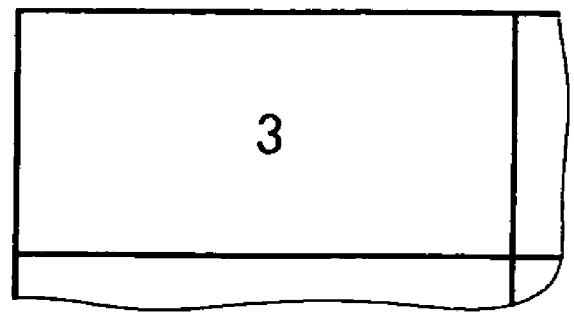
Fig.38b
| 1 | 6 | 3 | 5 |
|---|---|---|---|
| 8 | 4 | 7 | 2 |
Fig.38c
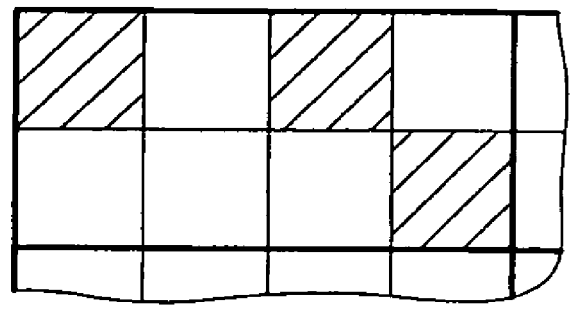

Fig.39

| | | DOT NUMBER DATA | | | | | | | | |
|---|---|---|---|---|---|---|---|---|---|---|
| | | 0 | 1 | 2 | 3 | 4 | 5 | 6 | 7 | 8 |
| ORDINAL NUMBER | 1 | 0 | 1 | 1 | 1 | 1 | 1 | 1 | 1 | 1 |
| | 2 | 0 | 0 | 1 | 1 | 1 | 1 | 1 | 1 | 1 |
| | 3 | 0 | 0 | 0 | 1 | 1 | 1 | 1 | 1 | 1 |
| | 4 | 0 | 0 | 0 | 0 | 1 | 1 | 1 | 1 | 1 |
| | 5 | 0 | 0 | 0 | 0 | 0 | 1 | 1 | 1 | 1 |
| | 6 | 0 | 0 | 0 | 0 | 0 | 0 | 1 | 1 | 1 |
| | 7 | 0 | 0 | 0 | 0 | 0 | 0 | 0 | 1 | 1 |
| | 8 | 0 | 0 | 0 | 0 | 0 | 0 | 0 | 0 | 1 |

Fig.42a
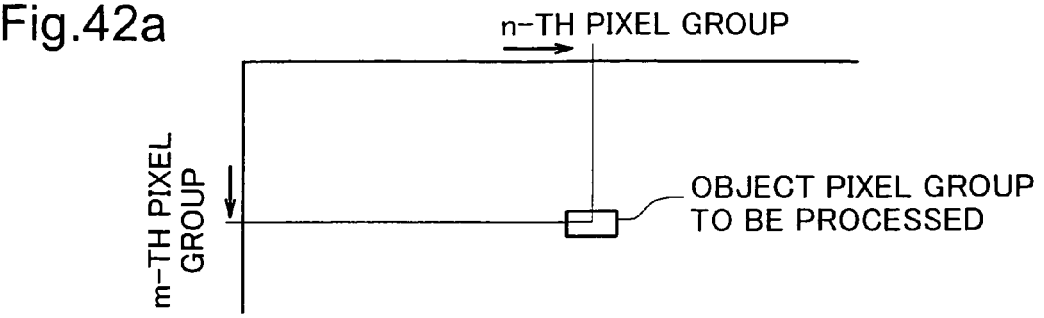
Fig.42b
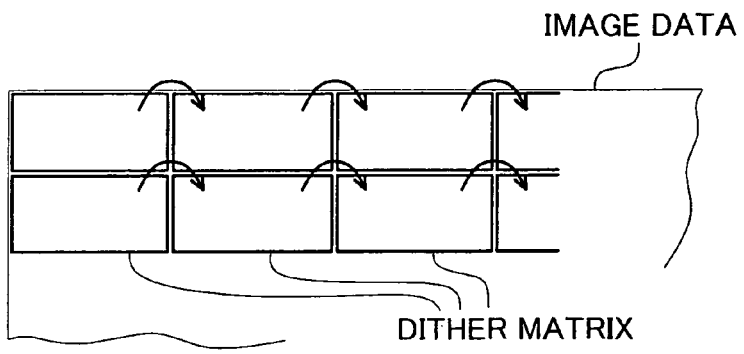
Fig.42c
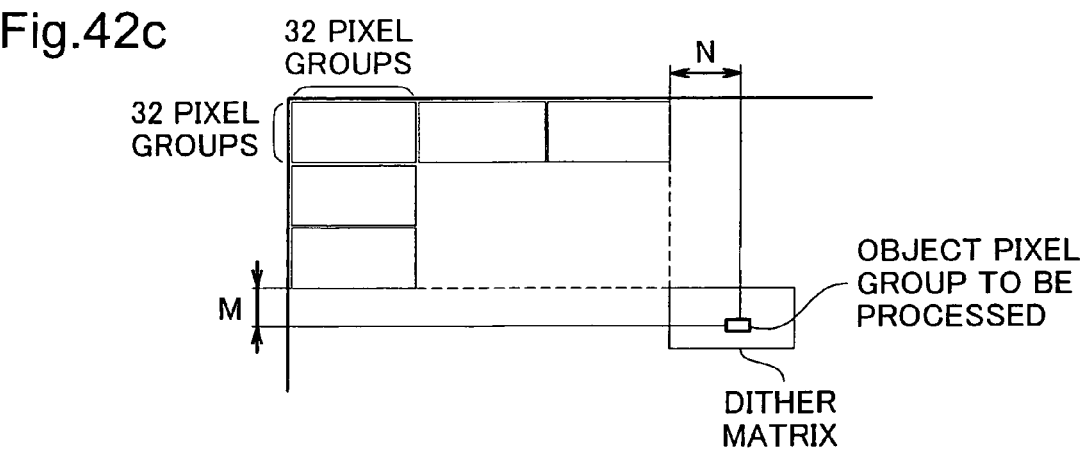
Fig.42d
$$\begin{cases} N = n - \text{int}(n/32) \times 32 \\ M = m - \text{int}(m/32) \times 32 \end{cases}$$

Fig.43

(a)  n       : |1|2|3|4|5|6|7|8|9|10|
                                    ⎞ RIGHTWARD
                                    ⎠ SHIFT BY 5 BITS
(b)  int (n/32) : |0|0|0|0|0|1|2|3|4|5|
                                    ⎞ LEFTWARD
                                    ⎠ SHIFT BY 5 BITS
(c)  int (n/32) × 32: |1|2|3|4|5|0|0|0|0|0|

(d)  n − int (n/32) × 32: |0|0|0|0|0|6|7|8|9|10|

(e)  MASK DATA : |0|0|0|0|0|1|1|1|1|1|

Fig.44

| SIZE OF DITHER MATRIX (PIXELS) | | SIZE OF PIXEL GROUP (PIXELS) | | NUMBER OF DIFFERENT ORDINAL NUMBER MATRIXES | DATA SIZE OF EACH ORDINAL NUMBER MATRIX (BYTES) | REQUIRED MEMORY CAPACITY (KILOBYTES) |
|---|---|---|---|---|---|---|
| MAIN SCANNING DIRECTION | SUB-SCANNING DIRECTION | MAIN SCANNING DIRECTION | SUB-SCANNING DIRECTION | | | |
| 64 | 64 | 2 | 2 | 1024 | 1 | 1 |
| | | 4 | 2 | 512 | 3 | 1.5 |
| | | 4 | 4 | 256 | 8 | 2 |
| 128 | 64 | 2 | 2 | 2048 | 1 | 2 |
| | | 4 | 2 | 1024 | 3 | 3 |
| | | 4 | 4 | 512 | 8 | 4 |
| 128 | 128 | 2 | 2 | 4096 | 1 | 4 |
| | | 4 | 2 | 2048 | 3 | 6 |
| | | 4 | 4 | 1024 | 8 | 8 |

Fig.47

| | | DOT NUMBER DATA | | | | | | | | 162 | 163 | 164 |
|---|---|---|---|---|---|---|---|---|---|---|---|---|
| | | 0 | 1 | 2 | 3 | 4 | 5 | 6 | 7 | | | |
| ORDINAL NUMBER | 1 | 0 | 1 | 1 | 1 | 1 | 1 | 1 | | 3 | 3 | 3 |
| | 2 | 0 | 0 | 1 | 1 | 1 | 1 | 1 | | | 3 | 3 |
| | 3 | 0 | 0 | 0 | 1 | 1 | 1 | | | | 3 | 3 |
| | 4 | 0 | 0 | 0 | 0 | 1 | 1 | | | | | 3 |
| | 5 | 0 | 0 | 0 | 0 | 0 | | | | | | |
| | 6 | 0 | 0 | 0 | 0 | 0 | | | | | | |
| | 7 | 0 | 0 | 0 | 0 | 0 | | | | | | |
| | 8 | 0 | 0 | 0 | 0 | | | | | | | |

Fig.48

| SIZE OF PIXEL GROUP (PIXELS) | | NUMBER OF DIFFERENT ORDINAL NUMBERS | NUMBER OF ENCODED DOT NUMBER DATA | REQUIRED MEMORY CAPACITY FOR CONVERSION TABLE (KILOBYTES) |
|---|---|---|---|---|
| MAIN SCANNING DIRECTION | SUB-SCANNING DIRECTION | | | |
| 2 | 2 | 4 | 35 | 0.034 |
| 4 | 2 | 8 | 165 | 0.322 |
| 4 | 4 | 16 | 969 | 3.785 |

IMAGE OUTPUT SYSTEM FOR OUTPUTTING IMAGE BASED ON INFORMATION OF NUMBER OF DOTS TO BE FORMED IN PREDETERMINED AREA

CROSS-REFERENCE TO RELATED APPLICATION

This application is a divisional of U.S. patent application Ser. No. 10/589,069, filed on Aug. 10, 2006, now U.S. Pat. No. 7,830,553 the disclosure of which is hereby incorporated by reference in its entirety for all purposes.

TECHNICAL FIELD

The present invention relates to a technique of outputting an image based on image data. Specifically the invention pertains to a technique of making image data subject to a preset series of image processing to create dots at adequate densities and output a resulting processed image.

BACKGROUND ART

Image output devices that create dots on various output media, such as printing media and liquid crystal screens, to output images have been used widely as output devices of diverse imaging devices. The image output device processes each image as a collection of very small areas called pixels and creates dots in these pixels. Each pixel individually take only one of two dot states, that is, dot-on state and dot-off state. The density of dot creation may be varied in a relatively wide image area. The varying dot creation density enables output of a multi-tone image. For example, in the case of creation of black ink dots on printing paper, areas of dense dot creation are darker and areas of sparse dot creation are brighter. In the case of creation of dots as bright points on a liquid crystal screen, areas of dense dot creation are brighter and areas of sparse dot creation are darker. The adequate regulation of the dot creation density enables output of a multi-tone image. An object image to be output goes through a preset series of image processing to give control data for creation of dots at adequate densities.

The latest requirements for these image output devices are size enlargement and enhanced picture quality of output images. Division of an image into smaller pixels is an effective measure for the enhanced picture quality requirement. The smaller pixels make the respective dots created in the pixels inconspicuous and thereby improve the picture quality. Increasing the number of pixels is an effective measure for the size enlargement requirement. The increased dimensions of the respective pixels naturally enlarge an output image but undesirably lower the picture quality of the output image. The increased number of pixels is thus effective for the size enlargement of the output image.

The increased number of pixels constituting an image, however, undesirably extends the time of image processing and interferes with high-speed image output. Various techniques have accordingly been proposed to attain high-speed image processing (for example, Japanese Patent Laid-Open Gazette No. 2002-185789).

The high-speed image processing alone is, however, not sufficient to attain the high-speed image output. Another requirement is thus high-speed transfer of original image data and processed image data.

With the wide spread of digital cameras, there is a requirement of direct supply of image data taken with a digital camera to a printing device or another image output device for immediate image output. In such cases, a personal computer or another image processing device of high throughput is not usable for the required image processing. The image processing should thus be simplified to be executable by one or both of an imaging device, such as a digital camera, and an image output device, which are generally of relatively low throughput.

DISCLOSURE OF THE INVENTION

The object of the invention is thus to eliminate the drawbacks of the prior art techniques and to provide a simple image processing technique that enables high-speed image processing and data transfer with a sufficiently high output quality and is executable by a device of even a relatively low throughput as well as by a device of a high throughput such as a personal computer.

In order to attain at least part of the above and the other related objects, the present invention provides an image output system including an image processing device that makes image data subjected to a preset series of image processing and an image output device that creates dots according to a result of the preset series of image processing to form an output image on an output medium. Dot number data is transmitted between the image processing device and the image output device. The 'dot number data' represents the number of dots to be created in each pixel group, which consists of a preset number of plural pixels selected among a number of pixels constituting an image. The primary characteristic of the present invention is a processing technique of this dot number data and is actualized by several applications as described below. A first application of the invention has this characteristic in the image processing device. A second application of the invention has this characteristic in the image output device. A third application of the invention has this characteristic in both the image processing device and the image output device.

The first application of the invention is directed to a first image output system including an image processing device that makes image data subjected to a preset series of image processing and an image output device that creates dots according to a result of the preset series of image processing to form an output image on an output medium.

The image processing device includes: a pixel group tone value specification module that specifies a pixel group tone value as a representative tone value of each pixel group, which is provided by collecting a preset number of plural pixels among a number of pixels constituting the image, according to image data of individual pixels in the pixel group; a correlation map storage module that stores a correlation map correlating dot number data of each pixel group, which represents number of dots to be created in the pixel group, to each combination of a pixel group classification number allocated to the pixel group and the specified pixel group tone value of the pixel group; and a dot number data supply module that refers to the stored correlation map to generate dot number data of each pixel group and supplies the generated dot number data of each pixel group to the image output device.

The image output device includes: a pixel position determination module that stores a priority order of dot-on pixels in one pixel group and determines positions of dot-on pixels in each pixel group based on the priority order of dot-on pixels and the supplied dot number data of the pixel group; and a dot creation module that actually creates dots at the determined positions of dot-on pixels on the output medium.

There is a first image output method corresponding to the first image output system described above. The first application of the invention is thus also actualized by a first image output method that makes image data subjected to a preset series of image processing and creates dots on an output medium according to the processed image data to form an output image.

The first image output method includes: a first step of specifying a pixel group tone value as a representative tone value of each pixel group, which is provided by collecting a preset number of plural pixels among a number of pixels constituting the image, according to image data of individual pixels in the pixel group; a second step of storing a correlation map correlating dot number data of each pixel group, which represents number of dots to be created in the pixel group, to each combination of a pixel group classification number allocated to the pixel group and the specified pixel group tone value of the pixel group; a third step of referring to the stored correlation map to generate dot number data of each pixel group; a fourth step of storing a priority order of dot-on pixels in one pixel group and determining positions of dot-on pixels in each pixel group based on the priority order of dot-on pixels and the supplied dot number data of the pixel group; and a fifth step of actually creating dots at the determined positions of dot-on pixels on the output medium.

The first image output system and the corresponding first image output method of the invention divide the image into multiple pixel group, generate dot number data representing the number of dots to be created in each of the multiple pixel groups, and supply the generated dot number data to the image output device. The image output device has the previous storage of the priority order of dot-on pixels in one pixel group. The image output device determines the positions of the dot-on pixels in each pixel group based on the received dot number data and the stored priority order of dot-on pixels, and actually creates dots according to the determination result to form an output image.

The dot number data representing the number of dots to be created in each pixel group has extremely small data volume, compared with conventional dot state data representing the dot on-off state with regard to all the pixels constituting the image. The supply of the dot number data to the image output device thus enables the high-speed data transmission and accordingly the high-speed image output. This advantage will be described later in detail.

The dot number data is generated by simply referring to the correlation map, which is provided and stored in advance and correlates the dot number data to each combination of the pixel group classification number and the pixel group tone value. Generation of the dot number data with reference to the correlation map is extremely simple processing. Both the pixel group tone value and the pixel group classification number are extremely readily specifiable as described later in detail. The easy specification desirably facilitates and accelerates the generation of the dot number data, thus enabling the high-speed data supply to the image output device and the resulting high-speed image output.

Generation of the dot number data by this extremely simple procedure does not essentially require a device of a high throughput such as a computer, but is executable at a sufficiently high speed even by a device of a relatively low throughput. In one possible modification, the image data may be supplied directly to the image output device, which generates dot number data and forms an output image according to the generated dot number data.

In one preferable structure of the invention, the first image output system stores multiple different priority orders of dot-on pixels in one pixel group. The first image output system of this structure receives the supplied dot number data of each pixel group and selects one priority order for the pixel group among the multiple different priority orders to determine the positions of dot-on pixels in the pixel group.

The positions of dot-on pixels in one pixel group are determined according to the priorities of the respective pixels in the pixel group and the dot number data. The selective use of one priority order among the stored multiple priority orders prevents creation of dots at identical pixel positions over plural adjoining pixel groups, even when such pixel groups have an identical value of the dot number data. This arrangement effectively eliminates noticeable areas of an identical dot formation pattern and prevents the potential deterioration of the picture quality.

One preferable procedure classifies pixel groups into plural different classes according to positions of the respective pixel groups in the image and allocates the pixel group classification number to each pixel group. The pixel group classification numbers may not be allocated in advance but may be allocated according to the requirements. Referring to the relative position of each pixel group in the image ensures adequate allocation of a pixel group classification number to the pixel group.

In another preferable structure of the invention, the first image output system assumes a dither matrix including multiple threshold values in a two-dimensional arrangement and creates dots in each pixel group for formation of an output image, based on the dot number data of the pixel group, the priorities of the respective pixels in the pixel group, and the pixel group classification number allocated to the pixel group according to the dither matrix. A concrete procedure of this structure is explained with regard to a certain object pixel group. The procedure first allocates a pixel group classification number to the object pixel group, based on a relative position of the object pixel group in a dither matrix applied on an image. The procedure then adopts the dither technique with the dither matrix to specify the number of dots to be created in the object pixel group, on the assumption that all the pixels in the pixel group have an identical pixel group tone value. Dot number data representing the specified number of dots to be created in the object pixel group is stored in relation to a combination of the pixel group classification number and the pixel group tone value of the object pixel group. The procedure specifies the priorities of the respective pixels included in the object pixel group, based on the magnitude relation of the threshold values set in a certain area of the dither matrix corresponding to the object pixel group, and stores the specified priorities of the respective pixels in relation to the pixel group classification number of the object pixel group.

Setting the pixel group classification number, the dot number data, and the priorities of the respective pixels in each pixel group according to an identical dither matrix enables output of an image having the substantially equivalent picture quality to the picture quality of an image obtained by the conventional dither technique adopted to determine the dot on-off state of each pixel. This advantage will be described later in detail. Especially when image data of plural adjacent pixels collected to one pixel group have an identical tone value, the positions of dot-on pixels determined from the dot number data are completely the same as the positions of dot-on pixels determined by the dither technique.

The first application of the invention is further directed to a first image processing device that makes image data subjected to a preset series of image processing and generates the processed image data as control data, which is supplied to an image output device to control creation of dots and form an output image.

The first image processing device includes: a pixel group tone value specification module that specifies a pixel group tone value as a representative tone value of each pixel group, which is provided by collecting a preset number of plural pixels among a number of pixels constituting the image, according to image data of individual pixels in the pixel group; a correlation map storage module that stores a correlation map correlating dot number data of each pixel group, which represents number of dots to be created in the pixel group, to each combination of a pixel group classification number allocated to the pixel group and the specified pixel group tone value of the pixel group; and a dot number data supply module that refers to the stored correlation map to generate dot number data of each pixel group and supplies the generated dot number data of each pixel group to the image output device.

There is a first image processing method corresponding to the first image processing device described above. The first application of the invention is thus also actualized by a first image processing method that makes image data subjected to a preset series of image processing and generates the processed image data as control data, which is supplied to an image output device to control creation of dots and form an output image.

The first image processing method includes: a step (A) of specifying a pixel group tone value as a representative tone value of each pixel group, which is provided by collecting a preset number of plural pixels among a number of pixels constituting the image, according to image data of individual pixels in the pixel group; a step (B) of storing a correlation map correlating dot number data of each pixel group, which represents number of dots to be created in the pixel group, to each combination of a pixel group classification number allocated to the pixel group and the specified pixel group tone value of the pixel group; and a step (C) of referring to the stored correlation map to generate dot number data of each pixel group and supplying the generated dot number data of each pixel group to the image output device.

The first image processing device and the corresponding first image processing method of the invention collect every preset number of plural pixels among the number of pixels constituting the image to one pixel group and accordingly divide the image into multiple pixel groups. The first image processing device and the corresponding first image processing method of the invention generate dot number data representing the number of dots to be created in each pixel group and output the dot number data with regard to each pixel group as the control data.

The dot number data representing the number of dots to be created in each pixel group has extremely small data volume, compared with the conventional dot state data representing the dot on-off state with regard to all the pixels constituting the image. The small data volume enables the high-speed output of the control data. This advantage will be described later in detail.

The first image processing device and the corresponding first image processing method of the invention generate the dot number data by simply referring to the correlation map, which is provided and stored in advance and correlates the dot number data to each combination of the pixel group classification number and the pixel group tone value. Generation of the dot number data with reference to the correlation map is extremely simple processing. This enables the high-speed output of the control data.

Generation of the dot number data by the extremely simple procedure does not require a device of a high throughput, such as a computer, but enables the first image processing device of the invention to be incorporated into a device of a relatively low throughput or enables the corresponding first image processing method of the invention to be executed by a device of a relatively low throughput.

One preferable procedure classifies pixel groups into plural different classes according to positions of the respective pixel groups in the image and allocates the pixel group classification number to each pixel group. The pixel group classification numbers may not be allocated in advance but may be allocated adequately according to the relative position of each pixel group in the image.

In one preferable structure of the invention, the first image processing device may convert the resolution of image data and generate the dot number data without explicitly collecting every preset number of plural pixels to one pixel group. The resolution of the image data is converted to make the size of each pixel identical with the size of each pixel group. The procedure then treats each pixel with the converted resolution as one pixel group and accordingly allocates a pixel group classification number to each pixel with the converted resolution. The procedure also treats the tone value of image data with regard to each pixel with the converted resolution as a pixel group tone value and generate dot number data with regard to each pixel with the converted resolution. This arrangement enables generation of dot number data with regard to each pixel group without explicitly collecting every preset number of plural pixels to one pixel group.

With requirement for the enhanced picture quality, the printing resolution of an image is often higher than the resolution of image data. The above procedure is preferably adopted in such cases to convert the resolution of image data to a lower resolution than a printing resolution and generate dot number data. In general, the higher resolution leads to the increased volume of image data and causes difficulty in processing of the image data. Generation of the dot number data at a low resolution facilitates and accelerates the data processing.

In another preferable structure of the invention, the first image processing device may generate data representing a combination of numbers of multiple different types of dots with different expressing tone values to be created in each pixel group, as the dot number data representing the number of dots to be created in each pixel group. The multiple different types of dots with different expressing tone values may be, for example, multiple dots of variable dot sizes or multiple dots of different dot densities. The multiple different types of dots may be dots of different minute-dot formation densities when each dot is formed by multiple minute dots.

Simple reference to the correlation map enables extremely easy generation of the dot number data, whether the dot number data simply represents the number of dots to be created in each pixel group or represents the combination of the numbers of the multiple different types of dots to be created in each pixel group. The use of multiple different types of dots generally complicates the determination of the dot on-off state in each pixel. Generation of the dot number data with reference to the correlation map enhances the relative speed of data processing with the increased number of different types of dots.

In still another preferable structure of the invention, the first image processing device may collect 4 pixels in a main scanning direction and either 2 pixels or 4 pixels in a sub-scanning direction to each pixel group and specify the pixel group tone value of the pixel group.

The less number of pixels collected to one pixel group increases the variation of the pixel group classification numbers and accordingly complicates the correlation map. Namely collection of the greater number of pixels to one pixel group is desirably from this point of view. The tone values of the respective pixels included in one pixel group are represented by one pixel group tone value. An extremely large number of pixels collected to one pixel group may thus worsen the picture quality of a resulting image. As experience shows, the optimum printing result is obtained when each pixel group includes 4 pixels in the main scanning direction and 2 or 4 pixels in the sub-scanning direction.

Another embodiment of the first application of the invention is a first image output device that creates dots on an output medium according to image data to form an output image.

The first image output device includes: a pixel group tone value specification module that specifies a pixel group tone value as a representative tone value of each pixel group, which is provided by collecting a preset number of plural pixels among a number of pixels constituting the image, according to image data of individual pixels in the pixel group; a correlation map storage module that stores a correlation map correlating dot number data of each pixel group, which represents number of dots to be created in the pixel group, to each combination of a pixel group classification number allocated to the pixel group and the specified pixel group tone value of the pixel group; a dot number data generation module that refers to the stored correlation map to generate dot number data of each pixel group; a pixel position determination module that stores a priority order of dot-on pixels in one pixel group and determines positions of dot-on pixels in each pixel group based on the priority order of dot-on pixels and the supplied dot number data of the pixel group; and a dot creation module that actually creates dots at the determined positions of dot-on pixels on the output medium.

The first image output device of the invention divides the image into multiple pixel groups and generates the dot number data representing the number of dots to be created in each pixel group. The procedure specifies the pixel group tone value of one pixel group and refers to the correlation map to generate the dot number data corresponding to the combination of the pixel group classification number and the pixel group tone value. The procedure then determines the positions of dot-on pixels in the pixel group according to the generated dot number data and actually creates the dots at the determined positions of dot-on pixels to form an output image.

The pixel group tone value of each pixel group is readily specifiable as described later. The correlation map correlating the dot number data to each combination of the pixel group classification number and the pixel group tone value is provided and stored in advance. The dot number data is extremely easily generated by simply referring to this correlation map without a device of a high throughput, such as a computer. The image output device easily generates the dot number data in this manner, determines the positions of dot-on pixels in each pixel group, and actually creates the dots at the determined positions of dot-on pixels. This arrangement ensures the high-speed image output from the image output device.

The first image output method and the first image processing method of the invention described above may be actualized in the form of computer programs, which are read and executed by the computer. Other possible embodiments of the first application of the invention accordingly include such computer programs and recording media with such computer programs recorded therein.

There is a first image output program corresponding to the first image output method. The first application of the invention is thus also actualized by a first image output program executed by a computer to actualize an image output method, which makes image data subjected to a preset series of image processing and creates dots on an output medium according to the processed image data to form an output image.

The first image output program causes the computer to attain: a first function of specifying a pixel group tone value as a representative tone value of each pixel group, which is provided by collecting a preset number of plural pixels among a number of pixels constituting the image, according to image data of individual pixels in the pixel group; a second function of storing a correlation map correlating dot number data of each pixel group, which represents number of dots to be created in the pixel group, to each combination of a pixel group classification number allocated to the pixel group and the specified pixel group tone value of the pixel group; a third function of referring to the stored correlation map to generate dot number data of each pixel group; a fourth function of storing a priority order of dot-on pixels in one pixel group and determining positions of dot-on pixels in each pixel group based on the priority order of dot-on pixels and the supplied dot number data of the pixel group; and a fifth function of actually creating dots at the determined positions of dot-on pixels on the output medium.

There is a first image processing program corresponding to the first image processing method. The first application of the invention is thus also actualized by a first image processing program executed by a computer to actualize an image processing method that makes image data subjected to a preset series of image processing and generates the processed image data as control data, which is supplied to an image output device to control creation of dots and form an output image.

The first image processing program causes the computer to attain: a function (A) of specifying a pixel group tone value as a representative tone value of each pixel group, which is provided by collecting a preset number of plural pixels among a number of pixels constituting the image, according to image data of individual pixels in the pixel group; a function (B) of storing a correlation map correlating dot number data of each pixel group, which represents number of dots to be created in the pixel group, to each combination of a pixel group classification number allocated to the pixel group and the specified pixel group tone value of the pixel group; and a function (C) of referring to the stored correlation map to generate dot number data of each pixel group and supplying the generated dot number data of each pixel group to the image output device.

Other embodiments of the first application of the invention include a recording medium in which the first image processing program is recorded and a recording medium in which the first image output program is recorded.

The computer reads the first image output program or the first image processing program, which may be stored in the recording medium, to exert the various functions for the simple and high-speed image processing and thereby enable the high-speed data transfer and the high-speed image output.

The second application of the invention is directed to a second image output system including an image processing device that makes image data subjected to a preset series of image processing and an image output device that creates dots according to a result of the preset series of image processing to form an output image on an output medium.

The image processing device includes: a dot number data generation module that divides a number of pixels constituting the image into multiple pixel groups, where each pixel group consists of a preset number of plural pixels, and generates dot number data of each pixel group, which represents number of dots to be created in each pixel group, according to the image data; and a dot number data supply module that supplies the generated dot number data of each pixel group to the image output device.

The image output device includes: an ordinal number acquisition module that obtains ordinal numbers of respective pixels included in each pixel group as a priority order of dot creation in the pixel group; a correlation map storage module that stores a correlation map correlating each combination of an ordinal number and a value of the dot number data to a dot on-off state in a pixel having the ordinal number; a dot on-off state determination module that refers to the correlation map to read a dot on-off state corresponding to the received dot number data of each pixel group and the ordinal number of each pixel included in the pixel group and determines the dot on-off state in the pixel of the pixel group; and a dot creation module that actually creates dots on the output medium according to a determination result of the dot on-off state in the number of pixels.

There is an image processing output method corresponding to the second image output system described above. The second application of the invention is thus also actualized by an image processing output method that makes image data subjected to a preset series of image processing and creates dots on an output medium according to the processed image data to form an output image.

The image processing output method includes: a first step of dividing a number of pixels constituting the image into multiple pixel groups, where each pixel group consists of a preset number of plural pixels, and generating dot number data of each pixel group, which represents number of dots to be created in each pixel group, according to the image data; a second step of obtaining ordinal numbers of respective pixels included in each pixel group as a priority order of dot creation in the pixel group; a third step of storing a correlation map correlating each combination of an ordinal number and a value of the dot number data to a dot on-off state in a pixel having the ordinal number; a fourth step of referring to the correlation map to read a dot on-off state corresponding to the generated dot number data of each pixel group and the ordinal number of each pixel included in the pixel group and determining the dot on-off state in the pixel of the pixel group; and a fifth step of actually creating dots on the output medium according to a determination result of the dot on-off state in the number of pixels.

The second image output system and the corresponding image processing output method of the invention divide the image into multiple pixel groups, generate the dot number data with regard to each pixel group, and supply the generated dot number data to the image output device. The image output device obtains the ordinal numbers of the respective pixels included in each pixel group as the priority order of dot creation in the pixel group. One concrete procedure of obtaining the ordinal number of each pixel sets in advance consecutive integral values starting from '1' in the respective pixels of one pixel group and reads the integral values as the ordinal numbers. Another concrete procedure sets different real numbers in the respective pixels of one pixel group and determines the ordinal numbers of the respective pixels according to the magnitude of the real numbers. Still another concrete procedure sets a positional relation among the respective pixels of one pixel group and determines the ordinal numbers of the respective pixels according to the positional relation. The image output device stores the correlation map that correlates each combination of an ordinal number and a value of the dot number data to a dot on-off state in a pixel having the ordinal number. The image output device receives the dot number data with regard to each pixel group, refers to the correlation map to determine the dot on-off state in each pixel of the pixel group corresponding to the combination of the value of the received dot number data and the ordinal number of the pixel, and actually creates dots on an output medium according to the determination result of the dot on-off state to form an output image.

As described above with respect to the first image output system and the corresponding first image output method, the dot number data representing the number of dots to be created in each pixel group has extremely small data volume, compared with conventional dot state data representing the dot on-off state with regard to all the pixels constituting the image. The supply of the dot number data with regard to each pixel group to the image output device thus enables the high-speed data transmission and accordingly the high-speed image output.

The image output device receives the supplied dot number data with regard to each pixel group and refers to the correlation map to determine the dot on-off state of each pixel in the pixel group corresponding to the combination of the value of the dot number data and the ordinal number of the pixel. The dot on-off state of each pixel in the pixel group is thus readily and promptly determinable by simply referring to the correlation map. This leads to the high-speed image output.

The dot on-off state of each pixel is determinable by this extremely simple procedure without an image processing device of a high throughput. The image output device of even a relatively low throughput can determine the dot on-off state of each pixel according to the received dot number data at a sufficiently high speed.

In one preferable structure of the invention, the second image output system stores in advance multiple different priority orders of dot-on pixels in one pixel group and selects one priority order for each pixel group among the stored multiple different priority orders. The second image output system of this structure obtains the ordinal number of each pixel in each pixel group based on the selected priority order and uses the obtained ordinal number of the pixel to determine the dot on-off state of the pixel.

The dot on-off state in each pixel of a pixel group is determined according to the combination of the dot number data of the pixel group and the ordinal number of the pixel. The second image output system of this structure selects one priority order among the multiple different priority orders, obtains the ordinal number of each pixel based on the selected priority order, and determines the dot on-off state of the pixel according to the obtained ordinal number. The selective use of one priority order among the stored multiple priority orders prevents creation of dots at identical pixel positions over plural adjoining pixel groups, even when such pixel groups have an identical value of the dot number data. This arrangement effectively eliminates noticeable areas of an identical dot formation pattern and prevents the potential deterioration of the picture quality.

In another preferable structure of the invention, the second image output system generates the dot number data of each pixel group, based on a dither matrix that correlates threshold values to individual pixels in a two-dimensional arrangement. The second image output system of this structure uses an ordinal number of each pixel obtained from the same dither matrix to determine the dot on-off state of the pixel. A typical procedure divides the dither matrix into multiple divisions corresponding to multiple pixel groups and refers to the dither matrix to determine the dot on-off state of the respective pixels included in each pixel group. The procedure then generates the dot number data representing the number of dots to be created in the pixel group. A simpler procedure may be adopted, since the positions of dot-on pixels are not required for generation of the dot number data. The simpler procedure stores the threshold values set in each division of the dither matrix in relation to the corresponding pixel group and specifies a representative tone value of the pixel group. The representative tone value may be an average of the image data in the individual pixels of the pixel group. The representative tone value may otherwise be the image data of a pixel at a preset position in the pixel group, since adjacent pixels generally have similar tone values of the image data. The simpler procedure counts the number of smaller threshold values than the representative tone value in the pixel group and sets the number of smaller threshold values to the dot number data representing the number of dots to be created in the pixel group.

The dot on-off state of each pixel in the pixel group is then determined according to the generated dot number data. One applicable procedure may divide the dither matrix used for generation of the dot number data into multiple blocks corresponding to the multiple pixel groups and store multiple different priority orders of dot-on pixels. Each priority order of dot-on pixels is specified according to the threshold values of each block set at the respective pixel positions in a corresponding pixel group. Another applicable procedure may specify ordinal numbers of the respective pixels included in each pixel group based on a magnitude relation of the threshold values set at the respective pixel positions in the pixel group and store the specified ordinal numbers of the respective pixels as one of the multiple different priority orders of dot-on pixels. The procedure receives the dot number data of one pixel group, selects one priority order corresponding to the relative position of the pixel group to the image, specifies the ordinal numbers of the respective pixels according to the selected priority order, and determines the dot on-off state of the respective pixels in the pixel group based on the specified ordinal numbers.

In the second image output system of this structure, the same dither matrix is applied to generate the dot number data of each pixel group and to determine the dot on-off state of each pixel in the pixel group. This arrangement enables output of an image having the substantially equivalent picture quality to the picture quality of an image obtained by the conventional dither technique adopted to determine the dot on-off state of each pixel. This advantage will be described later in detail. Especially when image data of plural adjacent pixels collected to one pixel group have an identical tone value, the positions of dot-on pixels determined from the dot number data are completely the same as the positions of dot-on pixels determined by the dither technique.

The second application of the invention is further directed to a second image output device that receives image data after a preset series of image processing and creates dots on an output medium according to the received image data to form an output image.

The second image output device includes: a dot number data receiving module that receives dot number data of each pixel group, which represents number of pixels to be created in the pixel group, as the image data, where the pixel group is provided as a division of the image by collecting a preset number of plural pixels among a number of pixels constituting the image; an ordinal number acquisition module that obtains ordinal numbers of respective pixels included in each pixel group as a priority order of dot creation in the pixel group; a correlation map storage module that stores a correlation map correlating each combination of an ordinal number and a value of the dot number data to a dot on-off state in a pixel having the ordinal number; a dot on-off state determination module that refers to the correlation map to read a dot on-off state corresponding to the received dot number data of each pixel group and the ordinal number of each pixel included in the pixel group and determines the dot on-off state in the pixel of the pixel group; and a dot creation module that actually creates dots on the output medium according to a determination result of the dot on-off state in the number of pixels.

There is a second image output method corresponding to the second image output device described above. The second application of the invention is thus also actualized by a second image output method that receives image data after a preset series of image processing and creates dots on an output medium according to the received image data to form an output image.

The second image output method includes: a step (A) of receiving dot number data of each pixel group, which represents number of pixels to be created in the pixel group, as the image data, where the pixel group is provided as a division of the image by collecting a preset number of plural pixels among a number of pixels constituting the image; a step (B) of obtaining ordinal numbers of respective pixels included in each pixel group as a priority order of dot creation in the pixel group; a step (C) of storing a correlation map correlating each combination of an ordinal number and a value of the dot number data to a dot on-off state in a pixel having the ordinal number; a step (D) of referring to the correlation map to read a dot on-off state corresponding to the received dot number data of each pixel group and the ordinal number of each pixel included in the pixel group and determining the dot on-off state in the pixel of the pixel group; and a step (E) of actually creating dots on the output medium according to a determination result of the dot on-off state in the number of pixels.

The second image output device and the corresponding second image output method of the invention receive the dot number data of each pixel group and refer to the correlation map to determine the dot on-off state in each pixel of the pixel group corresponding to the combination of the received dot number data and the ordinal number of the pixel. Dots are created on the output medium according to the determination result of the dot on-off state to form an output image.

The dot number data of each pixel group enables the high-speed data transmission and accordingly the high-speed image output. The dot on-off state of each pixel is readily and promptly determinable corresponding to the combination of the dot number data and the ordinal number by simply referring to the correlation map. Such easy and prompt determination generally leads to the high-speed image output and enables even an image output device of a relatively low throughput to output an image at a sufficiently practical speed.

In one preferable structure of the invention, the second image output device stores multiple different priority orders of dot-on pixels in one pixel group and stores ordinal numbers of respective pixels included in one pixel group in relation to each priority order. The second image output device of this structure receives the dot number data of each pixel group, selects one priority order of dot-on pixels for the pixel group among the stored multiple different priority orders, and determines the dot on-off state of the respective pixels in the pixel group according to the ordinal numbers obtained from the selected priority order.

The selective use of one priority order among the stored multiple priority orders prevents creation of dots at identical pixel positions over plural adjoining pixel groups, even when such pixel groups have an identical value of the dot number data. This arrangement effectively eliminates noticeable areas of an identical dot formation pattern and prevents the potential deterioration of the picture quality.

The second image output device of the invention may be capable of outputting multiple different types of dots having different expressing tone values. The second image output device of this application receives a combination of the numbers of the respective types of dots to be created in each pixel group as the dot number data of the pixel group. The multiple different types of dots with different expressing tone values may be, for example, multiple dots of variable dot sizes or multiple dots of different dot densities. The multiple different types of dots may be dots of different minute-dot formation densities when each dot is formed by multiple minute dots. When the image output device is capable of outputting these different types of dots, the received dot number data of each pixel group represents a combination of the numbers of the respective types of dots. In this application, the stored correlation map correlates each combination of an ordinal number and a value of the dot number data to a dot on-off state including a dot type to be created in a pixel having the ordinal number. The second image output device of this structure receives the dot number data of each pixel group, refers to the correlation map to determine the dot on-off state and the dot type to be created in each pixel of the pixel group, and actually creates the respective types of dots on an output medium according to the determination results of the dot on-off state and the dot type.

Simple reference to the correlation map enables extremely easy determination of the dot on-off state and the dot type to be created in each pixel of a pixel group, whether the dot number data simply represents the number of dots to be created in the pixel group or represents the combination of the numbers of the multiple different types of dots to be created in the pixel group. This arrangement enables the quick determination of the dot on-off state and the dot type to be created in each pixel group and accordingly ensures the high-speed image output.

In another preferable structure of the invention, the second image output device may receive the dot number data of each pixel group, which consists of 8 to 16 pixels in a preset positional relation.

The greater number of pixels collected to one pixel group decreases the total number of pixel groups and accordingly enables input of the whole dot number data within a shorter time period. An extreme increase in number of pixels collected to one pixel group may, however, cause deterioration of the picture quality of a resulting image. As experience shows, the optimum printing result is obtained when each pixel group includes 8 to 16 pixels. As described later in detail, collection of 8 to 16 pixels to each pixel group desirably reduces the total data volume of the dot number data to or below half the data volume of the conventional dot state data representing the dot on-off state of each pixel. This leads to the high-speed data input to the image output device. As experience shows, the optimum printing result is obtained when plural pixels collected to one pixel group have a positional relation to form a rectangle, for example, 4 pixels in the main scanning direction and 2 pixels in the sub-scanning direction.

Another embodiment of the second application of the invention is a an image processing output device that makes image data subjected to a preset series of image processing and creates dots on an output medium according to the processed image data to form an output image.

The image processing output device includes: a dot number data generation module that divides a number of pixels constituting the image into multiple pixel groups, where each pixel group consists of a preset number of plural pixels, and generates dot number data of each pixel group, which represents number of dots to be created in each pixel group, according to the image data; an ordinal number acquisition module that obtains ordinal numbers of respective pixels included in each pixel group as a priority order of dot creation in the pixel group; a correlation map storage module that stores a correlation map correlating each combination of an ordinal number and a value of the dot number data to a dot on-off state in a pixel having the ordinal number; a dot on-off state determination module that refers to the correlation map to read a dot on-off state corresponding to the generated dot number data of each pixel group and the ordinal number of each pixel included in the pixel group and determines the dot on-off state in the pixel of the pixel group; and a dot creation module that actually creates dots on the output medium according to a determination result of the dot on-off state in the number of pixels.

The image processing output device of the invention divides the image into multiple pixel groups and generates the dot number data of each pixel group representing the number of dots to be created in the pixel group. The image processing output device refers to the correlation map to determine the dot on-off state in each pixel of the pixel group corresponding to the combination of the dot number data and the ordinal number of the pixel. Dots are then created on the output medium according to the determination result of the dot on-off state to form an output image.

The dot on-off state of each pixel is readily and promptly determinable corresponding to the combination of the dot number data and the ordinal number by simply referring to the correlation map. Such easy and prompt determination generally leads to the high-speed image output and enables even an image output device of a relatively low throughput to output an image at a sufficiently practical speed.

The second image output method and the image processing output method of the invention described above may be actualized in the form of computer programs, which are read and executed by the computer. Other possible embodiments of the second application of the invention accordingly include such computer programs and recording media with such computer programs recorded therein.

The computer reads the program, which may be stored in the recording medium, to exert the various functions for the simple and high-speed image output.

The third application of the invention is a combination of the first image processing device of the first application with the second image output device of the second application. The third application of the invention is thus directed to a third image output system including an image processing device that makes image data subjected to a preset series of image processing and an image output device that creates dots according to a result of the preset series of image processing to form an output image on an output medium.

The image processing device includes: a pixel group tone value specification module that specifies a pixel group tone value as a representative tone value of each pixel group, which is provided by collecting a preset number of plural pixels among a number of pixels constituting the image, according to image data of individual pixels in the pixel group; and a dot number data supply module that refers to a first correlation map to generate dot number data of each pixel group and supplies the generated dot number data of each pixel group to the image output device, where the first correlation map correlates dot number data of each pixel group, which represents number of dots to be created in the pixel group, to each combination of a pixel group classification number allocated to the pixel group and the specified pixel group tone value of the pixel group.

The image output device includes: an ordinal number storage module that stores ordinal numbers of respective pixels included in each pixel group as a priority order of dot creation in the pixel group; a dot on-off state determination module that receives the dot number data of each pixel group and refers to a second correlation map to determine a dot on-off state in each pixel included in the pixel group, where the second correlation map correlates each combination of an ordinal number and a value of the dot number data to a dot on-off state in a pixel having the ordinal number; and a dot creation module that actually creates dots on the output medium according to a determination result of the dot on-off state in the number of pixels.

There is a third image output method corresponding to the third image output system. The third application of the invention is thus also actualized by a third image output method that creates dots on an output medium according to image data to form an output image.

The third image output method includes: a first step of specifying a pixel group tone value as a representative tone value of each pixel group, which is provided by collecting a preset number of plural pixels among a number of pixels constituting the image, according to image data of individual pixels in the pixel group; a second step of referring to a first correlation map to generate dot number data of each pixel group, where the first correlation map correlates dot number data of each pixel group, which represents number of dots to be created in the pixel group, to each combination of a pixel group classification number allocated to the pixel group and the specified pixel group tone value of the pixel group; a third step of storing ordinal numbers of respective pixels included in each pixel group as a priority order of dot creation in the pixel group; a fourth step of referring to a second correlation map to determine a dot on-off state in each pixel included in each pixel group with the generated dot number data, where the second correlation map correlates each combination of an ordinal number and a value of the dot number data to a dot on-off state in a pixel having the ordinal number; and a fifth step of actually creating dots on the output medium according to a determination result of the dot on-off state in the number of pixels.

The third image output system and the corresponding third image output method of the invention divide the image into multiple pixel groups, generate dot number data representing the number of dots to be created in each of the multiple pixel groups, and supply the generated dot number data to the image output device. The image output device determines the dot on-off state of the respective pixels included in each pixel group based on the supplied dot number data of the pixel group and actually creates dots on an output medium according to the determination result of the dot on-off state to form an output image.

The dot number data representing the number of dots to be created in each pixel group has extremely small data volume, compared with conventional dot state data representing the dot on-off state with regard to all the pixels constituting the image. The supply of the dot number data to the image output device thus enables the high-speed data transmission and accordingly the high-speed image output. This advantage will be described later in detail.

The dot number data is generated by simply referring to the first correlation map, which is provided and stored in advance and correlates the dot number data to each combination of the pixel group classification number and the pixel group tone value. Generation of the dot number data with reference to the first correlation map is extremely simple processing. Both the pixel group tone value and the pixel group classification number are extremely readily specifiable as described later in detail. The easy specification desirably facilitates and accelerates the generation of the dot number data, thus enabling the high-speed data supply to the image output device and the resulting high-speed image output.

The image output device stores in advance the ordinal numbers of the respective pixels included in each pixel group as the priority order of dot creation in the pixel group. The image output device refers to the second correlation map to determine the dot on-off state in each pixel of the pixel group corresponding to the combination of the value of the dot number data and the ordinal number of the pixel. The dot on-off state of each pixel in the pixel group is thus readily and promptly determinable by simply referring to the second correlation map. This leads to the high-speed image output.

Both the generation of the dot number data with regard to each pixel group and the determination of the dot on-off state of the respective pixels in the pixel group are executable by the extremely simple procedures and do not require a device of a high throughput such as a computer. Even a device of a relatively low throughput can sufficiently execute the required series of processing at a practical speed. The image data may not be processed by the computer but may be supplied directly to the image output device. The image output device makes the received image data subjected to the required series of image processing and adequately forms an output image.

One preferable procedure classifies pixel groups into plural different classes according to positions of the respective pixel groups in the image and allocates the pixel group classification number to each pixel group. The pixel group classification numbers may not be allocated in advance but may be allocated according to the requirements. Referring to the relative position of each pixel group in the image ensures adequate allocation of a pixel group classification number to the pixel group.

The third application of the invention is also directed to a third image output device, which corresponds to the third image output system and the third image output method described above. The third image output device creates dots on an output medium according to image data to form an output image.

The third image output device includes: a pixel group tone value specification module that specifies a pixel group tone value as a representative tone value of each pixel group, which is provided by collecting a preset number of plural pixels among a number of pixels constituting the image, according to image data of individual pixels in the pixel group; a dot number data generation module that refers to a first correlation map to generate dot number data of each pixel group, where the first correlation map correlates dot number data of each pixel group, which represents number of dots to be created in the pixel group, to each combination of a pixel group classification number allocated to the pixel group and the specified pixel group tone value of the pixel group; an ordinal number storage module that stores ordinal numbers of respective pixels included in each pixel group as a priority order of dot creation in the pixel group; a dot on-off state determination module that refers to a second correlation map to determine a dot on-off state in each pixel included in each pixel group with the generated dot number data, where the second correlation map correlates each combination of an ordinal number and a value of the dot number data to a dot on-off state in a pixel having the ordinal number; and a dot creation module that actually creates dots on the output medium according to a determination result of the dot on-off state in the number of pixels.

The third image output device of the invention divides the image into multiple pixel groups and refers to the first correlation map to generate the dot number data with regard to each pixel group. The third image output device then refers to the second correlation map to determine the dot on-off state of the respective pixels included in each pixel group according to the generated dot number data, and actually creates dots on the output medium according to the determination result of the dot on-off state to form an output image. Conversion of the image data by simple reference to the first and the second correlation maps enables the easy and high-speed image output. Such data processing does not require a device of a high throughput such as a computer. The image output device of even a relatively low throughput can thus process and output an image at a sufficiently practical speed.

The third application of the invention is also actualized by an image processing control system that executes a required series of image processing and actually creates dots. The third application of the invention is thus directed to an image processing control system including a first image processing device that makes image data subjected to a preset series of image processing and a second image processing device that generates control data, which is used for controlling dot creation on an output medium to form an output image, according to a result of the preset series of image processing.

The first image processing device includes: one value as a representative tone value of each pixel group, which is provided by collecting a preset number of plural pixels among a number of pixels constituting the image, according to image data of individual pixels in the pixel group; and a dot number data supply module that refers to a first correlation map to generate dot number data of each pixel group and supplies the generated dot number data of each pixel group to the second image processing device, where the first correlation map correlates dot number data of each pixel group, which represents number of dots to be created in the pixel group, to each combination of a pixel group classification number allocated to the pixel group and the specified pixel group tone value of the pixel group.

The second image processing device includes: an ordinal number storage module that stores ordinal numbers of respective pixels included in each pixel group as a priority order of dot creation in the pixel group; and a control data generation module that receives the dot number data of each pixel group and refers to a second correlation map to determine a dot on-off state in each pixel included in the pixel group and thereby generate the control data, where the second correlation map correlates each combination of an ordinal number and a value of the dot number data to a dot on-off state in a pixel having the ordinal number.

There is an image processing control method corresponding to the image processing control system. The third application of the invention is thus further actualized by an image processing control method that that makes image data subjected to a preset series of image processing and generates the processed image data as control data, which is supplied to an image output device to control creation of dots and form an output image.

The image processing control method includes: a step (A) of specifying a pixel group tone value as a representative tone value of each pixel group, which is provided by collecting a preset number of plural pixels among a number of pixels constituting the image, according to image data of individual pixels in the pixel group; a step (B) of referring to a first correlation map to generate dot number data of each pixel group, where the first correlation map correlates dot number data of each pixel group, which represents number of dots to be created in the pixel group, to each combination of a pixel group classification number allocated to the pixel group and the specified pixel group tone value of the pixel group; a step (C) of storing ordinal numbers of respective pixels included in each pixel group as a priority order of dot creation in the pixel group; and a step (D) of referring to a second correlation map to determine a dot on-off state in each pixel included in each pixel group with the generated dot number data and thereby generate the control data, where the second correlation map correlates each combination of an ordinal number and a value of the dot number data to a dot on-off state in a pixel having the ordinal number.

The image processing control system and the image processing control method of the invention collect a preset number of plural pixels among a number of pixels constituting an image to one pixel group and accordingly divide the image into multiple pixel groups. The image processing control system and the image processing control method of the invention generate the dot number data of each pixel group representing the number of pixels to be created in the pixel group and determine the dot on-off state of the respective pixels in the pixel group according to the generated dot number data to provide control data.

The dot number data representing the number of dots to be created in each pixel group has extremely small data volume, compared with the conventional dot state data representing the dot on-off state with regard to all the pixels constituting the image. The dot number data of the small data volume is readily processible and accordingly enables the easy and high-speed generation of the control data.

The dot number data is generated by simply referring to the first correlation map that correlates the dot number data of one pixel group to each combination of the pixel group classification number and the pixel group tone value of the pixel group. This arrangement enables the high-speed generation of the dot number data by the extremely simple processing. The control data is then generated from the dot number data by simply referring to the second correlation map that correlates each combination of the ordinal number and the dot number data to the dot on-off state in a pixel having the ordinal number. This arrangement enables the high-speed generation of the control data from the dot number data by the extremely simple processing. The image processing control system and the image processing control method of the invention thus easily and promptly generate the control data from the image data and use the generated control data to ensure the high-speed image output.

Generation of the control data from the image data is executable by the extremely simple processing and does not require a device of a high throughput such as a computer. A device of even a relatively low throughput can thus generate the control data at a sufficiently practical speed.

The third application of the invention is further directed to an image processing control device, which corresponds to the image processing control system and the image processing control method described above. The image processing control device makes image data subjected to a preset series of image processing and generates the processed image data as control data, which is supplied to an image output device to control creation of dots and form an output image.

The image processing control device includes: a pixel group tone value specification module that specifies a pixel group tone value as a representative tone value of each pixel group, which is provided by collecting a preset number of plural pixels among a number of pixels constituting the image, according to image data of individual pixels in the pixel group; a dot number data generation module that refers to a first correlation map to generate dot number data of each pixel group, where the first correlation map correlates dot number data of each pixel group, which represents number of dots to be created in the pixel group, to each combination of a pixel group classification number allocated to the pixel group and the specified pixel group tone value of the pixel group; an ordinal number storage module that stores ordinal numbers of respective pixels included in each pixel group as a priority order of dot creation in the pixel group; and a control data generation module that refers to a second correlation map to determine a dot on-off state in each pixel included in each pixel group with the generated dot number data and thereby generate the control data, where the second correlation map correlates each combination of an ordinal number and a value of the dot number data to a dot on-off state in a pixel having the ordinal number.

The image processing control device of the invention divides the image into multiple pixel groups and refers to the first correlation map to generate the dot number data with regard to each pixel group. The image processing control device then refers to the second correlation map to generate the control data from the dot number data of each pixel group. Conversion of the image data by simple reference to the first and the second correlation maps enables the easy and high-speed generation of the control data. Such data processing does not require a device of a high throughput such as a computer. The image processing control device of even a relatively low throughput can thus generate the control data at a sufficiently practical speed.

In the image processing control system, the image processing control method, and the image processing control device of the invention, one preferable structure stores multiple different priority orders of dot-on pixels in one pixel group and stores ordinal numbers of respective pixels included in one pixel group in relation to each priority order. The system, the method, or the device of this structure selects one priority order of dot-on pixels for the pixel group among the stored multiple different priority orders, and determines the dot on-off state of the respective pixels in the pixel group according to the ordinal numbers obtained from the selected priority order to generate the control data.

The dot on-off state in each pixel of a pixel group is determined according to the combination of the dot number data of the pixel group and the ordinal number of the pixel. The system, the method, or the device of this structure selects one priority order for the pixel group among the stored multiple priority orders and determines the dot on-off state of the respective pixels in the pixel group according to the ordinal numbers obtained from the selected priority order. The pixels at the corresponding positions in the multiple pixel groups accordingly have different ordinal numbers. Allocation of the different ordinal numbers to the pixels at the corresponding positions in the respective pixel groups prevents creation of dots at identical pixel positions over plural adjoining pixel groups, even when such pixel groups have an identical value of the dot number data. This arrangement effectively eliminates noticeable areas of an identical dot formation pattern and prevents the potential deterioration of the picture quality.

The pixel group classification number is allocated to each pixel group as described above with regard to the first application of the invention.

In the image processing control system, the image processing control method, and the image processing control device of the invention, another preferable structure assumes a dither matrix including multiple threshold values in a two-dimensional arrangement and generates the control data based on the dot number data of the pixel group, the ordinal numbers allocated to the respective pixels in the pixel group, and the pixel group classification number allocated to the pixel group according to the dither matrix. A concrete procedure of this structure is explained with regard to a certain object pixel group. The procedure first allocates a pixel group classification number to the object pixel group, based on a relative position of the object pixel group in a dither matrix applied on an image. The procedure then adopts the dither technique with the dither matrix to specify the number of dots to be created in the object pixel group, on the assumption that all the pixels in the pixel group have an identical pixel group tone value. Dot number data representing the specified number of dots to be created in the object pixel group is stored in relation to a combination of the pixel group classification number and the pixel group tone value of the object pixel group as the first correlation map. The procedure specifies the ordinal numbers of the respective pixels included in the object pixel group, based on the magnitude relation of the threshold values set in a certain area of the dither matrix corresponding to the object pixel group, and stores multiple combinations of the specified ordinal numbers of the respective pixels as multiple priority orders of dot-on pixels. The procedure generates the dot number data of each pixel group, selects one priority order of dot-on pixels corresponding to the relative position of the pixel group on the image among the stored multiple priority orders, and determines the dot on-off state of the respective pixels in the pixel group according to the ordinal numbers obtained from the selected priority order to generate the control data.

Setting the pixel group classification number, the dot number data, and the ordinal numbers of the respective pixels in each pixel group according to an identical dither matrix enables output of an image having the substantially equivalent picture quality to the picture quality of an image obtained by the conventional dither technique adopted to determine the dot on-off state of each pixel. This advantage will be described later in detail. Especially when image data of plural adjacent pixels collected to one pixel group have an identical tone value, the positions of dot-on pixels determined from the dot number data are completely the same as the positions of dot-on pixels determined by the dither technique.

As clearly understood from such creation of dots at the identical pixel positions, setting the pixel group classification number, the dot number data, and the ordinal numbers of the respective pixels in each pixel group according to an identical dither matrix enables relatively free control of the dot creation state. The dot creation state is hardly affected by the size of each pixel group regardless of the image data processing in the units of pixel groups but significantly depends on the dither matrix used for setting the pixel group classification number and the ordinal numbers. The dot creation state is completely dominated by the dither matrix, when the image data of the respective pixels collected to one pixel group have an identical tone value.

By taking into such characteristics, a dither matrix having a blue noise mask characteristic may be applied to set the pixel group classification number, the dot number data, and the ordinal numbers of the respective pixels in each pixel group. The 'dither matrix having the blue noise mask characteristic' in the specification hereof creates dots in an irregular pattern and has a peak of the spatial frequency component in a high frequency domain having one cycle length of not greater than 2 pixels. Dots may be created in a regular pattern in an image area of a specific lightness range, for example, in a bright image having a high lightness.

Setting the pixel group classification number, the dot number data, and the ordinal numbers of the respective pixels in each pixel group according to the dither matrix having the blue noise mask characteristic forms an output image in a dot distribution with reflection of the blue noise mask characteristic. The dot distribution does not include any periodical pattern corresponding to pixel groups, regardless of generation of the dot number data and determination of the dot on-off state in the units of pixel groups. Generation of the dot number data in the units of pixel groups ensures the high-speed image output. Application of the dither matrix with the blue noise mask characteristic thus enables the high-speed output of a high-quality image. This technique is not restricted to the third application of the invention but is also adoptable in the first application or the second application of the invention.

Alternatively a dither matrix having a green noise mask characteristic may be applied to set the pixel group classification number, the dot number data, and the ordinal numbers of the respective pixels in each pixel group. The 'dither matrix having the green noise mask characteristic' in the specification hereof creates dots in an irregular pattern and has a peak of the spatial frequency component in a middle frequency domain having one cycle length of 2 pixels to ten-odd pixels. Dots may be created in a regular pattern in an image area of a specific lightness range.

The dither matrix having the green noise mask characteristic is effectively used in image output devices having difficulty in stable creation of minute dots of one pixel length, such as laser printers, to prevent creation of isolated dots. Application of the dither matrix with the green noise mask characteristic thus enables the high-speed output of a stable-quality image. This technique is not restricted to the third application of the invention but is also adoptable in the first application or the second application of the invention.

In the image processing control system, the image processing control method, and the image processing control device of the invention, still another preferable structure may convert the resolution of image data and generate the dot number data without explicitly collecting every preset number of plural pixels to one pixel group. The resolution of the image data is converted to make the size of each pixel identical with the size of each pixel group. The procedure then treats each pixel with the converted resolution as one pixel group and accordingly allocates a pixel group classification number to each pixel with the converted resolution. The procedure also treats the tone value of image data with regard to each pixel with the converted resolution as a pixel group tone value and generate dot number data with regard to each pixel with the converted resolution. This arrangement enables generation of dot number data with regard to each pixel group without explicitly collecting every preset number of plural pixels to one pixel group.

With requirement for the enhanced picture quality, the printing resolution of an image is often higher than the resolution of image data. The above procedure is preferably adopted in such cases to convert the resolution of image data to a lower resolution than a printing resolution and generate dot number data. In general, the higher resolution leads to the increased volume of image data and causes difficulty in processing of the image data. Generation of the dot number data at a low resolution facilitates and accelerates the data processing.

In the image processing control system, the image processing control method, and the image processing control device of the invention, another preferable structure may generate data representing a combination of numbers of multiple different types of dots with different expressing tone values to be created in each pixel group, as the dot number data representing the number of dots to be created in each pixel group. The multiple different types of dots with different expressing tone values may be, for example, multiple dots of variable dot sizes or multiple dots of different dot densities. The multiple different types of dots may be dots of different minute-dot formation densities when each dot is formed by multiple minute dots.

The dot number data of each pixel group is generated by simply referring to the first correlation map that correlates the dot number data representing a combination of the numbers of the respective types of dots to be created in one pixel group, to each combination of the pixel group classification number and the pixel group tone value. The control data is then generated from the dot number data of each pixel group by simply referring to the second correlation map that correlates each combination of the ordinal number and the dot number data to the dot on-off state and the dot type to be created in a pixel having the ordinal number. The control data shows the dot on-off state and the dot types to be created in the respective pixels of each pixel group.

Simple reference to the first correlation map enables extremely easy generation of the dot number data, whether the dot number data simply represents the number of dots to be created in each pixel group or represents the combination of the numbers of the multiple different types of dots to be created in each pixel group. The use of multiple different types of dots generally complicates the determination of the dot on-off state in each pixel. Generation of the dot number data with reference to the first correlation map enhances the relative speed of data processing with the increased number of different types of dots. Simple reference to the second correlation map enables extremely easy determination of the dot on-off state and the dot type to be created in each pixel of a pixel group, whether the dot number data simply represents the number of dots to be created in the pixel group or represents the combination of the numbers of the multiple different types of dots to be created in the pixel group. This arrangement enables the relatively high-speed determination of the dot on-off state. The advantage of the high-speed generation of the control data from the image data is especially prominent with an increased variation of the types of dots.

In the image processing control system, the image processing control method, and the image processing control device of the invention, still another preferable structure may specify the pixel group tone value of each pixel group, which consists of 4 to 16 pixels in a preset positional relation.

The less number of pixels collected to one pixel group increases the total number of pixel groups and accordingly complicates the first correlation map. Namely collection of the greater number of pixels to one pixel group is desirably from this point of view. The tone values of the respective pixels included in one pixel group are represented by one pixel group tone value. An extremely large number of pixels collected to one pixel group may thus worsen the picture quality of a resulting image. As experience shows, the optimum printing result is obtained when each pixel group includes 8 to 16 pixels. The sufficiently good printing result is obtained when each pixel group includes 4 to 16 pixels. As experience shows, the optimum printing result is obtained when plural pixels collected to one pixel group have a positional relation to form a rectangle, for example, 4 pixels in the main scanning direction and 2 pixels in the sub-scanning direction.

The third image output method and the image processing control method of the invention described above may be actualized in the form of computer programs, which are read and executed by the computer. Other possible embodiments of the third application of the invention accordingly include such computer programs and recording media with such computer programs recorded therein.

BRIEF DESCRIPTION OF THE DRAWINGS

FIGS. 8a through 8d show conversion of image data into dot state data by the dither technique;

FIGS. 9a through 9d show generation of dot state data representing the dot on-off state of individual pixels from dot number data;

FIGS. 12a through 12d show a method of specifying the pixel group classification number to be allocated to each pixel group;

FIG. 13 shows a concrete procedure of specifying the classification number of an object pixel group;

FIG. 17 shows estimation results of data volume of the conversion table under various conditions;

FIGS. 19a through 19c show the details of a resolution adjustment process executed in the modified image printing process;

FIG. 25 conceptually shows the specified numbers of large-size dots, medium-size dots, and small-size dots to be created in respective pixel groups;

FIG. 26 shows one example of a correlation map that allocates code data to each combination of the numbers of large-size dots, medium-size dots, and small-size dots to be created in each pixel group;

FIG. 28 conceptually shows a conversion table referred to in the dot number data generation process of the second embodiment;

FIG. 30 conceptually shows a decoding table referred to in the pixel position determination process of the second embodiment to decode the encoded dot number data;

FIG. 32 conceptually shows another decoding table referred to for decoding the encoded dot number data in a different manner;

FIG. 33 shows estimation results of data volume of the conversion table under various conditions in the second embodiment;

FIGS. 38a, 38b, and 38c conceptually show determination of the dot on-off state in respective pixels by the dot on-off state determination process of the third embodiment;

FIG. 39 conceptually shows a conversion table referred to for determination of the dot on-off state of each target pixel;

FIGS. 42a through 42d show a method of selecting one ordinal number matrix corresponding to an object pixel group;

FIG. 43 shows a concrete procedure of selecting an ordinal number matrix according to coordinate values (n,m) of one pixel group;

FIG. 44 shows estimation results of the memory capacity required for storage of ordinal number matrixes with regard to combinations of different sizes of a dither matrix and different sizes of each pixel group;

FIG. 47 conceptually shows a conversion table referred to in a dot on-off state determination process of the fourth embodiment;

FIG. 48 shows estimation results of the memory capacity required for storage of the conversion table with regard to various sizes of pixel groups;

BEST MODES OF CARRYING OUT THE INVENTION

Figure 1:
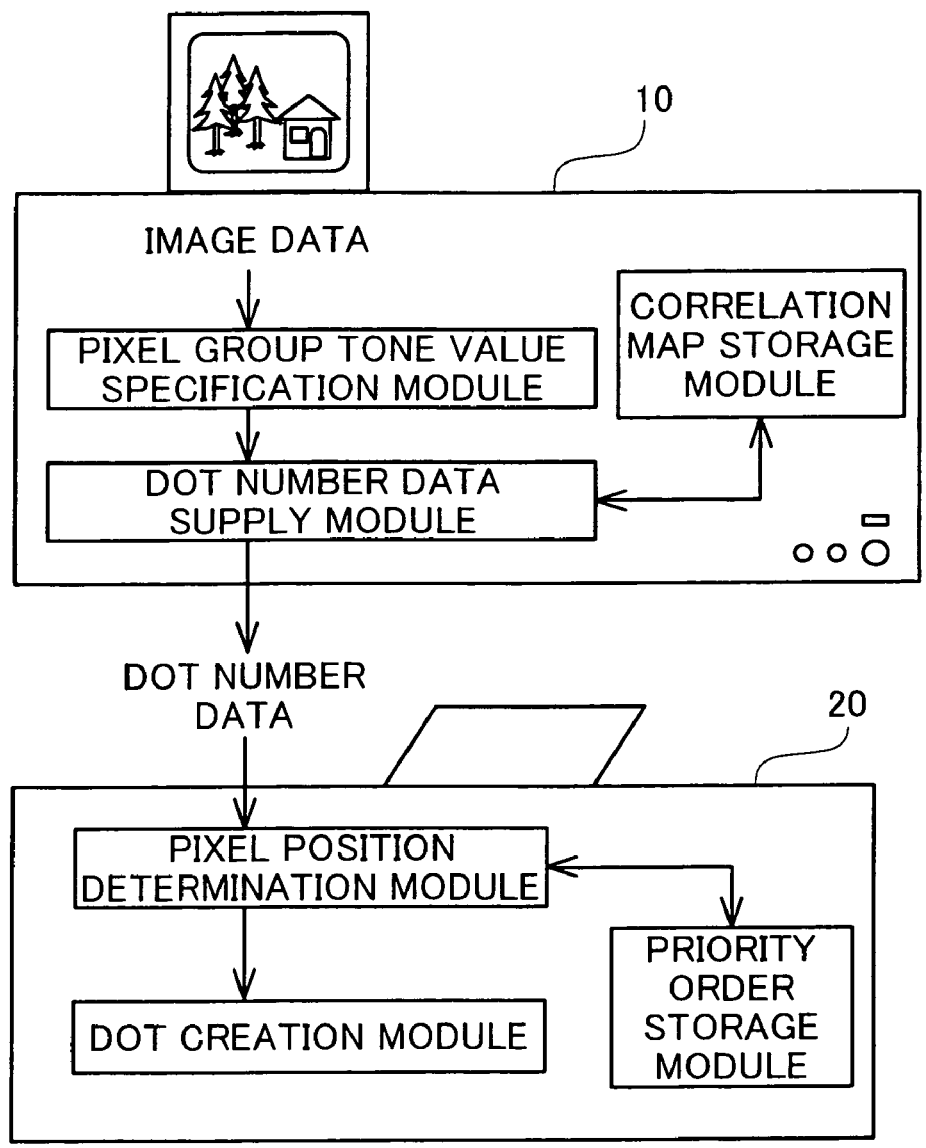
FIG. 1 schematically illustrates the general configuration of a printing system to describe a first application of the invention.

Some modes of carrying out the invention are discussed below as preferred embodiments in the following sequence to describe the objects, features, aspects, and advantages of the present invention more apparently:

A. First Application of Invention
B. First Embodiment
  B-1. System Configuration
  B-2. General Flow of Image Printing Process in First Embodiment
  B-3. Principle of Determining Positions of Dot-On Pixels According to Dot Number Data
  B-4. Dot Number Data Generation Process of First Embodiment
  B-5. Method of Specifying Pixel Group Classification Number
  B-6. Pixel Position Determination Process of First Embodiment
  B-7. Modifications
C. Second Embodiment
  C-1. General Flow of Image Printing Process in Second Embodiment
  C-2. Dot Number Data Generation Process of Second Embodiment
    C-2-1. Process of Specifying Numbers of Large-Size, Medium-Size, and Small-Size Dots by Dither Technique
    C-2-2. Process of Encoding Specified Numbers of Large-Size, Medium-Size, and Small-Size Dots
    C-2-3. Dot Number Data Generation Process with Conversion Table
  C-3. Pixel Position Determination Process of Second Embodiment
D. Second Application of Invention
E. Third Embodiment
  E-1. Dot Number Data Generation Process of Third Embodiment
  E-2. Dot On-Off State Determination Process of Third Embodiment
  E-3. Modifications
F. Fourth Embodiment
  F-1. General Flow of Image Printing Process in Fourth Embodiment
  F-2. Dot Number Data Generation Process of Fourth Embodiment
  F-3. Dot On-Off State Determination Process of Fourth Embodiment
    F-3-1. Dot On-Off State Determination Process without Conversion Table
    F-3-2. Dot On-Off State Determination Process with Conversion Table
G. Third Application of Invention
H. Fifth Embodiment
  H-1. Dot Number Data Generation Process of Fifth Embodiment
  H-2. Dot On-Off State Determination Process of Fifth Embodiment
  H-3. Modifications
I. Sixth Embodiment A. First Application of Invention A first application of the invention is described with reference to FIG. 1. FIG. 1 schematically illustrates the general configuration of a printing system to describe the first application of the invention. The printing system of the first application includes a computer 10 as an image processing device and a printer 20 as an image output device. The computer 10 loads and executes a predetermined program to function, in combination with the printer 20, as an integral image output system. The printer 20 creates dots on a printing medium to print an image. The computer 10 makes image data of an object image subject to a preset series of image processing to generate print control data for controlling dot creation or non-creation in individual pixels by the printer 20 and transmits the generated print control data to the printer 20.

In a conventional printing system, a computer converts image data into dot state data representing the dot on-off state in respective pixels by a preset series of image processing, and transmits the dot state data to a printer. The printer creates dots according to the dot state data to print a resulting processed image. An increase in number of pixels included in an object image to be printed requires a longer time for image processing and accordingly interferes with quick printing of the object image. The increased number of pixels naturally increases the volume of the dot state data representing the dot on-off state in the respective pixels. This requires a longer time for data output from the computer to the printer and thereby increases the total printing time.

In the printing system of FIG. 1, the computer 10 collects every preset number of adjacent pixels in an object image to one pixel group and thereby divides the object image into multiple pixel groups. The computer 10 then generates dot number data representing the number of dots to be created in each pixel group and transmits the generated dot number data to the printer 20. The printer 20 receives the dot number data with regard to each pixel group, refers to a priority order storage module, and determines the positions of dot-on pixels, in which dots are to be created, in the pixel group. The priority order storage module stores in advance a preset priority order of dot-on pixels in each pixel group. A pixel position determination module determines the positions of dot-on pixels in each pixel group, based on the specified priority order of dot-on pixels in the pixel group and the dot number data with regard to the pixel group. A dot creation module actually creates dots at the determined positions of dot-on pixels to complete a printed image.

The dot number data with regard to each pixel group has a significantly low data volume, compared with the dot state data representing the dot on-off state of individual pixels. The supply of the dot number data with regard to each pixel group, instead of the dot state data, from the computer 10 to the printer 20 thus ensures extremely high-speed data transfer.

The dot number data with regard to each pixel group is generated by the computer 10. A pixel group tone value specification module specifies pixel group tone values of the multiple pixel groups as divisions of the object image. The pixel group tone value is a representative tone value of each pixel group and is specified according to image data of the respective pixels included in the pixel group. A correlation map storage module stores a correlation map that correlates dot number data of each pixel group to each combination of a pixel group classification number allocated to the pixel group and the specified pixel group tone value of the pixel group. The pixel group classification number may be allocated to each pixel group by classifying the pixel groups into plural different classes according to the positions of the respective pixel groups in the object image. In the case of fixed division of each object image into multiple pixel groups, an adequate pixel group classification number may be allocated in advance to each pixel group. A simpler technique may use random digits to allocate the pixel group classification numbers at random to the respective pixel groups. A dot number data supply module refers to the correlation map of the dot number data to the combination of the pixel group classification number and the pixel group tone value, specifies the dot number data of each pixel group corresponding to the combination of the pixel group classification number and the pixel group tone value of the pixel group, and supplies the specified dot number data to the printer 20.

The pixel group tone value of each pixel group is readily specified as described later in detail. The pixel group classification number is also readily specified and allocated to each pixel group. The dot number data with regard to each pixel group is easily determined corresponding to the combination of the pixel group classification number and the pixel group tone value of the pixel group by simply referring to the stored correlation map. The printing system of FIG. 1 accordingly achieves the high-speed generation of the dot number data with regard to each pixel group and the high-speed supply of the generated dot number data to the printer 20. This technique thus ensures high-speed printing of even an object image having a large number of pixels. Only an extremely simple series of image processing is required to generate the dot number data. Namely generation of the dot number data does not essentially require a device of a high throughput, for example, the computer 10, but is sufficiently executable even by a device of a relatively low throughput, for example, the printer 20 or a digital camera. Application of this principle to the printing system is described below in detail with reference to several embodiments of the invention.

B. First Embodiment

B-1. System Configuration

Figure 2:
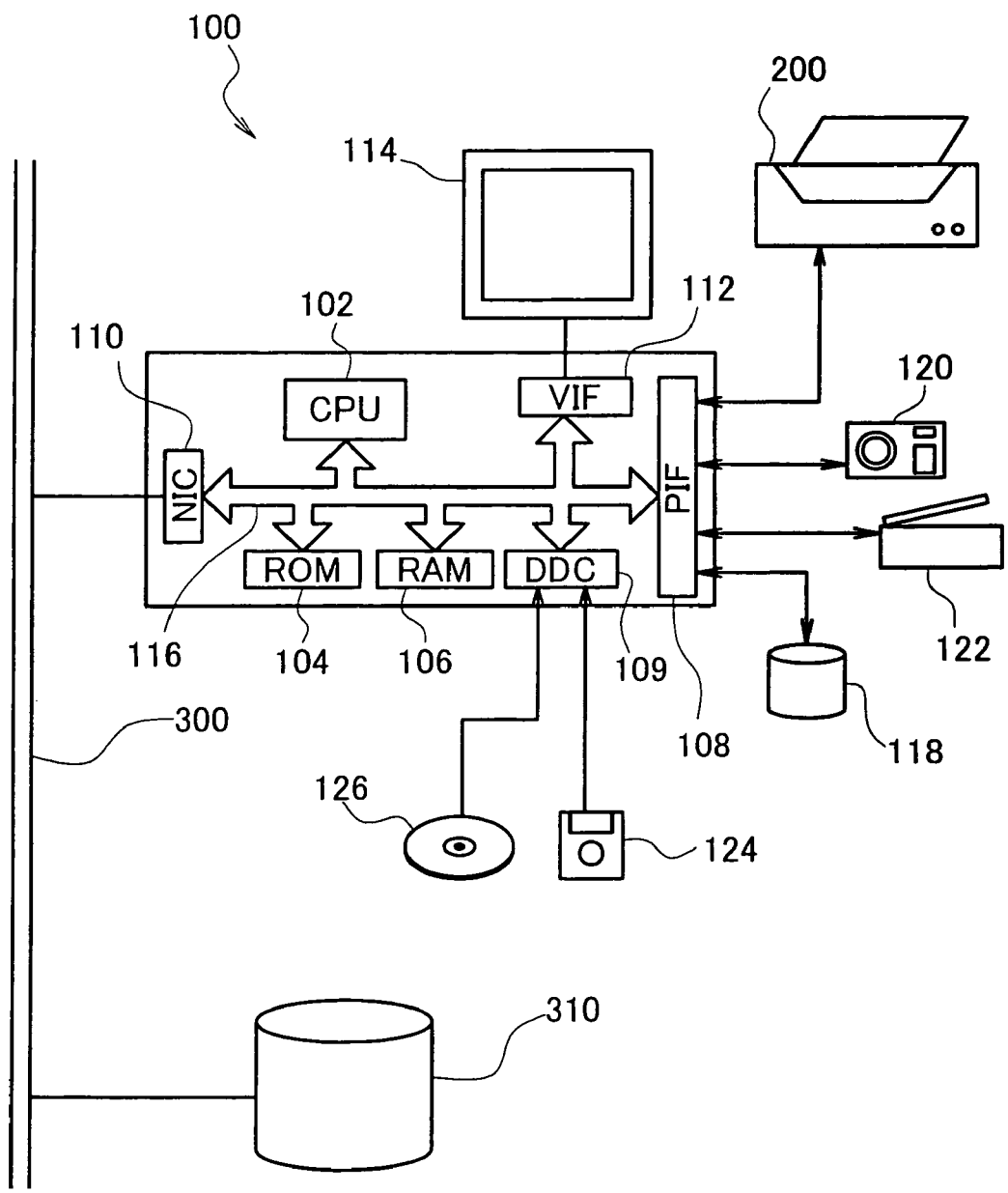
FIG. 2 schematically shows the structure of a computer as an image processing device in a first embodiment of the invention.

FIG. 2 schematically shows the structure of a computer 100 as an image processing device in a first embodiment. The computer 100 has a known structure including a CPU 102, a ROM 104, and a RAM 106 that are interconnected via a bus 116.

The computer 100 has a disk controller DDC 109 to read data from, for example, a flexible disk 124 or a compact disc 126, a peripheral equipment interface PIF 108 to receive and send data from and to peripheral equipment, and a video interface VIF 112 to drive and actuate a CRT 114. The PIF 108 is connected with a color printer 200 (described later) and a hard disk unit 118. Connection of a digital camera 120 or a color scanner 122 with the PIF 108 enables printing of images taken by the digital camera 120 or the color scanner 122. Insertion of a network interface card NIC 110 into the computer 100 connects the computer 100 to a communication line 300 to obtain data stored in a storage device 310 on the communication line 300.

Figure 3:
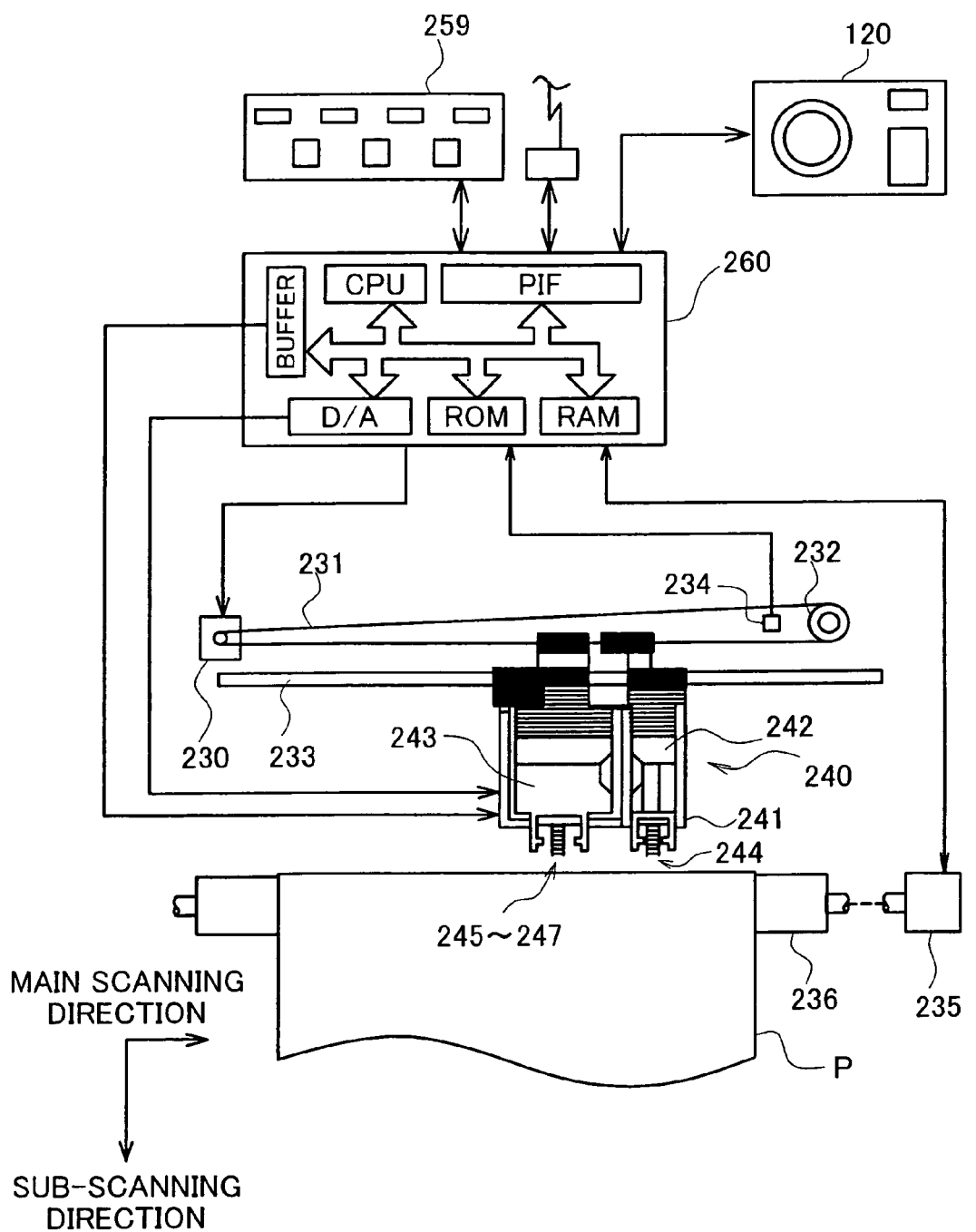
FIG. 3 schematically illustrates the structure of a color printer in the first embodiment.

FIG. 3 schematically shows the structure of the color printer 200 in the embodiment. The color printer 200 is an inkjet printer that is capable of creating dots of four different color inks, cyan, magenta, yellow, and black. The color printer 200 may otherwise be an inkjet printer that is capable of creating dots of six different color inks, light cyan ink having a lower dye or pigment density and a light magenta ink having a lower dye or pigment density, in addition to the above four color inks. In the description below, cyan ink, magenta ink, yellow ink, black ink, light cyan ink, and light magenta ink may respectively be referred to as C ink, M ink, Y ink, K ink, LC ink, and LM ink.

As illustrated, the color printer 200 has a mechanism of actuating a print head 241 mounted on a carriage 240 to eject inks and create dots, a mechanism of activating a carriage motor 230 to move the carriage 240 back and forth along a shaft of a platen 236, a mechanism of activating a paper feed motor 235 to feed printing paper P, and a control circuit 260 that controls the creation of dots, the shift of the carriage 240, and the feed of the printing paper P.

An ink cartridge 242 for storing the K ink and an ink cartridge 243 for storing the C, M, and Y inks are attached to the carriage 240. The respective inks in the ink cartridges 242 and 243 attached to the carriage 240 are supplied through non-illustrated ink conduits to corresponding ink ejection heads 244 through 247 of the respective colors formed on the bottom face of the print head 241.

Figure 4:
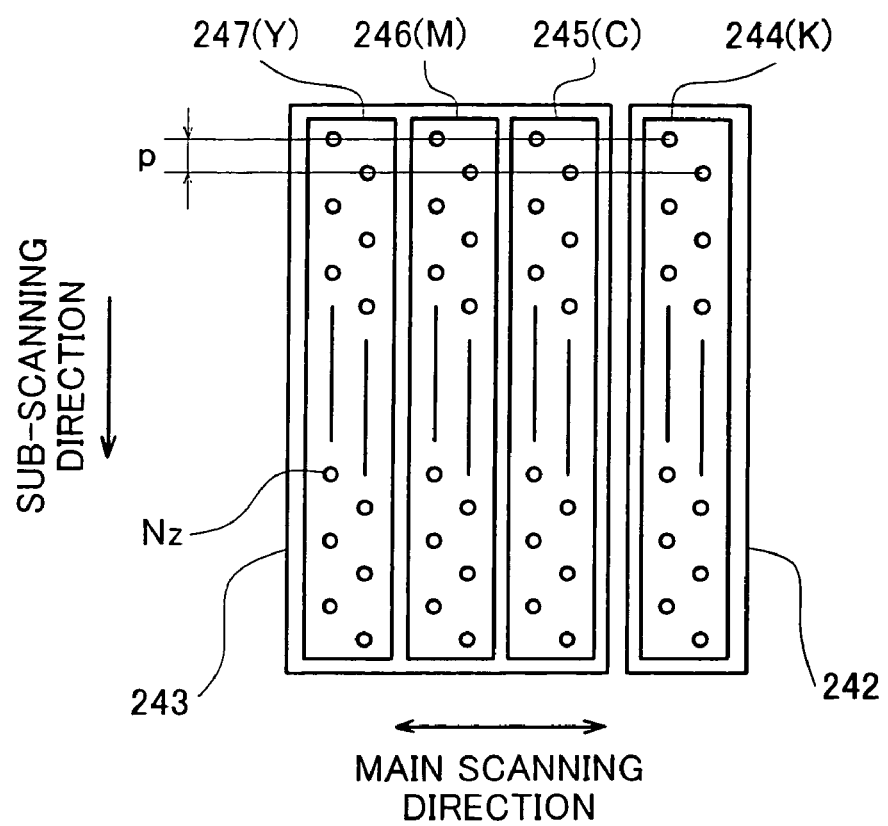
FIG. 4 shows an arrangement of inkjet nozzles on respective ink ejection heads of the color printer.

FIG. 4 shows an arrangement of inkjet nozzles Nz on the respective ink ejection heads 244 through 247. Four nozzle arrays for ejecting the C, M, Y, and K color inks are formed on the bottom face of the respective ink ejection heads 244 through 247. Each nozzle array includes 48 nozzles Nz arranged at a fixed nozzle pitch 'k'.

The control circuit 260 includes a CPU, a ROM, a RAM, and a PIF (peripheral equipment interface), which are interconnected via a bus. The control circuit 260 controls the operations of the carriage motor 230 and the paper feed motor 235 to regulate main scans and sub-scans of the carriage 240, while controlling ejection of ink droplets from the respective nozzles at adequate timings according to print data supplied from the computer 100. The color printer 200 creates ink dots of the respective colors at adequate positions on a printing medium under control of the control circuit 260 and thereby prints a color image.

Regulation of the waveform of driving signals supplied to the respective nozzles for ejection of ink droplets varies the size of the ejected ink droplets to form varying-size ink dots. Selective use of the varying-size ink dots according to individual areas of an object image to be printed ensures high-quality image printing.

Any of diverse methods may be applied to eject ink droplets from the ink ejection heads of the respective colors. Typical examples of the available technique include a method that uses piezoelectric elements for ejection of ink droplets and a method that uses heaters located in respective ink conduits to generate bubbles in the ink conduits for ejection of ink droplets. The technique of the invention is not restricted to such inkjet printers or bubble jet printers but is also applicable to printers that take advantage of thermal transfer to create ink dots on a printing medium and printers that take advantage of static electricity to make toners of respective colors adhere to a printing medium.

In the color printer 200 having the hardware configuration discussed above, the carriage motor 230 is driven to move the ink ejection heads 244 through 247 of the respective colors in a main scanning direction relative to the printing paper P, while the paper feed motor 235 is actuated to feed the printing paper P in a sub-scanning direction. The control circuit 260 repeats main scans and sub-scans of the carriage 240 and drives the nozzles at adequate timings to eject ink droplets according to print data. The color printer 200 thus prints a resulting color image on the printing paper P.

The color printer 200 has the CPU, the RAM, and the ROM in the control circuit 260 and may thus execute series of image processing, instead of the computer 100. In such cases, image data representing each image taken by the digital camera 120 is directly supplied to the color printer 200. The control circuit 260 in the color printer 200 executes required image processing of the received image data and enables the color printer 200 to print a resulting processed image.

B-2. General Flow of Image Printing Process in First Embodiment

The computer 100 and the color printer 200 constructed as discussed above execute series of image processing (image printing process) to process image data and print a resulting processed image. For the better understanding, the description sequentially regards a general flow of image printing process, the principle of the image printing process, and the details of the image printing process.

The following description is on the assumption that a first half of the image printing process is executed by the computer 100 and a latter half of the image printing process is executed by the printer 200. The first half of the image printing process may alternatively be performed in the color printer 200 or in an imaging device that generates image data, for example, the digital camera 120, instead of the computer 100. The first half of the image printing process of this embodiment is significantly simplified as discussed later and is thus executable at a sufficiently high speed even by a CPU of a relatively low throughput. Incorporation of the first half of the image printing process in the color printer 200 or the digital camera 120 still constructs a sufficiently practical printing system.

Figure 5:
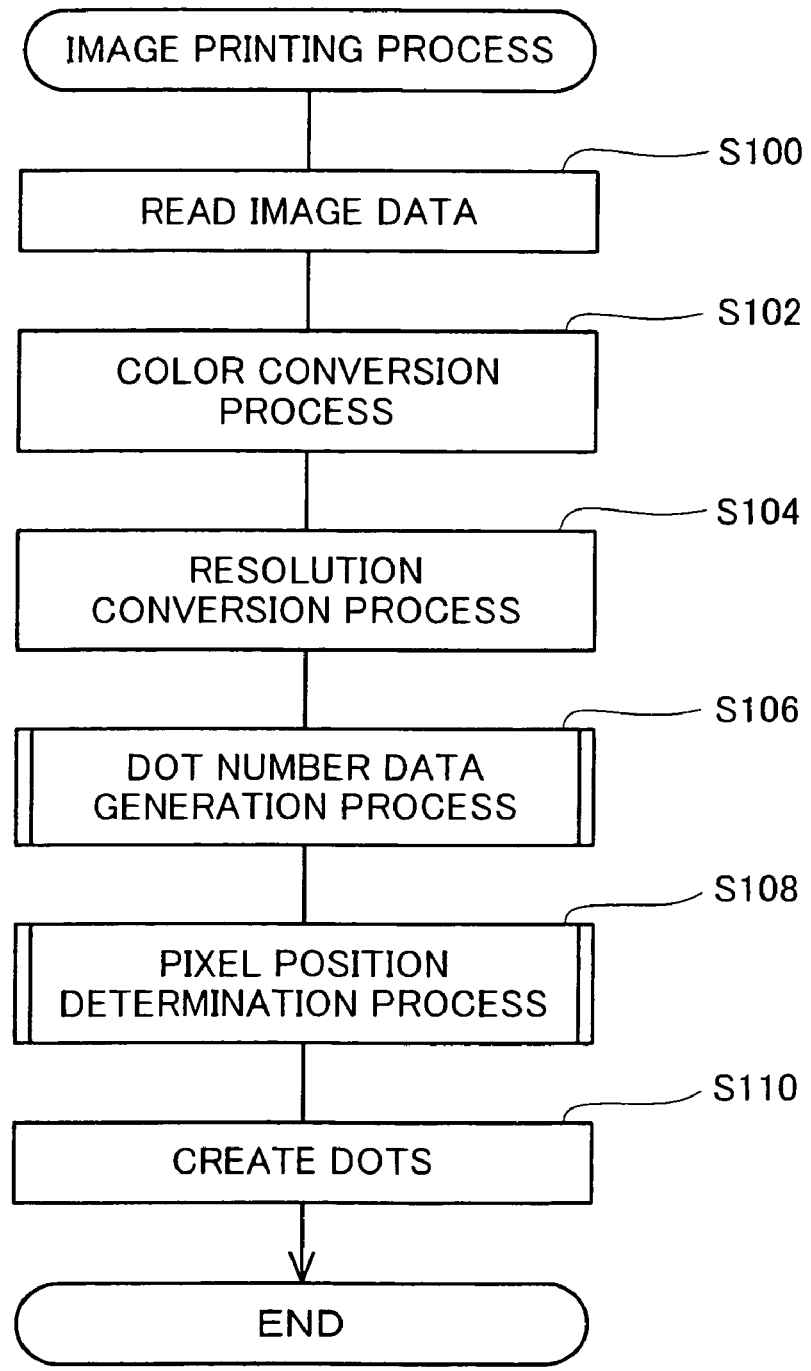
FIG. 5 is a flowchart showing the general flow of an image printing process executed in the first embodiment.

FIG. 5 is a flowchart showing the general flow of the image printing process executed in the first embodiment. The general flow of the image printing process is described briefly with reference to the flowchart of FIG. 5. In the image printing process of the first embodiment, the computer 100 first reads object image data to be processed (step S100). The object image data input here is RGB color image data. The technique of this embodiment is, however, not restricted to color image data and a color printer, but is also applicable to monochromatic image data and a monochromatic printer.

The input color image data goes through a color conversion process (step S102). The color conversion process converts the RGB color image data expressed by combinations of tone values of the colors R, G, and B into image data expressed by combinations of tone values of respective color inks used for printing. As mentioned above, the printer 200 prints each image with the four color inks C, M, Y, and K. The color conversion process of the first embodiment accordingly converts the image data expressed by the tone values of the colors R, G, and B into image data expressed by the tone values of the four color inks C, M, Y, and K. A concrete procedure of color conversion refers to a three-dimensional numerical table called a color conversion table (LUT). The LUT stores in advance the tone values of the respective colors C, M, Y, and K in relation to the RGB color image data. The processing of step S102 refers to this LUT to quickly achieve color conversion of the input RGB color image data into image data of the respective color inks C, M, Y, and K.

On completion of the color conversion process, the color-converted image data goes through a resolution conversion process (step S104). The resolution conversion process converts the resolution of the image data into a resolution for printing with the printer 200 (printing resolution). The resolution conversion process generates new image data between adjacent pixels by interpolation, when the resolution of the image data is lower than the printing resolution. The resolution conversion process skips out existing image data at a preset rate, on the other hand, when the resolution of the image data is higher than the printing resolution. In this manner, the resolution of the image data is made equal to the printing resolution.

On completion of conversion into the printing resolution, the computer 100 starts a dot number data generation process (step S106), which will be described in detail later and is explained only briefly here. The dot number data generation process collects every preset number of adjacent pixels to a pixel group and accordingly divides one image into multiple pixel groups. The dot number data generation process then generates dot number data representing the number of dots to be created in each pixel group. In general, the dot on-off state of each pixel is determined according to the image data of the pixel. The dot number data representing the number of dots to be created in each pixel group is thus generated according to image data of the respective pixels included in the pixel group. The dot number data generated with regard to each pixel group is then output to the color printer 200. In this manner, the dot number data generation process generates dot number data with regard to each pixel group according to the image data of the respective pixels included in the pixel group and supplies the generated dot number data to the color printer 200.

The internal CPU of the control circuit 260 included in the color printer 200 receives the dot number data supplied from the computer 100 and starts a pixel position determination process (step S108), which will be described in detail later and is explained only briefly here. The dot number data supplied from the computer 100 represents the number of dots to be created in each pixel group but does not include information on the positions of dot-on pixels in the pixel group. For printing an image, it is required to determine the positions of dot-on pixels in each pixel group from the supplied dot number data. The control circuit 260 stores a preset order of probability of dot creation among respective pixels in each pixel group, that is, a preset priority order of pixels representing a sequence of dot creation among respective pixels in each pixel group. The pixel position determination process refers to the preset priority order of dot creation and determines the positions of dot-on pixels according to the received dot number data.

After determination of the positions of dot-on pixels, the printer 200 actually creates dots in the determined positions of dot-on pixels (step S110). The printer 200 repeats the main scans and the sub-scans of the carriage 240 and drives the ink ejection heads to eject ink droplets and create ink dots on the printing paper, as described above with reference to FIG. 3. The creation of ink dots gives a resulting printed image according to the image data.

In the image printing process of the first embodiment, the computer 100 supplies only the dot number data representing the number of dots to be created in each pixel group to the color printer 200, but does not transmit the dot on-position data representing the positions of dot-on pixels in each pixel group. The dot number data representing the number of dots to be created in each pixel group of multiple pixels occupies a significantly low data volume, compared with the conventional dot state data representing the dot on-off state in the respective pixels of an image. Application of this method thus advantageously enables extremely high-speed data transmission from the computer 100 to the printer 200.

For example, it is assumed that each pixel group consists of 8 pixels and that only one type of dots is creatable to express an image. In this case, each pixel takes one of two states, that is, the dot-on state and the dot-off state, and is expressible by a data length of 1 bit. The dot on-position data representing the positions of dot-on pixels among all the pixels included in each pixel group accordingly requires a data length of 8 bits. The number of dots to be created in each pixel group, on the other hand, takes one of nine values in a range of 0 to 8 and is expressible by a data length of 4 bits. The dot number data representing the number of dots to be created in each pixel group accordingly has a significantly lower data volume than the dot state data representing the dot on-off state of the respective pixels included in the pixel group. Application of the dot number data thus enables extremely high-speed data transfer from the computer 100 to the color printer 200.

The supply of only the dot number data does not result in a significant deterioration of the picture quality, as long as the positions of the dot-on pixels are adequately determined according to the received dot number data. Especially under some specific conditions, the supply of the dot number data has the equivalent results to those in the supply of the dot state data representing the dot on-off state of each pixel.

Application of a certain algorithm described later enables remarkably easy and extremely high-speed generation of dot number data. The dot number data generation process does not essentially require an image processing device of a high throughput, for example, the computer 100, but is sufficiently executable even by an image processing device of a relatively low throughput, for example, the digital camera 120 or the color printer 200. Image data taken with the digital camera 120 may directly be transferred to the color printer 200 to be printed as a high-quality color image.

B-3. Principle of Determining Positions of Dot-On Pixels According to Dot Number Data In the image printing process of the first embodiment, the computer 100 supplies the dot number data representing the number of dots to be created in each pixel group to the color printer 200. The color printer 200 determines the positions of dot-on pixels based on the received dot number data. This method gives a high-quality printed image without deteriorating the picture quality as described below.

The dither technique is described first for the better understanding. The dither technique is a typical method applied to convert image data to dot state data representing the dot on-off state of individual pixels. This technique uses a matrix of threshold values called a dither matrix and compares the tone value of image data in each pixel with a threshold value set at the corresponding pixel position in the dither matrix. The pixel having the tone value of image data equal to or greater than the threshold value is determined as a dot-on pixel, whereas the pixel having the tone value of image data smaller than the threshold value is determined as a dot-off pixel. The comparison between the tone value of the image data and the threshold value is made with regard to all the pixels included in an image to convert the image data into the dot state data representing the dot on-off state of individual pixels.

Figure 6:
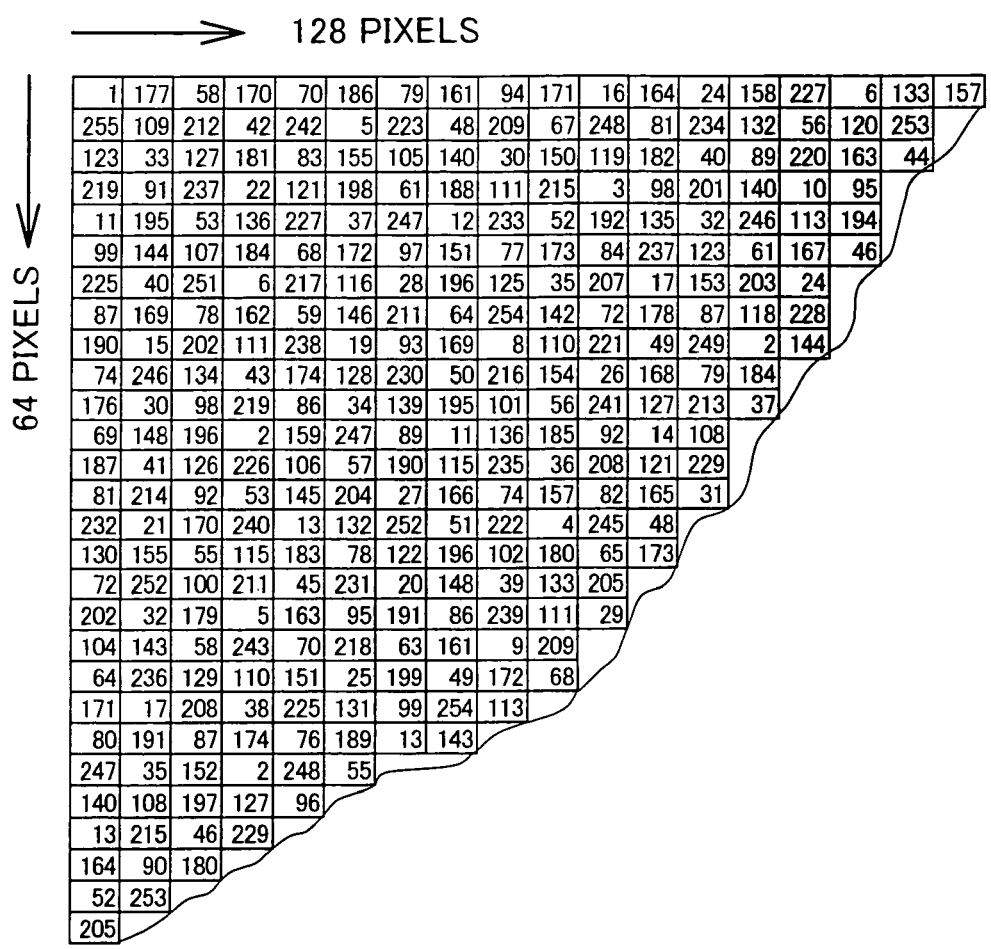
FIG. 6 conceptually shows part of a dither matrix as an example.

FIG. 6 conceptually shows part of a dither matrix as an example. The dither matrix of this illustrated example is defined by 128 pixels in a horizontal direction (main scanning direction) and 64 pixels in a vertical direction (sub-scanning direction) and accordingly has the total of 8192 pixels. Threshold values evenly selected in a tone value range of 1 to 255 are set and stored at random in the 8192 pixels of the dither matrix. The threshold values of the dither matrix are selected in the tone value range of 1 to 255, since the image data to be processed in this embodiment is 1-byte data having tone values in a range of 0 to 255 and the pixel having the tone value of the image data equal to the threshold value is determined as a dot-on pixel.

When the dot-on pixel is restricted to pixels having tone values of image data greater than the threshold values (that is, when the pixel having the tone value of the image data equal to the threshold value is determined as a dot-off pixel), any pixel having a threshold value equal to the maximum tone value of the image data is consistently determined as a dot-off pixel. In order to avoid this constant dot-off state, the selectable range of the threshold values is set to the tone value range of the image data other than the maximum tone value. When the pixel having the tone value of the image data equal to the threshold value is determined as a dot-on pixel, on the other hand, any pixel having a threshold value equal to the minimum tone value of the image data is consistently determined as a dot-on pixel. In order to avoid this constant dot-on state, the selectable range of the threshold values is set to the tone value range of the image data other than the minimum tone value. In this embodiment, the tone value range of the image data is 0 to 255 and the pixel having the tone value of the image data equal to the threshold value is determined as a dot-on pixel. The selectable range of the threshold values is thus set to the tone value range of 1 to 255. The dimensions of the dither matrix are not restricted to those of FIG. 6 but may be set arbitrarily. The dither matrix may be a rectangular matrix having different numbers of horizontal pixels and vertical pixels or may be a square matrix having identical numbers of horizontal pixels and vertical pixels.

Figure 7:
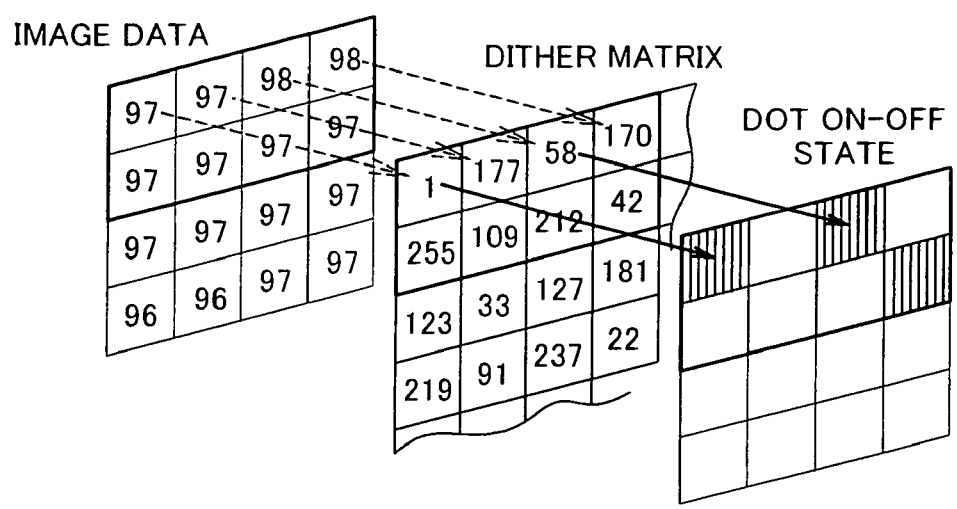
FIG. 7 conceptually shows determination of the dot on-off state in respective pixels with according to a dither matrix.

FIG. 7 conceptually shows determination of the dot on-off state in respective pixels according to a dither matrix. The dot on-off state determination process selects each pixel as an object to be processed and compares the tone value of image data in the selected object pixel with a threshold value stored at the corresponding pixel position in the dither matrix. The arrows of the thin broken line in FIG. 7 conceptually represent comparison between the tone value of image data in each pixel and the threshold value stored at the corresponding pixel position in the dither matrix. For example, at a pixel of an upper left corner, the tone value of image data is 97 and the threshold value of the dither matrix is 1. The upper left pixel has the greater tone value than the threshold value and is thus determined as a dot-on pixel. The arrows of the solid line in FIG. 7 conceptually represent determination of dot-on pixels and storage of the determination results into a memory. At an adjacent pixel on the right side of the upper left pixel, the tone value of image data is 97 and the threshold value of the dither matrix is 177. The right adjacent pixel has the smaller tone value than the threshold value and is thus determined as a dot-off pixel. The dither technique refers to the dither matrix to determine the dot on-off state of respective pixels in this manner and thereby converts the image data into the dot state data representing the dot on-off state of individual pixels.

FIGS. 8a through 8d show conversion of image data into dot state data by the dither technique. FIG. 8a shows part of image data. Each small square represents one pixel, and a numeral shown in each small square represents the tone value of image data in the pixel. As shown in FIG. 8a, adjacent pixels tend to have similar or identical tone values of image data. The high-definition demand naturally increases the resolution of image data. The increased resolution of image data causes the higher tendency of allocating similar or identical tone values to adjacent pixels.

FIG. 8b shows threshold values set at the corresponding pixel positions in part of a dither matrix. Comparison between the tone value of the image data shown in FIG. 8a and the threshold value of the dither matrix shown in FIG. 8b with regard to each pixel determines the dot on-off state of the pixel. FIG. 8c shows determination results of the dot on-off state of the respective pixels. The hatched squares represent pixels determined as dot-on pixels.

The image printing process of the first embodiment collects a preset number of adjacent pixels to one pixel group and counts the number of pixels determined as dot-on pixels in the pixel group. For example, the procedure collects the total of 8 pixels, that is, 4 pixels in the main scanning direction (horizontal pixels in FIG. 8a) by 2 pixels in the sub-scanning direction (vertical pixels in FIG. 8a), to one pixel group. FIG. 8d shows dot number data obtained by counting the number of pixels determined as dot-on pixels in each pixel group. The data transferred from the computer 100 to the color printer 200 in the image printing process of the first embodiment is the dot number data with regard to respective pixel groups. The dot number data does not directly include information on the positions of dot-on pixels. The color printer 200 restores the information on the positions of dot-on pixels from the received dot number data and generates the dot state data representing the dot on-off state of individual pixels.

FIGS. 9a through 9d show generation of dot state data representing the dot on-off state of individual pixels from dot number data. FIG. 9a shows dot number data obtained as FIG. 8d by counting the number of dots to be created in each pixel group. FIG. 9b shows a dither matrix referred to for determination of the dot on-off state of respective pixels in FIG. 8c. As mentioned above, the dither technique compares the tone value of image data in each pixel with the threshold value set at the corresponding pixel position in the dither matrix. The pixel having the tone value of image data equal to or greater than the threshold value is determined as a dot-on pixel. The pixel having the smaller threshold value of the dither matrix has the higher probability of dot creation. Namely the threshold values of the dither matrix specify the priority order of dot-on pixels.

By taking advantage of this characteristic of the dither matrix, the positions of dot-on pixels in each pixel group can be determined from the dot number data representing the number of dots to be created in the pixel group. The number of dots to be created in a pixel group of an upper left corner is 3 in the illustrated example of FIG. 9a. The dither matrix of FIG. 9b shows that an upper left pixel in this upper left pixel group has a threshold value '1' and thereby the highest probability of dot creation. It is thus fair assumption that the upper left pixel is a dot-on pixel for one of the three dots to be created in this upper left pixel group. In a similar manner, the remaining two dots are to be created in a pixel having the second highest probability of dot creation (that is, a pixel having a threshold value '42' in the dither matrix of FIG. 9b) and in a pixel having the third highest probability of dot creation (that is, a pixel having a threshold value '58' in the dither matrix of FIG. 9b) in this upper left pixel group.

The dot on-off state of each pixel depends upon the tone value of image data in the pixel, as well as upon the threshold value set at the corresponding pixel position in the dither matrix. A pixel having an extremely large tone value of image data may be determined as a dot-on pixel, prior to a pixel having a smaller threshold value. As mentioned above, however, the adjacent pixels tend to have similar or identical tone values of image data. In most cases, the priority order of dot-on pixels is thus consistent with the order of pixels having the higher probability of dot creation (that is, pixels having the smaller threshold values set in the dither matrix).

In this manner, the positions of dot-on pixels are determined in each of the other pixel groups shown in FIG. 9a, based on the dot number data and the threshold values set in the dither matrix. The number of dots to be created in a pixel group immediately below the upper left pixel group (that is, a second upper left pixel group) is 3 in the illustrated example of FIG. 9a. Reference to the dither matrix of FIG. 9b determines the positions of three dot-on pixels as a pixel having a threshold value '22', a pixel having a threshold value '33', and a pixel having a threshold value '91'.

FIG. 9c shows the positions of dot-on pixels determined from the dot number data with regard to the four pixel groups included in the example of FIG. 9a. The hatched squares in FIG. 9c represent the determined positions of dot-on pixels. As clearly shown by the comparison between FIG. 9c and FIG. 8c, the positions of dot-on pixels determined from the dot number data perfectly match with the positions of pixels determined as dot-on pixels in each pixel group. As mentioned above, the image printing process of the first embodiment refers to the dither matrix to determine the dot on-off state in respective pixels of each pixel group and stores only the dot number data representing the number of dots to be created in each pixel group without the information on the positions of dot-on pixels. The perfect matching proves that the information on the positions of dot-on pixels is accurately restorable from the dot number data and the threshold values set in the dither matrix. In the image printing process of the first embodiment, the color printer 200 receives the dot number data representing the number of dots to be created in each pixel group from the computer 100 and determines the positions of dot-on pixels from the received dot number data. This technique adequately determines the positions of dot-on pixels and gives a resulting printed image without deteriorating the picture quality.

The positions of dot-on pixels from the dot number data are determinable accurately under the condition that the tone values of image data are not significantly different among the pixels in each pixel group. As mentioned above, the adjacent pixels generally have similar tone values of image data. This condition is thus satisfied in most cases. The simple transfer of only the dot number data from the computer 100 to the printer 200 enables a resulting printed image to have sufficiently high picture quality.

Upon satisfaction of the following two conditions, the positions of dot-on pixels determined from the dot number data perfectly match with the determination result of the dot on-off state of respective pixels based on the comparison between the tone values of image data and the threshold values of the dither matrix. The first condition is that the respective pixels included in one pixel group have identical tone values. The second condition is that the dither matrix referred to by the computer 100 for determination of the dot on-off state of individual pixels is identical with the dither matrix referred to by the color printer 200 for determination of the positions of dot-on pixels from the dot number data.

The dither technique compares the tone value of image data in each pixel with the threshold value set at the corresponding pixel position in the dither matrix and determines the dot on-off state of the pixel based on the result of the comparison, as described above with reference to FIG. 7. The process of determining the positions of dot-on pixels in each pixel group from the dot number data sequentially selects pixels having the smaller threshold values of the dither matrix in the pixel group and specifies the selected pixels as dot-on pixels in the pixel group, as described above with reference to FIGS. 9a through 9c. Namely the determination of the positions of dot-on pixels does not need the threshold values themselves but requires only the order of probability of dot creation in each pixel group. The dither matrix of FIG. 9b may thus be replaced by a matrix of FIG. 9d where values (ordinal numbers) representing the priority order of dot creation are set in respective pixels of each pixel group (in the specification hereof, such a matrix is called a priority order matrix). The modified processing flow of the image printing process refers to the priority order matrix with regard to each pixel group and determines the positions of dot-on pixels in the pixel group from the dot number data.

B-4. Dot Number Data Generation Process of First Embodiment

Figure 10:
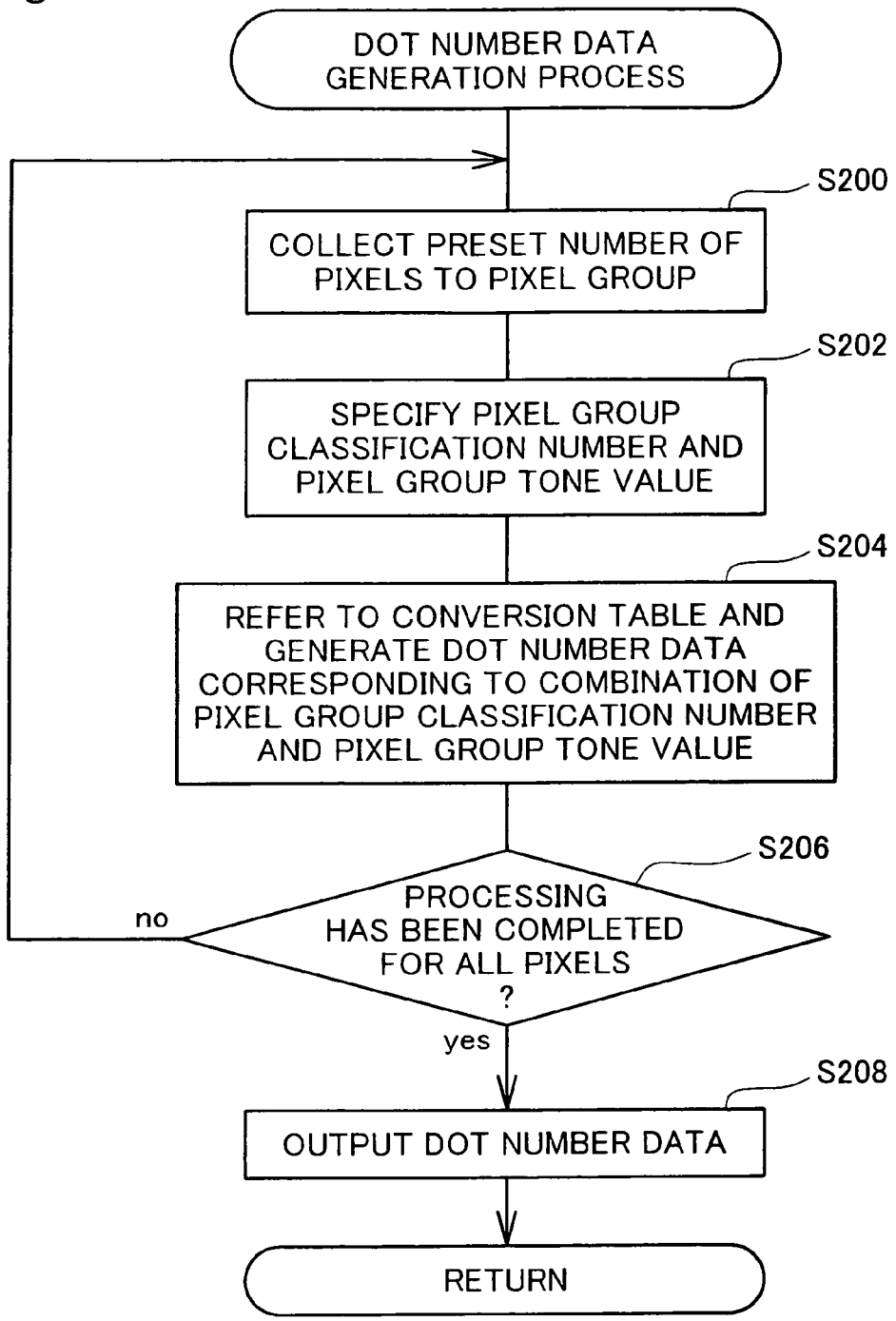
FIG. 10 is a flowchart showing the details of a dot number data generation process executed in the first embodiment.

The dot number data generation process of the first embodiment is executed at step S106 to generate dot number data from image data in the image printing process of the first embodiment shown in FIG. 5. FIG. 10 is a flowchart showing the details of the dot number generation process executed in the first embodiment. The following description regards the dot number data generation process executed by the computer 100. The dot number data generation process is, however, extremely simple as described later and is thus executable in the color printer 200 or in the digital camera 120.

The dot number data generation process of the first embodiment first collects a preset number of adjacent pixels included in an object image to one pixel group (step S200). For example, the pixel group includes the total of 8 pixels, that is, 4 pixels in the main scanning direction by 2 pixels in the sub-scanning direction. The pixels collected to one pixel group may not be included in a rectangular range defined by straight horizontal and vertical sides, but may be any adjacent pixels having a preset positional relation.

The dot number data generation process subsequently specifies a pixel group classification number and a pixel group tone value of the pixel group (step S202). The pixel group classification number is readily specified and allocated to each pixel group according to a method described later. The pixel group tone value of each pixel group is also easily specified, for example, as an average of tone values allocated to respective pixels in the pixel group, as a tone value most frequently allocated to pixels included in the pixel group, or as a tone value allocated to a pixel at a predetermined position in the pixel group.

The dot number data generation process refers to a conversion table (described later) and generates dot number data corresponding to the combination of the specified pixel group classification number and the specified pixel group tone value (step S204). The conversion table stores the dot number data correlated to each combination of the pixel group classification number and the pixel group tone value as described later in detail. Upon specification of the pixel group classification number and the pixel group tone value, the dot number data can readily be generated by simply referring to the conversion table as described later in detail.

After generation of the dot number data with regard to the pixel group, the dot number data generation process determines whether the processing has been completed for all the pixels included in the object image (step S206). When there is still any unprocessed pixel (step S206: No), the dot number data generation process returns to step S200 to specify another pixel group and repeats the subsequent series of processing. When the processing has been completed for all the pixels included in the object image (step S206: Yes) through the repetition of this processing flow, the computer 100 outputs the dot number data generated with regard to the individual pixel groups to the color printer 200 (step S208) and terminates the dot number data generation process of the first embodiment shown in FIG. 10.

B-5. Method of Specifying Pixel Group Classification Number

The dot number data generation process of the first embodiment adopts the following method to specify the pixel group classification number to be allocated to each pixel group. The description first regards the principle of specifying the pixel group classification number of each pixel group and then the concrete method of allocating the pixel group classification number to each pixel group.

Figure 11A:
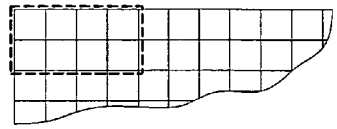
FIGS. 11a through 11c show the principle of specifying a pixel group classification number to be allocated to each pixel group.
Figure 11B:
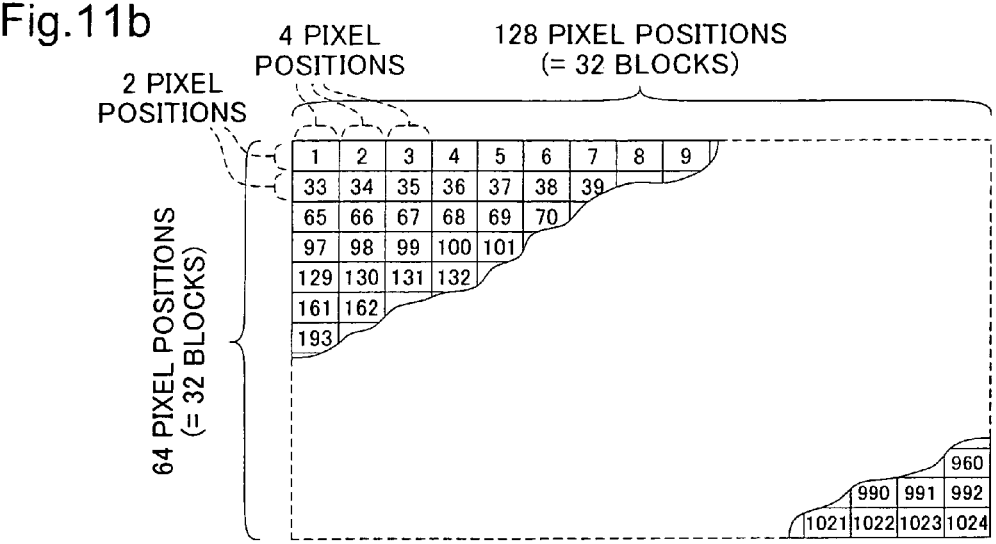
Figure 11C:
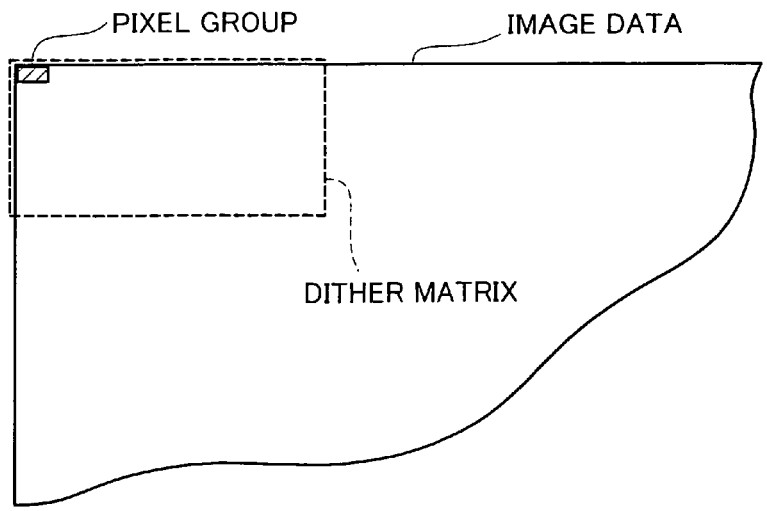

FIGS. 11a through 11c show the principle of specifying the pixel group classification number of each pixel group. In the illustrated example of FIG. 11a, one pixel group at an upper left corner of an image is set by collecting the total of 8 pixels, that is, 4 pixels in the horizontal direction and 2 pixels in the vertical direction.

As described above, the dither technique compares the tone value of image data in each pixel with the threshold value set at the corresponding pixel position in the dither matrix and determines the dot on-off state of the pixel. The procedure of this embodiment collects a preset number of adjacent pixels to one pixel group and similarly collects the same preset number of threshold values set in the dither matrix to one block corresponding to the pixel group. FIG. 11b shows division of the threshold values set in the dither matrix of FIG. 6 by collecting 4 threshold values in the horizontal direction and 2 threshold values in the vertical direction to each block. The dither matrix of FIG. 6 stores the threshold values set in 8192 pixel positions defined by 128 pixel positions in the horizontal direction (in the main scanning direction) and 64 pixel positions in the vertical direction (in the sub-scanning direction). Collection of 4 threshold values in the horizontal direction and 2 threshold values in the vertical direction divides the dither matrix into the total of 1024 blocks, that is, 32 blocks in both the horizontal direction and the vertical direction.

As shown in FIG. 11b, serial numbers of 1 to 1024 are allocated to these 1024 blocks. Each pixel group of image data is classified by the serial number of the corresponding block in the dither matrix applied at the position of the pixel group. For example, the block with the serial number '1' shown in FIG. 11b is applied to the pixel group of the upper left corner in the image as shown in FIG. 11c. This upper left pixel group is thus classified as a pixel group of the serial number '1'.

This is the basic idea of classifying each pixel group. The dot number data generation process of FIG. 10 classifies each pixel group of image data by the serial number of the corresponding block in the dither matrix applied to the pixel group and specifies the pixel group classification number to be allocated to the classified pixel group at step S202.

FIGS. 12a through 12d show a method of computing the classification number of an object pixel group. One pixel group set in an image as the object pixel group is shown in FIG. 12a. The method of computing the classification number is described with regard to this object pixel group.

An upper left corner of the image is set to the origin, and each pixel position is expressed by the numbers of pixels apart from the origin in both the main scanning direction and the sub-scanning direction. The position of each pixel group is represented by the position of a pixel at an upper left corner in the pixel group. The position of the upper left pixel representing the position of the object pixel group is shown by a closed circle in FIG. 12a. The position of this upper left pixel is defined as (X,Y). Each pixel group has the size of 4 pixels in the main scanning direction and 2 pixels in the sub-scanning direction. There are accordingly 'n' and 'm' ('n' and 'm' are positive integers including 0) to satisfy:

$$X=4n+1$$

$$Y=2m+1$$

This means that 'n' pixel groups are present on the left of the object pixel group and 'm' pixel groups are present above the object pixel group.

As described above, each pixel group of image data is classified by the serial number of the corresponding block in the dither matrix applied at the position of the pixel group (see FIGS. 11a through 11c). The classification number allocated to each pixel group depends upon the method of shifting the dither matrix for application on the image data. Namely different shifting methods may allocate different classification numbers to an identical pixel group. Although any of various techniques may be adopted to shift the dither matrix for application on the image data, the simplest method of shifting the dither matrix in the horizontal direction is adopted here for the convenience of explanation. FIG. 12b conceptually shows repeated application of the same dither matrix onto the image data with successive positional shifts of the dither matrix in the horizontal direction.

FIG. 12c conceptually shows application of the dither matrix onto the object pixel group set in FIG. 12a in the course of repeated application of the dither matrix as shown in FIG. 12b. One of the blocks in the dither matrix, which is shifted horizontally on the image data, is applied at the position of the object pixel group. It is here assumed that a block of an M-th row and N-th column in the dither matrix is applied onto the object pixel group. As shown in FIG. 12a, 'n' pixel groups are present on the left of the object pixel group and 'm' pixel groups are present above the object pixel group. The values N and M are accordingly expressed as:

$$N=n-\text{int}(n/32)\times32+1$$

$$M=m-\text{int}(m/32)\times32+1$$

where 'int' denotes an operator of dropping the figures after the decimal point and rounding down the value to the nearest integer. The arithmetic operation int(n/32) drops the figures after the decimal point and rounds down the value of n/32 to the nearest integer. The values M and N are computable from the above relational expressions (FIG. 12d) upon specification of the position of the object pixel group. The serial number allocated to the block of the M-th row and the N-th column in the dither matrix is given as the classification number of the object pixel group. The classification number of the object pixel group is, however, specifiable by the significantly simpler method without the computation of FIG. 12d as described below.

FIG. 13 shows a concrete procedure of specifying the classification number of the object pixel group. The position of the object pixel group is defined by the coordinate values (X,Y), where X and Y are 10-bit data. FIG. 13(a) conceptually shows 10-bit binary data representing the value X. For the purpose of bit discrimination, serial numbers of 1 to 10 are sequentially allocated to the upper-most bit to the lower-most bit.

As described above with reference to FIGS. 12a through 12d, the number 'n' of pixel groups present on the left of the object pixel group is obtained by subtracting 1 from the value X and dividing the result of the subtraction by 4. The division by 4 is equivalent to a rightward shift by 2 bits. The required calculation thus subtracts 1 from the value X and shifts the obtained binary data rightward by 2 bits. The value X is not an arbitrary value but takes only a numerical value expressible as (4n+1). A simple rightward shift of the binary data by 2 bits without the subtraction of 1 accordingly determines the number 'n' of pixel groups. FIG. 13(b) conceptually shows binary data of the number 'n' obtained by the bit shift of the binary data of the value X.

The arithmetic operation int(n/32) is then performed to divide the number 'n' by 32 and drop the figures after the decimal point. The division by 32 is equivalent to a rightward shift of the binary data by 5 bits. The calculation of the binary data as an integer automatically drops the figures after the decimal point. Namely the binary data of int(n/32) is obtained by a simple rightward shift of the binary data of the number 'n' by 5 bits. FIG. 13(c) conceptually shows binary data of int(n/32) obtained by the bit shift of the binary data of the number 'n'.

The binary data of int(n/32) is multiplied by 32. The multiplication by 32 is equivalent to a leftward shift of the binary data by 5 bits. FIG. 13(d) conceptually shows binary data of int(n/32)×32 obtained by the bit shift of the binary data of the number 'n'.

Subtraction of the binary data of int(n/32)×32 from the binary data of the number 'n' gives the value N. As clearly understood from the comparison between the binary data of the number 'n' (see FIG. 13(b)) and the binary data of int(n/32)×32 (see FIG. 13(d)), these two binary data have common digits in the upper 5 bits. The binary data of the subtrahend int(n/32)×32 has 0 in all the lower 5 bits. Simple extraction of the lower 5 bits from the binary data of the minuend 'n' accordingly determines the value N. Simple application of mask data shown in FIG. 13(f) on the binary data of the number 'n' (FIG. 13(b)) gives the value N. The value N is also obtainable by applying mask data shown in FIG. 13(g) on the binary data of the value X representing the position of the object pixel group (FIG. 13(a)) and directly extracting $4^{th}$ to $8^{th}$ bit data.

The above description with reference to FIG. 13 regards the process of determining the value N representing the block position in the dither matrix from the value X of the coordinates (X,Y) representing the position of the object pixel group. In a similar manner, the value M representing the block position in the dither matrix is determined from the value Y. Upon specification of the position of the object pixel group, simple extraction of bit data from specified bits of the binary data identifies the ordinal numbers of the row and the column of the block in the dither matrix corresponding to the object pixel group. The classification number of the object pixel group is thus readily specified by the serial number of the corresponding block.

As described above with reference to the flowchart of FIG. 10, the dot number data generation process of the first embodiment refers to the conversion table and generates the dot number data corresponding to the combination of the pixel group classification number and the pixel group tone value (step S204). The conversion table referred to for generation of the dot number data is described below.

Figure 14:
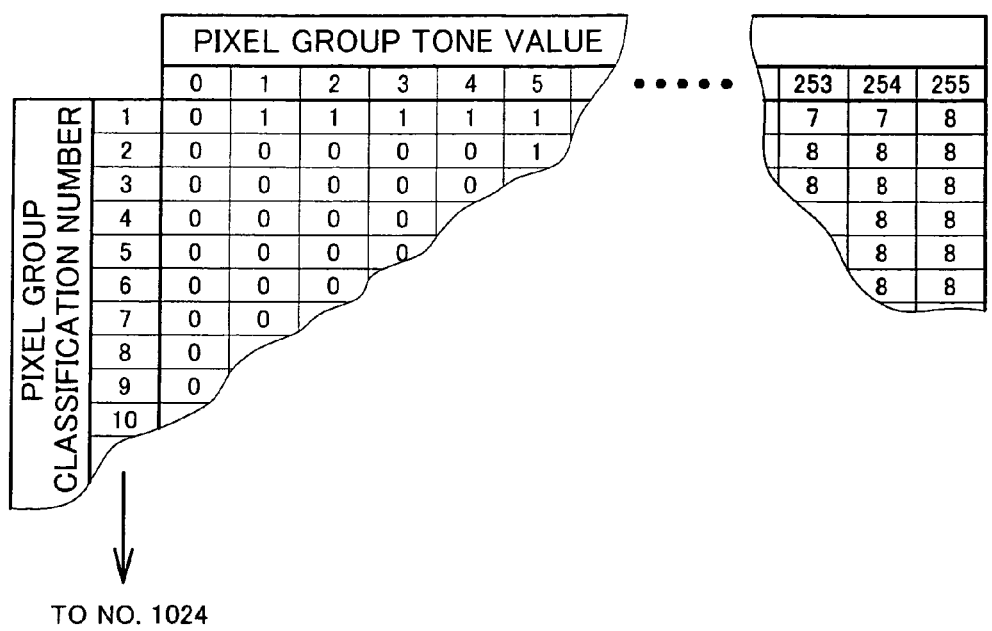
FIG. 14 conceptually shows a conversion table referred to for generation of dot number data corresponding to each combination of the pixel group classification number and a pixel group tone value.

FIG. 14 conceptually shows a conversion table referred to for generation of dot number data corresponding to the combination of the pixel group classification number and the pixel group tone value. As illustrated, the conversion table stores dot number data allocated to each combination of the pixel group classification number and the pixel group tone value. Each pixel group has the pixel group classification number in the range of 1 to 1024 as described above with reference to FIGS. 11a through 11c and the pixel group tone value in the range of 0 to 255. There are accordingly 1024×256=262144 combinations of the pixel group classification number and the pixel group tone value. The conversion table stores the dot number data correlated to all these combinations. The dot number data is generated by the following procedure.

Figure 15:
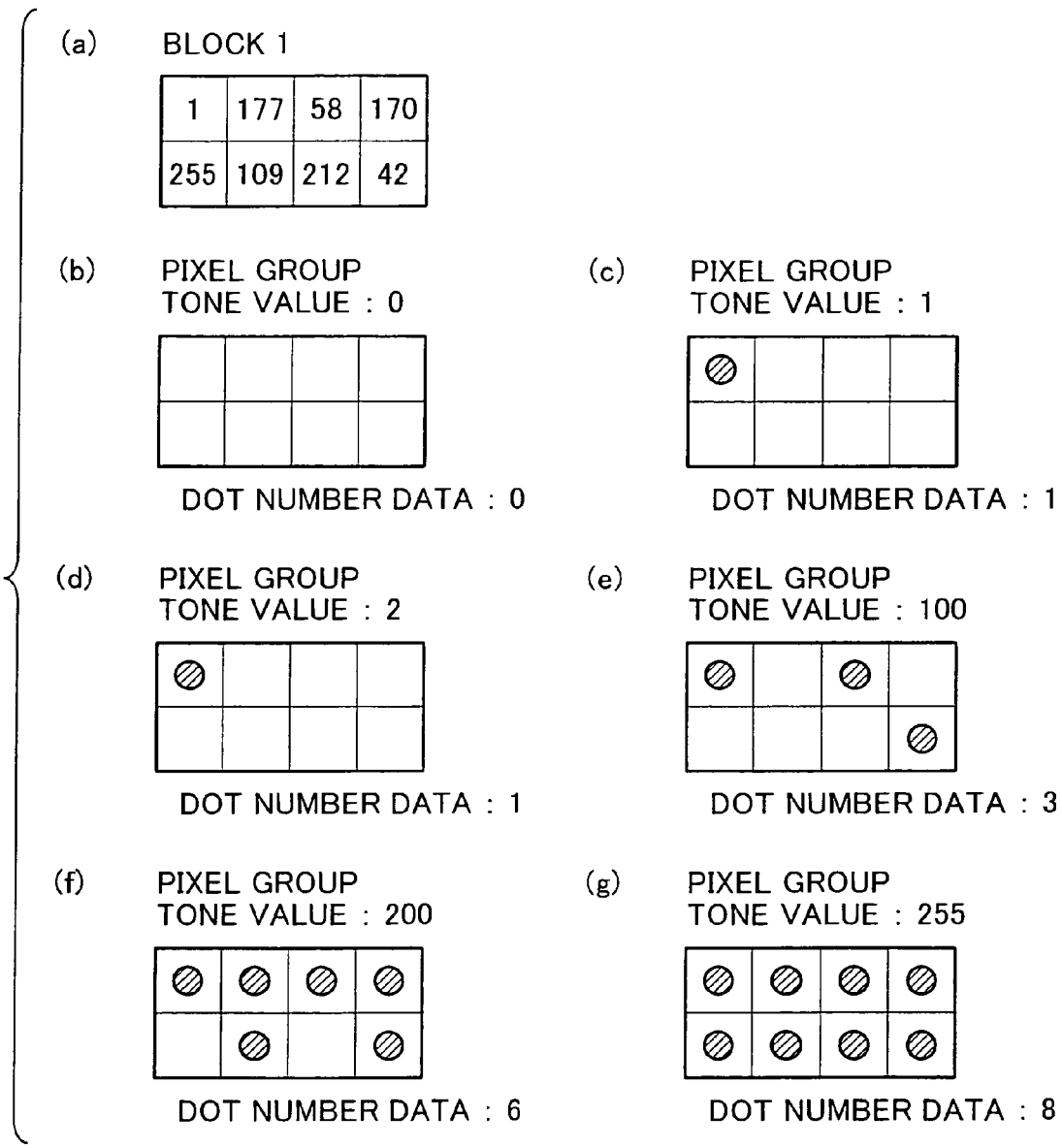
FIG. 15 conceptually shows generation of dot number data corresponding to the combination of the pixel group classification number and the pixel group tone value.

FIG. 15 conceptually shows generation of the dot number data corresponding to the combination of the pixel group classification number and the pixel group tone value. In the illustrated example, the object pixel group has the pixel group classification number '1'. The block of the serial number '1' in the dither matrix is applied to the pixel group having the pixel group classification number '1'. FIG. 15(a) shows the threshold values set in the block of the serial number '1'.

The pixel group is assumed to have the pixel group tone value '0', which means that all the pixels in the pixel group have the image data of the tone value '0'. The tone value '0' of each pixel is compared with the threshold value set at the corresponding pixel position in the block of FIG. 15(a). The pixel having the tone value of the image data greater than or equal to the threshold value is determined as a dot-on pixel. After such determination with regard to all the pixels included in the pixel group, the dot number data is obtained by counting the number of dots to be created in the pixel group. All the threshold values shown in FIG. 15(a) are greater than the tone value '0', and there is no pixel determined as a dot-on pixel. The dot number data '0' is accordingly obtained for the combination of the pixel group classification number '1' and the pixel group tone value '0'. FIG. 15(b) conceptually shows the dot number data obtained for the pixel group tone value '0'. In this case, all the pixels in the pixel group are determined as dot-off pixels, so that the dot number data obtained is equal to '0'.

FIG. 15(c) conceptually shows the dot number data obtained for the pixel group tone value '1', which means that all the pixels in the pixel group have the image data of the tone value '1'. The tone value '1' of each pixel is compared with the threshold value set at the corresponding pixel position in the block of FIG. 15(a). A pixel at an upper left corner in the pixel group has the tone value '1' equal to the threshold value and is thus determined as a dot-on pixel, while all the other pixels are determined as dot-off pixels. The hatched circle in FIG. 15(c) represents determination as a dot-on pixel. The dot number data '1' is thus obtained for the combination of the pixel group classification number '1' and the pixel group tone value '1'.

The dot number data are sequentially obtained by performing this series of operations with regard to all the pixel group tone values 0 to 255. For example, the pixel group tone value '2' gives the tone number data '1' as shown in FIG. 15(d). The pixel group tone value '100' gives the tone number data '3' as shown in FIG. 15(e). FIGS. 15(f) and 15(g) respectively show the dot number data obtained for the pixel group tone value '200' and the pixel group tone value '255'. The dot number data obtained in this manner for the respective pixel group tone values are set in the horizontal column of the pixel group classification number '1' in the table of FIG. 14. This series of operations is performed with regard to all the pixel group classification numbers 1 to 1024. The dot number data is thus obtained for every combination of the pixel group classification number and the pixel group tone value. The conversion table of FIG. 14 sets the dot number data obtained for each combination of the pixel group classification number and the pixel group tone value.

B-6. Pixel Position Determination Process of First Embodiment

Figure 16:
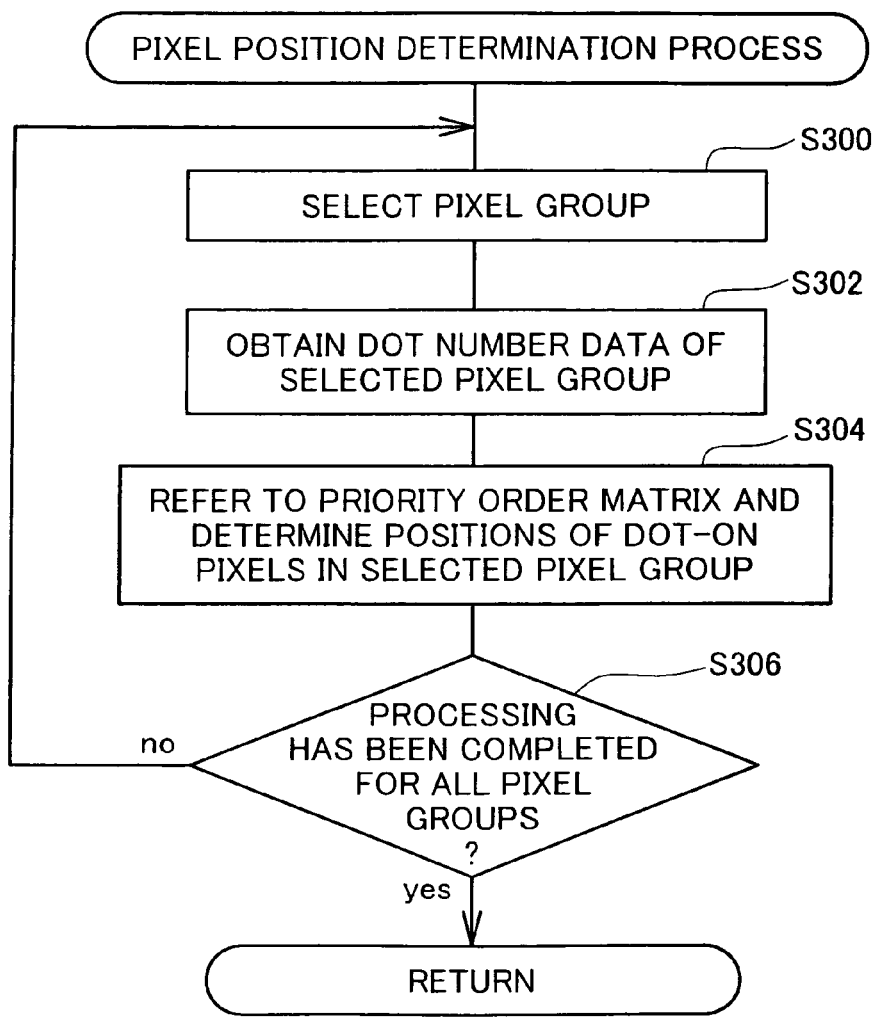
FIG. 16 is a flowchart showing the details of a pixel position determination process executed in the first embodiment.

The pixel position determination process of the first embodiment is executed at step S108 to determine the positions of dot-on pixels in each pixel group according to dot number data in the image printing process of the first embodiment shown in FIG. 5. FIG. 16 is a flowchart showing the details of the pixel position determination process executed in the first embodiment. The internal CPU of the control circuit 260 included in the color printer 200 executes this pixel position determination process. The pixel position determination process of the first embodiment according to the flowchart of FIG. 16 is described with reference to FIGS. 9a through 9c. FIGS. 9a through 9c have been referred to above to explain the principle of determining the positions of dot-on pixels according to dot number data.

The pixel position determination process first selects a pixel group as a processing object (step S300) and obtains the dot number data of the selected pixel group (step S302). For example, the dot number data of FIG. 9a are supplied from the computer 100 to the color printer 200, and a pixel group at an upper left corner in FIG. 9a is selected as the object pixel group to be processed. In this example, the pixel position determination process of FIG. 16 obtains the dot number data '3' of the selected pixel group at step S302.

The pixel position determination process then refers to a priority order matrix and determines the positions of dot-on pixels in the selected pixel group (step S304). The priority order matrix represents the priority order of dot creation among the respective pixels in each pixel group as shown in FIG. 9d. The pixel group at the upper left corner of the image is selected as the object pixel group, and a corresponding block of the priority order matrix (an upper left block of 8 pixels in the priority order matrix of FIG. 9d) is referred to for determination of the positions of dot-on pixels. Since the dot number data of the selected pixel group is equal to '3', the pixel positions having the first to the third highest priorities in the priority order matrix are specified as the positions of dot-on pixels. As shown in the upper left pixel group of FIG. 9c, the three pixel positions, that is, the pixel position at the upper left corner, the right pixel position next but one to the upper left pixel position, and the pixel position on the lower right of the right pixel position, are specified as the positions of dot-on pixels. The positions of dot-on pixels are shown by the hatched squares in FIG. 9c. In this manner, the pixel position determination process of FIG. 16 refers to the priority order matrix and determines the positions of dot-on pixels according to the dot number data at step S304.

The procedure of this embodiment refers to the priority order matrix to determine the positions of dot-on pixels. As mentioned previously with reference to FIGS. 9a through 9d, the dither matrix also specifies the priority order of pixels in each pixel group and may thus be used in place of the priority order matrix.

After determination of the positions of dot-on pixels in the pixel group selected at step S300, the pixel position determination process determines whether the processing has been completed for all the pixel groups (step S306 in FIG. 16). When there is still any unprocessed pixel group (step S306: No), the pixel position determination process returns to step S300 to select another pixel group as a next processing object and repeats the subsequent series of processing. The repetition of this processing flow successively converts the dot number data of FIG. 9a into the dot state data of FIG. 9c representing the positions of dot-on pixels. When the processing has been completed for all the pixel groups (step S306: Yes), the processing flow exits from the pixel position determination process of FIG. 16 and returns to the image printing routine of FIG. 5.

The image printing process of the first embodiment shown in the flowchart of FIG. 5 includes the dot number data generation process (step S106) and the pixel position determination process (step S108) described above in detail. The dot number data generation process collects a preset number of adjacent pixels to one pixel group, specifies the pixel group classification number and the pixel group tone value of the pixel group, and generates the dot number data. Both the pixel group classification number and the pixel group tone value are specified very easily as described above. Upon specification of the pixel group classification number and the pixel group tone value, the dot number data is generated very easily by simply referring to the conversion table. The dot number data has a significantly lower data volume than the conventional dot state data representing the dot on-off state of individual pixels. This enables high-speed data transfer from the computer 100 to the color printer 200. The dot number data readily generated by the dot number data generation process of the embodiment ensures high-speed data transfer and accordingly shortens the total image printing time.

The dot number data generation process of the embodiment simply refers to the conversion table to generate the dot number data corresponding to the readily specified pixel group classification number and pixel group tone value. This processing does not essentially require a device of a high throughput, such as the computer 100, but is executable at a sufficiently practical speed even by a device of a relatively low throughput.

Such extremely simple and easy processing is executable by the hardware configuration of an IC chip with an exclusive logic circuit, instead of as the software configuration by the CPU. Execution by the hardware configuration enables the extremely high-speed processing. In the case of direct connection of the digital camera 120 or another image data generation device to the color printer 200, the dot number data generation process may be executed in the digital camera 120 or the color printer 200 to allow high-speed image printing.

The dot number data generation process of this embodiment generates the dot number data by simply referring to the conversion table and does not require storage of a dither matrix. Storage of the conversion table instead of the dither matrix advantageously saves the memory capacity, since the conversion table has the significantly lower data volume than the dither matrix as described below.

FIG. 17 shows estimation results of data volume of the conversion table under various conditions. The conversion table sets the dot number data for each combination of the pixel group classification number and the pixel group tone value as shown in FIG. 14. The data volume of the conversion table is affected by the variety of the pixel group classification numbers, the available range of the pixel group tone value, and the data length of each dot number data. The variety of the pixel group classification numbers is expressed by the number of blocks as divisions of the dither matrix, and thus depends upon the size of the dither matrix and the size of each pixel group. FIG. 17 shows the estimated data volumes of the conversion table for the respective combinations of various sizes of the dither matrix and various sizes of the pixel group. The estimation of the data volume is based on three different sizes of the dither matrix, that is, 64×64 (64 pixels in the main scanning direction by 64 pixels in the sub-scanning direction), 128×64 (128 pixels in the main scanning direction by 64 pixels in the sub-scanning direction), and 128×128 (128 pixels in the main scanning direction by 128 pixels in the sub-scanning direction). The estimation of the data volume is also based on three different sizes of the pixel group, that is, 2×2 (2 pixels in the main scanning direction by 2 pixels in the sub-scanning direction), 4×2 (4 pixels in the main scanning direction by 2 pixels in the sub-scanning direction), and 4×4 (4 pixels in the main scanning direction by 4 pixels in the sub-scanning direction). The available range of the pixel group tone value is 0 to 255, and the data length of each dot number data is 1 byte.

The estimation result under the conditions corresponding to the above embodiment, that is, 128×64 as the size of the dither matrix and 4×2 as the size of the pixel group, is encircled by the broken line in FIG. 17. The estimation result of the data volume of the conversion table under such conditions is discussed below as a typical example. The block number represents the number of blocks as divisions of the dither matrix, which have the same size as that of the pixel groups. The block number is obtained by dividing the number of pixels in the dither matrix by the number of pixels in each pixel group and is equal to 1024 (=(128×64)/(4×2)) in this example. The calculated block number shows the variety of the pixel group classification numbers included in the conversion table. The pixel group tone value may take one of 256 values in the range of 0 to 255. There are accordingly 1024× 256 combinations of the pixel group classification number and the pixel group tone value. The dot number data having the 1-byte data length is stored for each of these combinations. The data volume of the conversion table is thus estimated to be 256 kilobytes.

As clearly understood from this estimation, the greater size of the dither matrix enhances the variety of the pixel group classification numbers and increases the data volume of the conversion table. The smaller size of the pixel group also enhances the variety of the pixel group classification numbers and increases the data volume of the conversion table. The practical size of the dither matrix used ranges from 64×64 to 128×128. According to the estimation results of FIG. 17, the data volume of the conversion table does not exceed 1 megabyte except extremely special cases and is generally in the range of 256 kilobytes to 512 kilobytes. The dither matrix actually used may have a greater size than the sizes of the dither matrixes for estimation in FIG. 17. Even in such cases, the data volume of the conversion table does not place a significant burden on the memory capacity.

The estimation of FIG. 17 is on the assumption that the data length of each dot number data is 1 byte. The actual data length of each dot number data is, however, less than 1 byte. In the light of this fact, the conversion table has the lower data volume as described below with reference to FIG. 17. Under the conditions encircled by the broken line (that is, under the conditions corresponding to the above embodiment), since each pixel group includes 8 pixels, the number of dots to be created in each pixel group may be varied in a range of 0 to 8, that is, among 9 different states. The 9 different states are expressible by 4 bits. The required data length of each dot number data is accordingly 4 bits. The required data volume of the conversion table under the encircled conditions is thus halved to 128 kilobytes. The second right column in FIG. 17, that is, the column 'number of states/pixel group', shows the number of different states possible for each pixel group, that is, the variation in number of dots to be created in each pixel group. The rightmost column in FIG. 17, that is, the column 'number of used bits' shows the number of bits required for expressing the different states, that is, the required data length of each dot number data.

As mentioned above, on the assumption that each dot number data has the data length of 1 byte, the smaller size of the pixel group requires the higher data volume of the conversion table. As shown in the rightmost column of FIG. 17, the number of used bits decreases with a decrease in size of the pixel group. The estimated data volume of the conversion table on the basis of this fact has a higher reduction rate for the smaller size of the pixel group. When each pixel group has 8 pixels, the data volume of the conversion table is reduced to half by consideration of the number of used bits. When each pixel group has 4 pixels, the data volume of the conversion table is reduced to $3/8$ by consideration of the number of used bits. The actual data volume of the conversion table on the basis of the number of used bits is accordingly lower than the estimation result of FIG. 17. The required data volume of the conversion table is thus generally not higher than 256 kilobytes.

The color conversion table (LUT) referred to in the color conversion process (step S102 in FIG. 5) of the image printing process generally has the data volume of not lower than 1.5 megabytes. The data volume '256 kilobytes' of the conversion table is significantly lower than this high data volume of the color conversion table. The conversion table of the sufficiently low data volume is storable in a typical cache memory of the computer. The data volume of the conversion table referred to in the dot number data generation process executed by the computer 100 accordingly does not place a significant burden on the memory capacity. Even when the dot number data generation process is executed in the imaging device, such as the digital camera 120, or in the color printer 200 in place of the computer 100, this small data volume of 256 kilobytes is suppliable from the existing memory without addition of any exclusive memory. The typical printer currently has a memory capacity of about 10 megabytes for the internal processing. Storage of the conversion table having the data volume of 256 kilobytes does not place a significant burden on the memory capacity.

B-7. Modifications

The image printing process of the first embodiment converts the resolution of image data into a printing resolution, collects every preset number of pixels to one pixel group, and generates dot number data of each pixel group. Another possible procedure of the image printing process may convert the resolution of image data into a lower resolution than the printing resolution and generate dot number data without explicit formation of pixel groups. This procedure is described below as a modified example of the first embodiment.

Figure 18:
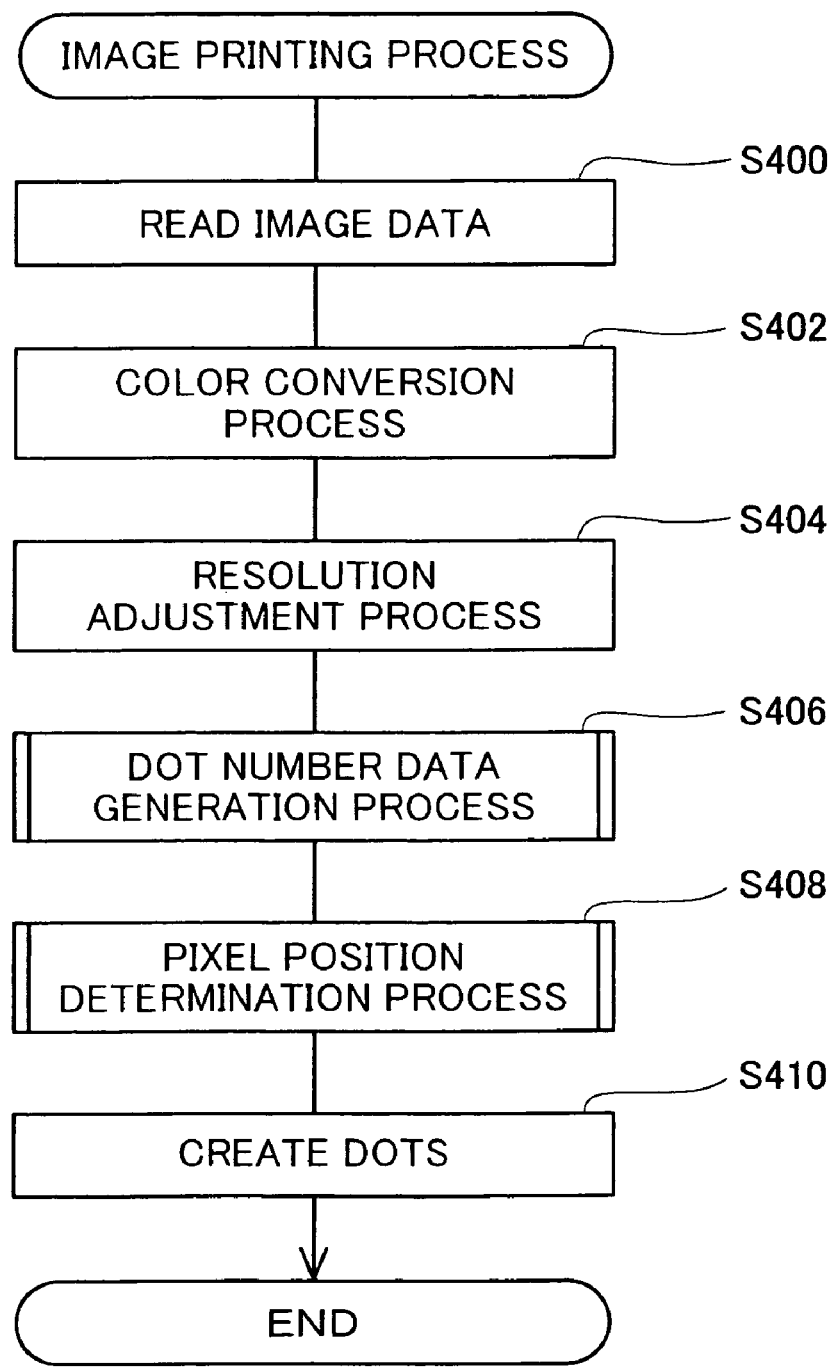
FIG. 18 is a flowchart showing a modified processing flow of the image printing process as a modified example of the first embodiment.

FIG. 18 is a flowchart showing a modified processing flow of the image printing process as a modified example of the first embodiment.

The modified processing flow of the image printing process shown in FIG. 18 has some differences from but is otherwise similar to the general flow of the image printing process of the first embodiment shown in FIG. 5. The differences include conversion of the resolution of image data into a lower resolution than the printing resolution and no explicit formation of pixel groups in the dot number data generation process. The following description mainly regards such differences of the modified processing flow of the image printing process from the general flow of the image printing process of the first embodiment.

Like the image printing process of the first embodiment, the modified image printing process first reads image data (step S400) and performs the color conversion process (step S402).

The modified image printing process then performs a resolution adjustment process to convert the resolution of the color-converted image data into a lower resolution than the printing resolution (step S404). FIGS. 19*a* through 19*c* show the details of the resolution adjustment process. FIG. 19*a* conceptually shows image data after color conversion, FIG. 19*b* conceptually shows image data obtained by the resolution adjustment process, and FIG. 19*c* conceptually shows image data of the printing resolution. As clearly shown by comparison between FIG. 19*b* and FIG. 19*c*, the image data obtained by the resolution adjustment process has the lower resolution than the printing resolution. The image data obtained by the resolution adjustment process has the resolution of ¼ of the printing resolution in the main scanning direction and the resolution of ½ of the printing resolution in the sub-scanning direction. Namely each pixel included in the image data obtained by the resolution adjustment process shown in FIG. 9*b* has a 4-fold dimension in the main scanning direction and a 2-fold dimension in the sub-scanning direction, compared with each pixel included in the image data of the printing resolution shown in FIG. 9*c*.

The subsequent dot number data generation process treats each large pixel of FIG. 19*b* as a pixel group formed by collection of a preset number of pixels in the printing resolution as shown in FIG. 19*c* and generates dot number data. The resolution adjustment process in the modified image printing process converts the resolution of image data to have the size of each pixel after the resolution conversion identical with the size of each pixel group formed by collection of a preset number of pixels in the printing resolution.

Figure 20:
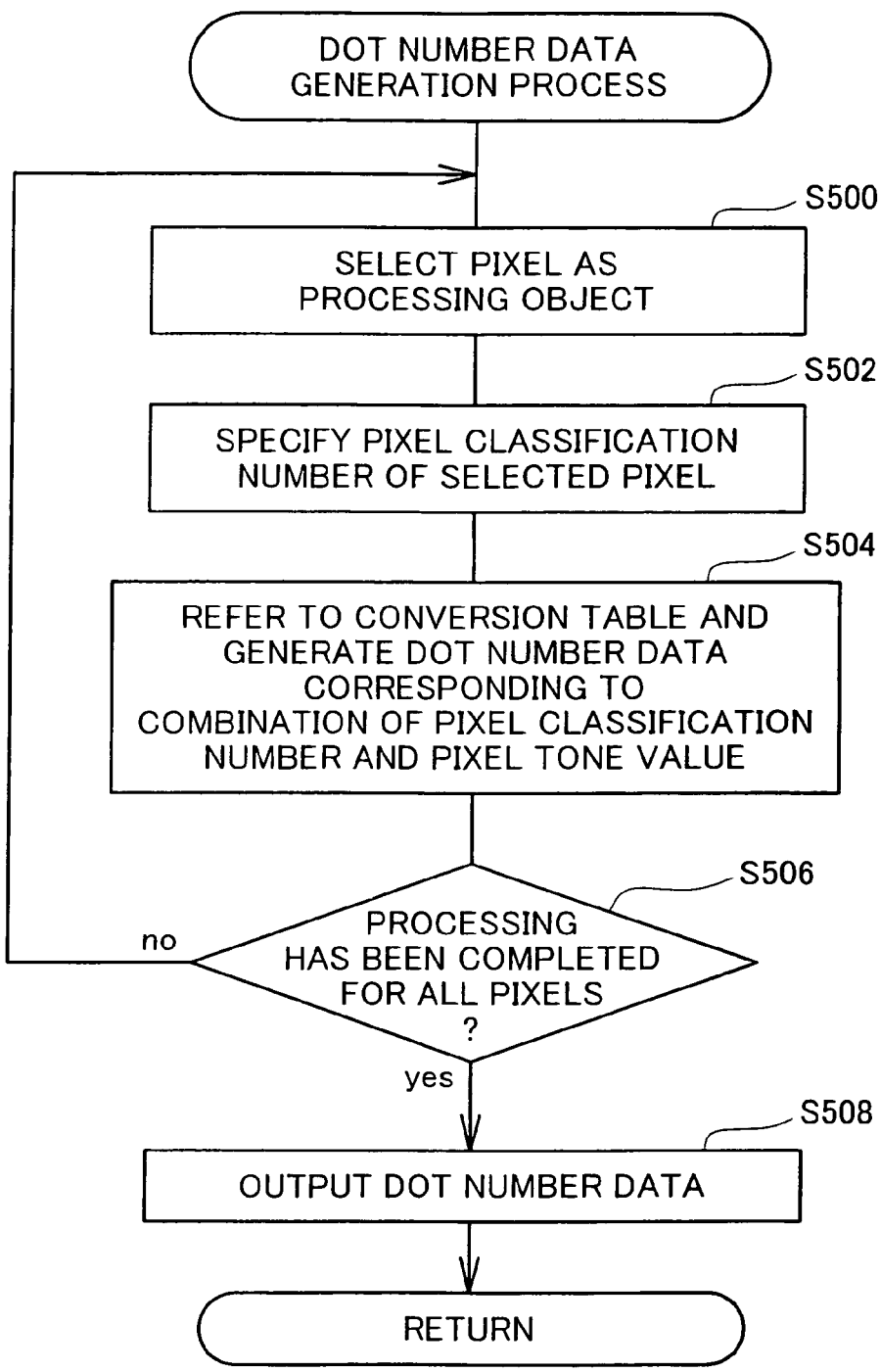
FIG. 20 is a flowchart showing the details of a modified dot number data generation process executed in the modified image printing process.

After adjustment of the resolution of the color-converted image data, the modified image printing process starts a modified dot number data generation process (step S406 in FIG. 18). FIG. 20 is a flowchart showing the details of the modified dot number data generation process executed in the modified image printing process. The modified dot number data generation process first selects a pixel as a processing object in an object image (step S500). The object pixel selected here is greater in size than the pixel in the printing resolution as shown in FIG. 19*b*. The size of the object pixel is identical with the size of each pixel group formed by collection of a preset number of pixels in the printing resolution by the procedure of the first embodiment. The modified dot number data generation process thus treats the selected object pixel as one pixel group in the first embodiment and specifies a pixel classification number of the object pixel (step S502). The pixel classification number is specified according to the procedure of the first embodiment shown in FIG. 11*a* through FIG. 13 with replacement of the pixel group by the pixel.

The modified dot number data generation process then refers to the conversion table shown in FIG. 14 and generates dot number data of the selected object pixel (step S504). The tone value of the image data allocated to the selected object pixel is used for the pixel group tone value in the conversion table.

After generation of the dot number data of the selected object pixel, the modified dot number data generation process determines whether the processing has been completed for all the pixels included in the object image (step S506). When there is still any unprocessed pixel (step S506: No), the modified dot number data generation process returns to step S500 to select another pixel as a next processing object and repeats the subsequent series of processing. When the processing has been completed for all the pixels included in the object image (step S506: Yes) through the repetition of this processing flow, the computer 100 outputs the dot number data generated with regard to the respective pixels to the color printer 200 (step S508) and terminates the modified dot number data generation process shown in FIG. 18.

On completion of the modified dot number data generation process, the modified image printing process performs a pixel position determination process (step S408). The pixel position determination process in the modified image printing process is identical with the pixel position determination process in the image printing process of the first embodiment. In the pixel position determination process, the printer 200 receives the dot number data supplied from the computer 100, refers to the priority order matrix, and determines the positions of dot-on pixels.

The printer 200 then actually creates dots in the determined positions of dot-on pixels (step S410). The creation of dots at an adequate density on the printing paper gives a resulting printed image according to the image data.

The modified image printing process converts the resolution of image data into the lower resolution than the printing resolution and generates dot number data. The lower resolution naturally reduces the total data volume of the image data. Such reduction allows the higher-speed data processing and saves the memory capacity temporarily required for the data processing. This modified image printing process omits formation of pixel groups and computation of pixel group tone values of the respective pixel groups. The modification thus simultaneously attains simplification and acceleration of the processing.

Setting a high printing resolution is an effective measure to obtain a high-quality printed image. The high resolution of image data in combination with the high printing resolution is, however, not essential for the high-quality printed image. Improvement of the printing quality is attainable by simply dividing each large pixel included in received image data of a low resolution into multiple small pixels to increase the apparent resolution. For example, the procedure receives image data of a low resolution as shown in FIG. 19b and divides each large pixel into multiple small pixels for conversion into image data of a higher resolution as shown in FIG. 19c. The resulting image data has the increased apparent resolution but does not allow a smooth continuous tone variation. With regard to expression of the smooth continuous tone variation, the image data of the high apparent resolution is equivalent to the image data of the low resolution. The simple increase of the apparent resolution, however, practically enhances the printing quality as described below and is thus adopted rather frequently for this purpose.

The reason for the enhanced printing quality by the simple increase of the apparent resolution is described briefly. Image data is generally capable of expressing multiple different tones in each pixel. For example, 1-byte image data may express 256 different tones in each pixel. In image printing by dot creation, however, each pixel takes only one of two different tones, that is, a dot-on state or a dot-off state. Even in variable-dot image printing, each pixel is allowed to take only one of several different tones. Namely image printing by dot creation at the original resolution of image data significantly loses the information volume of the image data in the respective pixels. The method of dividing each pixel into multiple small pixels and creating dots enables the information volume of the image data in the respective pixels to be reflected on dot creation for image printing, thus enhancing the printing quality.

The modified image printing process described above is effectively combined with this method of increasing the apparent resolution by division of each pixel included in received image data of a low resolution into multiple small pixels. The combined procedure receives image data, adjusts the resolution according to the requirements, and treats each pixel as a pixel group to generate dot number data. Application of the modified image printing process thus enables an image of the printing resolution to be printed at a high speed without actually increasing the resolution of received image data. Especially when the size of each pixel included in received image data is identical with the size of a pixel group, dot number data of the respective pixels are generated without adjustment of the resolution. This ensures the higher-speed image printing.

C. Second Embodiment

In the system of the first embodiment described above, the color printer 200 is capable of creating only one type of dots. For the enhanced printing quality, multivalued dot printers have widely been used to create multiple different types of dots, for example, variable size dots or dots of different ink densities. The first application of the invention is adoptable in the multivalued dot printers to exert the significant effects. The first application of the invention executed by a multivalued dot printer is described below as a second embodiment.

C-1. General Flow of Image Printing Process in Second Embodiment

The general flow of the image printing process of the second embodiment is similar to the general flow of the image printing process of the first embodiment shown in the flowchart of FIG. 5. The image printing process of the second embodiment is described briefly with reference to the flowchart of FIG. 5.

In the image printing process of the second embodiment, the computer 100 receives image data (step S100 in FIG. 5), performs the color conversion process (step S102), performs the resolution conversion process to convert the resolution of image data into the printing resolution (step S104), and starts a dot number data generation process (step S106).

As mentioned above, in the system of the first embodiment, the color printer 200 is capable of creating only one type of dots. The dot number data generation process of the first embodiment generates dot number data representing the number of dots to be created in each pixel group and outputs the generated dot number data to the color printer 200. In the system of the second embodiment, on the other hand, the color printer 200 is capable of creating three variable size dots, that is, large-size dot, medium-size dot, and small-size dot. The dot number data generation process of the second embodiment accordingly generates dot number data representing the numbers of large-size dots, medium-size dots, and small-size dots to be created in each pixel group. For the efficient transmission of the dot number data, the data representing the numbers of large-size dots, medium-size dots, and small-size dots is not directly output but is encoded for reduction of the data volume. The details of the dot number data generation process of the second embodiment will be described later.

The CPU included in the control circuit 260 of the color printer 200 receives the dot number data supplied from the computer 100 and starts a pixel position determination process (step S108 in FIG. 5). The pixel position determination process of the second embodiment decodes the encoded dot number data into data representing the numbers of large-size dots, medium-size dots, and small-size dots to be created in each pixel group and determines the positions of dot-on pixels with regard to the large-size dot, the medium-size dot, and the small-size dot. The details of the pixel position determination process will be described later.

After determination of the positions of dot-on pixels with regard to the large-size dot, the medium-size dot, and the small-size dot, the printer 200 actually creates the large-size dots, the medium-size dots, and the small-size dots in the determined positions of dot-on pixels (step S110 in FIG. 5). The creation of the large-size dots, the medium-size dots, and the small-size dots gives a resulting printed image according to the image data.

C-2. Dot Number Data Generation Process of Second Embodiment

In the image printing process of the second embodiment, the dot number data generation process generates encoded dot number data representing the numbers of large-size dots, medium-size dots, and small-size dots to be created in each pixel group. The encoded dot number data is extremely easily generated corresponding to the combination of the pixel group classification number and the pixel group tone value by referring to a conversion table as described below. The description sequentially regards the outline of the process of specifying the numbers of large-size dots, medium-size dots, and small-size dots to be created in each pixel group by the dither technique, the process of encoding the specified numbers of large-size dots, medium-size dots, and small-size dots, and the details of the dot number data generation process of the second embodiment.

Figure 21:
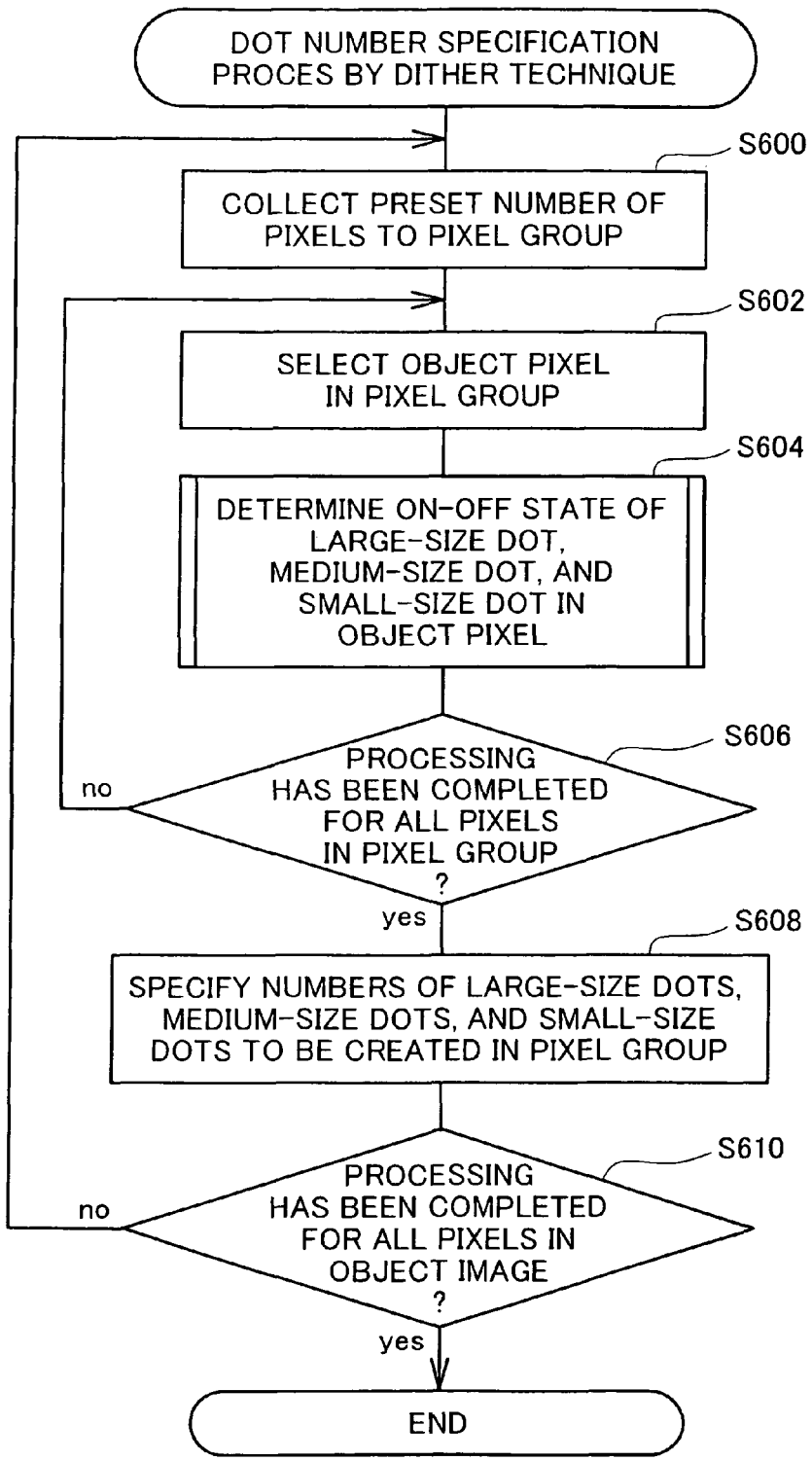
FIG. 21 is a flowchart showing a process of specifying the numbers of large-size dots, medium-size dots, and small-size dots to be created in each pixel group by the dither technique.

C-2-1. Process of Specifying Numbers of Large-Size, Medium-Size, and Small-Size Dots by Dither Technique FIG. 21 is a flowchart showing a process of specifying the numbers of large-size dots, medium-size dots, and small-size dots to be created in each pixel group by the dither technique. The details of this process are disclosed in Japanese Patent No. 3292104. The procedure of FIG. 21 adopts the technique disclosed in Japanese Patent No. 3292104 in the units of pixel groups. The dot number specification process first collects a preset number of adjacent pixels included in an object image to one pixel group (step S600). Like the first embodiment described above, the pixel group includes the total of 8 pixels, that is, 4 pixels in the main scanning direction by 2 pixels in the sub-scanning direction.

The dot number specification process then selects one pixel in the pixel group as a processing object for determination of the dot on-off state (step S602), and performs a halftoning process to determine the dot on-off state of the selected object pixel with regard to the large-size dot, the medium-size dot, and the small-size dot (step S604). The following describes the details of the halftoning process to determine the dot on-off state with regard to the large-size dot, the medium-size dot, and the small-size dot.

Figure 22:
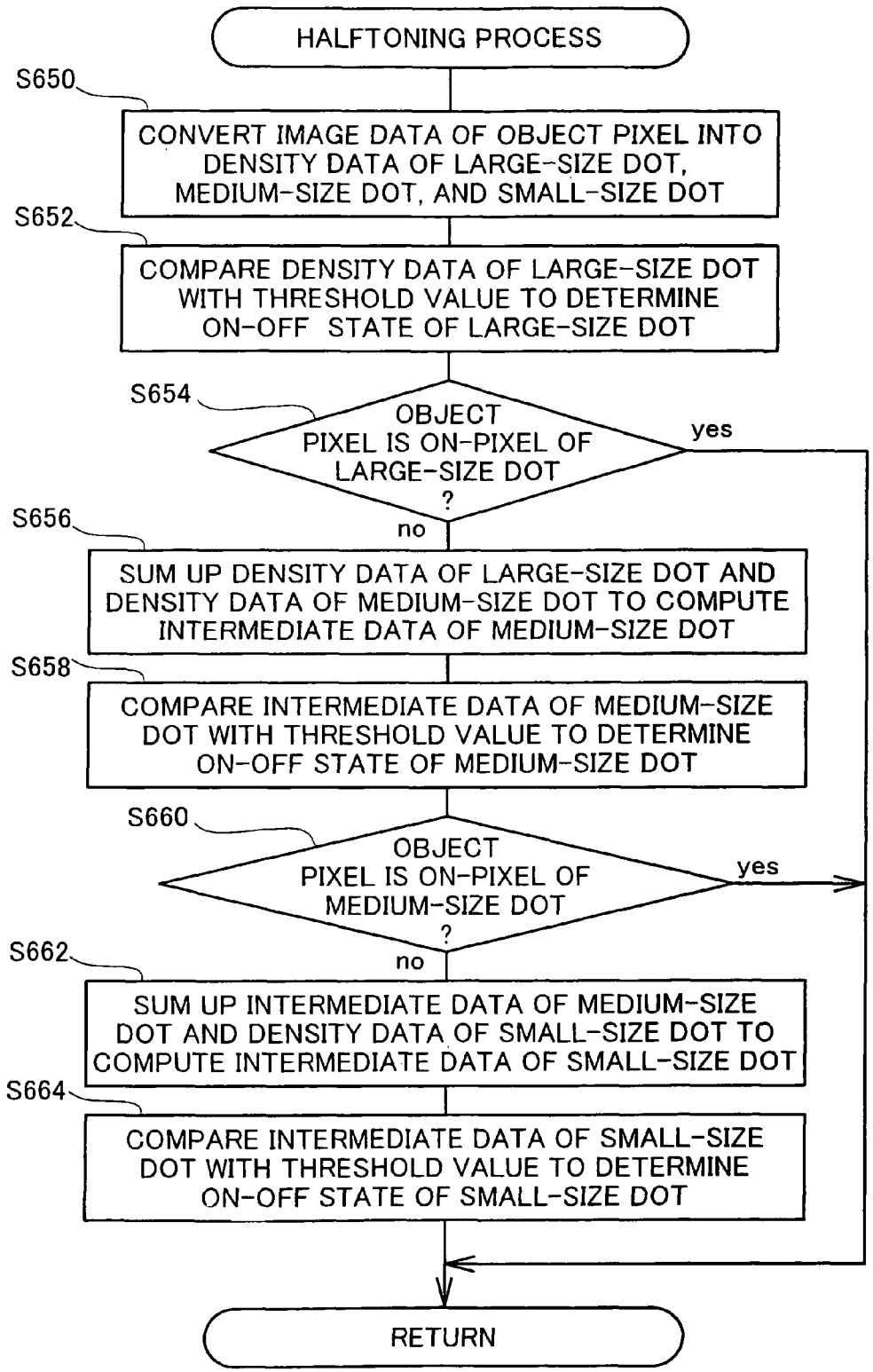
FIG. 22 is a flowchart showing the details of a halftoning process to determine the dot on-off state of each selected pixel with regard to the large-size dot, the medium-size dot, and the small-size dot in the dot number specification process.

FIG. 22 is a flowchart showing the details of the halftoning process to determine the dot on-off state of the selected object pixel with regard to the large-size dot, the medium-size dot, and the small-size dot. The halftoning process first converts image data of the selected object pixel into density data of the large-size dot, the medium-size dot, and the small-size dot (step S650). The density data are expressed by the tone values representing the densities of the respective size dots to be created. The higher tone value of the density data represents the higher density of dot creation. For example, a tone value '255' of the density data shows a dot creation density of 100%, that is, creation of dots in all pixels. A tone value '0' of the density data shows a dot creation density of 0%, that is, no creation of dots in any pixels. The conversion of the image data into the density data is readily achieved by referring to a numerical table called a dot density conversion table.

Figure 23:
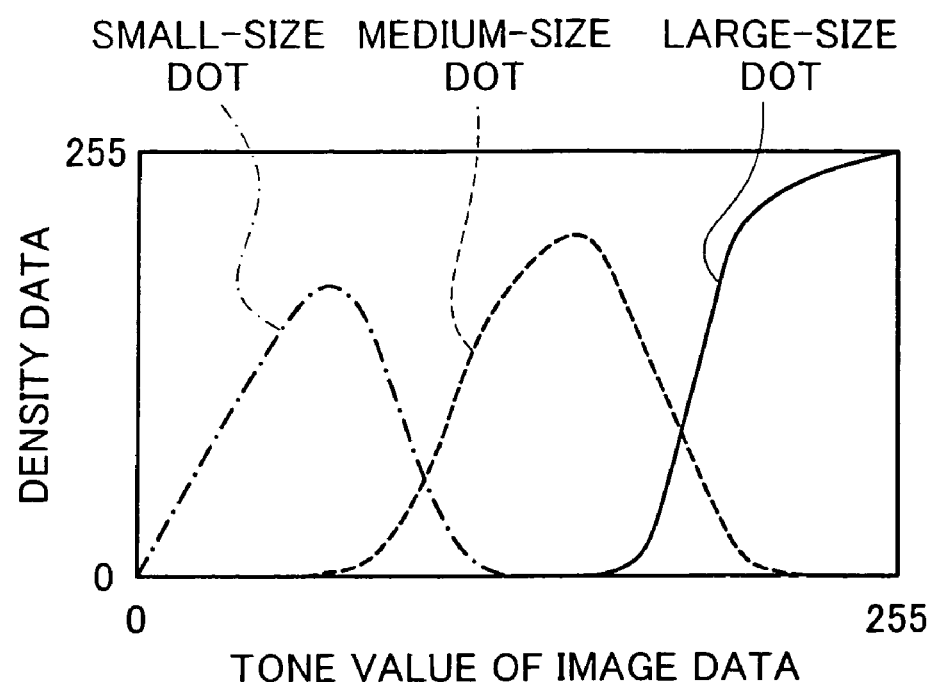
FIG. 23 conceptually shows a dot density conversion table referred to for conversion of a tone value of image data into density data of the large-size dot, the medium-size dot, and the small-size dot.

FIG. 23 conceptually shows the dot density conversion table referred to for conversion of the tone value of image data into the density data of the large-size dot, the medium-size dot, and the small-size dot. As illustrated, the dot density conversion table sets the density data of the small-size dot, the medium-size dot, and the large-size dot against the tone value of image data. In an area close to the tone value '0' of the image data, the density data of both the medium-size dot and the large-size dot are set to have a tone value of '0'. The density data of the small-size dot gradually increases with an increase in tone value of the image data. When the increasing tone value of the image data reaches a first preset level, the dot density conversion table starts decreasing the density data of the small-size dot and increasing the density data of the medium-size dot. When the tone value of the image data further increases and reaches a second preset level, the dot density conversion table sets the decreasing density data of the small-size dot to the tone value of '0' and starts decreasing the density data of the medium-size dot and increasing the density data of the large-size dot. The halftoning process of FIG. 22 refers to this dot density conversion table to convert the tone value of the image data into the density data of the large-size dot, the density data of the medium-size dot, and the density data of the small-size dot at step S650.

After conversion of the image data of the object pixel into the density data of the large-size dot, the medium-size dot, and the small-size dot, the halftoning process of FIG. 22 compares the density data of the large-size dot in the object pixel with a threshold value set at a corresponding position in the dither matrix to determine the on-off state of the large-size dot in the object pixel (step S652). When the density data of the large-size dot is not smaller than the threshold value, the halftoning process specifies the object pixel as an on-pixel of the large-size dot (step S654: Yes). The processing flow then exits from the halftoning process of FIG. 22 and returns to the dot number specification process of FIG. 21.

When the density data of the large-size dot is smaller than the threshold value, on the other hand, the halftoning process specifies the object pixel as an off-pixel of the large-size dot (step S654: No) and subsequently determines the on-off state of the medium-size dot. The concrete procedure of such determination sums up the density data of the large-size dot and the density data of the medium-size dot to compute intermediate data of the medium-size dot (step S656) and compares the computed intermediate data of the medium-size dot with the threshold value in the dither matrix to determine the on-off state of the medium-size dot in the object pixel (step S658). When the intermediate data of the medium-size dot is not smaller than the threshold value, the halftoning process specifies the object pixel as an on-pixel of the medium-size dot (step S660: Yes). The processing flow then exits from the halftoning process of FIG. 22 and returns to the dot number specification process of FIG. 21.

When the intermediate data of the medium-size dot is smaller than the threshold value, on the other hand, the halftoning process specifies the object pixel as an off-pixel of the medium-size dot (step S660: No) and subsequently determines the on-off state of the small-size dot. The concrete procedure of such determination sums up the intermediate data of the medium-size dot and the density data of the small-size dot to compute intermediate data of the small-size dot (step S662) and compares the computed intermediate data of the small-size dot with the threshold value in the dither matrix to determine the on-off state of the small-size dot in the object pixel (step S664). When the intermediate data of the small-size dot is not smaller than the threshold value, the halftoning process specifies the object pixel as an on-pixel of the small-size dot. When the intermediate data of the small-size dot is smaller than the threshold value, on the other hand, the halftoning process specifies the object pixel as an off-pixel of the small-size dot. The halftoning process accordingly sets one of the four states, that is, creation of the large-size dot, creation of the medium-size dot, creation of the small-size dot, and creation of no dot, to the object pixel. After determination of the on-off state of the object pixel, the processing flow exits from the halftoning process of FIG. 22 and returns to the dot number specification process of FIG. 21.

Figure 24:
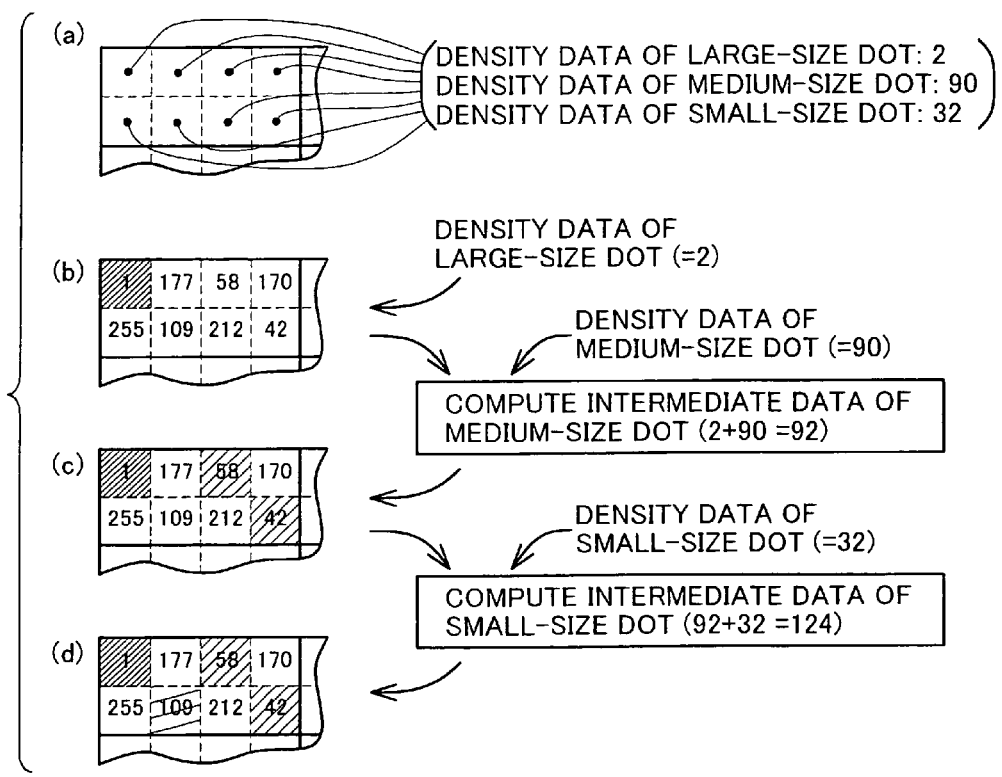
FIG. 24 conceptually shows determination of the on-off state of the large-size dot, the medium-size dot, and the small-size dot with regard to each pixel included in a pixel group by the dither technique.

The determination of the on-off state of the large-size dot, the medium-size dot, and the small-size dot is described with reference to a concrete example of FIG. 24. FIG. 24 conceptually shows determination of the on-off state of the large-size dot, the medium-size dot, and the small-size dot with regard to each pixel included in a pixel group by the dither technique. For the simplicity of explanation, it is assumed that all the pixels in the pixel group have an identical tone value of image data and accordingly identical tone values of density data of the large-size dot, the medium-size dot, and the small-size dot. FIG. 24(a) shows the density data of the large-size dot, the density data of the medium-size dot, and the density data of the small-size dot obtained for the respective pixels in the pixel group. All the pixels in the pixel group have density data '2' of the large-size dot, density data '90' of the medium-size dot, and density data '32' of the small-size dot.

FIG. 24(b) shows threshold values stored at the corresponding positions of the pixel group in the dither matrix. The procedure compares the density data of the large-size dot with the respective threshold values in the dither matrix to determine the on-off state of the large-size dot. The density data of the large-size dot is equal to '2' for all the pixels. Creation of the large-size dot is specified only in the pixel having the threshold value '1'. The rectangle filled with dense slant lines in FIG. 24(b) represents the pixel specified as the on-pixel of the large-size dot. Each of the other pixels is one of the on-pixel of the medium-size dot, the on-pixel of the small-size dot, or the off-pixel of any variable size dot. The procedure then determines the on-off state of the medium-size dot.

The procedure sums up the density data '2' of the large-size dot and the density data '90' of the medium-size dot to compute the intermediate data '92' of the medium-size dot and compares the computed intermediate data '92' of the medium-size dot with the respective threshold values in the dither matrix to determine the on-off state of the medium-size dot. Creation of the medium-size dot is specified only in the pixel having the threshold value '42' and in the pixel having the threshold value '58'. The rectangles filled with slant lines in FIG. 24(c) represent the pixels specified as the on-pixels of the medium-size dot. Each of the other pixels is either the on-pixel of the small-size dot or the off-pixel of any variable size dot. The procedure then sums up the intermediate data '92' of the medium-size dot and the density data '32' of the small-size dot to compute the intermediate data '124' of the small-size dot and compares the computed intermediate data '124' of the small-size dot with the respective threshold values in the dither matrix. Creation of the small-size dot is specified only in the pixel having the threshold value '109'. The rectangle filled with sparse slant lines in FIG. 24(d) represents the pixel specified as the on-pixel of the small-size dot.

In the dot number specification process of FIG. 21, the processing of steps S602 to S606 is repeated to determine the on-off state of the large-size dot, the medium-size dot, and the small-size dot with computation of the intermediate data with regard to the respective pixels included in the pixel group. After determination of the on-off state with regard to all the pixels in the pixel group (step S606: Yes), the dot number specification process specifies the numbers of large-size dots, medium-size dots, and small-size dots to be created in the pixel group (step S608). The pixel group shown in FIG. 24 is determined to have 1 large-size dot, 2 medium-size dots, and 1 small-size dot.

On specification of the numbers of large-size dots, medium-size dots, and small-size dots to be created in the pixel group, the dot number specification process determines whether the processing has been completed for all the pixels included in the object image (step S610). When there is still any unprocessed pixel, the dot number specification process returns to step S600 and repeats the subsequent series of processing. On completion of the processing for all the pixels included in the object image, the processing flow terminates the dot number specification process by the dither technique shown in FIG. 21. This process divides the image data of the object image into multiple pixel groups and specifies the numbers of large-size dots, medium-size dots, and small-size dots to be created in each pixel group. FIG. 25 conceptually shows the specified numbers of large-size dots, medium-size dots, and small-size dots to be created in respective pixel groups.

C-2-2. Process of Encoding Specified Numbers of Large-Size, Medium-Size, and Small-Size Dots The specified numbers of the respective size dots to be created in each pixel group are encoded and are output to the printer. When there are three different size dots, that is, the large-size dot, the medium-size dot, and the small-size dot, as in the example of FIG. 25, the processing flow without the encoding technique requires three individual outputs of the specified numbers of the three different size dots for each pixel group. The three individual outputs for each pixel group undesirably damage the effect of quick data supply from the computer 100 to the color printer 200 for the high-speed image printing. The processing flow with the encoding technique encodes the combination of the specified numbers of the respective size dots (for example, the combination of K large-size dots, L medium-size dots, and N small-size dots) to a preset code and outputs the code to the color printer 200, instead of the individual outputs of the specified numbers of the respective size dots.

The concrete encoding process stores allocation of code data to each combination of the numbers of the respective size dots as a correlation map and refers to this correlation map to encode the combination of the specified numbers of large-size dots, medium-size dots, and small-size dots. FIG. 26 shows one example of the correlation map that allocates code data to each combination of the numbers of large-size dots, medium-size dots, and small-size dots to be created in each pixel group. In the correlation map of FIG. 26, for example, code data '0' is allocated to a combination of 0 large-size dot, 0 medium-size dot, and 0 small-size dot. Code data '1' is allocated to a combination of 0 large-size dot, 0.0 medium-size dot, and 1 small-size dot. In this manner, the correlation map shows allocation of preset code data to each combination of the numbers of the respective size dots.

Practically possible combinations of the numbers of the respective size dots are determined in the following manner. Each pixel in a pixel group is allowed to have one of the large-size dot, the medium-size dot, and the small-size dot. Since formation of multiple dots in one pixel is not allowed, the total number of dots created in one pixel group does not exceed the total number of pixels included in the pixel group (8 in the illustrated example). The practically possible combinations of the numbers of the respective size dots created in each pixel group consisting of 8 pixels are expressed by the number of possible combinations in 8 selections with repetition among the four different states 'creation of the large-size dot', 'creation of the medium-size dot', 'creation of the small-size dot', and 'creation of no dot' in each pixel:

$$_4H_8 (=_{4+8-1}C_8)$$

In this example, there are 165 practically possible combinations of the numbers of the respective size dots at the maximum. Here $_nH_r$ denotes an operator of determining the number of possible combinations in 'r' selections with repetition among 'n' options (number of repeated combinations), and $_nC_r$ denotes an operator of determining the number of possible combinations in 'r' selections without repetition among 'n' options.

There are 165 practically possible combinations of the numbers of large-size dots, medium-size dots, and small-size dots, and there are accordingly 165 code data in a range of '0' to '164'. The 165 code data are expressible by 8-bit data length. Instead of the three individual outputs of the number of large-size dots, the number of medium-size dots, and the number of small-size dots, one single output of the 8-bit encoded dot number data enables supply of the numbers of the respective size dots to be created in one pixel group to the printer. The procedure with encoding refers to the correlation map of FIG. 26 to convert the combination of the numbers of the respective size dots specified for each pixel group as shown in FIG. 25 into encoded dot number data and supplies the encoded dot number data to the printer. This arrangement enables the quick supply of the dot number data and attains the high-speed image printing.

C-2-3. Dot Number Data Generation Process with Conversion Table

The above description regards the two-step processing that specifies the numbers of large-size dots, medium-size dots, and small-size dots to be created in each pixel group by the dither technique, converts the specified numbers of the respective size dots into encoded dot number data, and supplies the encoded dot number data to the color printer 200. The dot number data generation process of the second embodiment is, however, the one-step processing that refers to a conversion table to directly convert image data of each pixel group into encoded dot number data and supplies the encoded dot number data to the color printer 200. The process of the second embodiment thus attains extremely simple and quick generation of the dot number data. The simple dot number data generation process of the second embodiment does not essentially require a device of a high throughput, for example, the computer 100, but is executable even by a device of a relatively low throughput to generate dot number data at a sufficiently practical speed. The dot number data generation process of the second embodiment is described in detail according to the flowchart.

Figure 27:
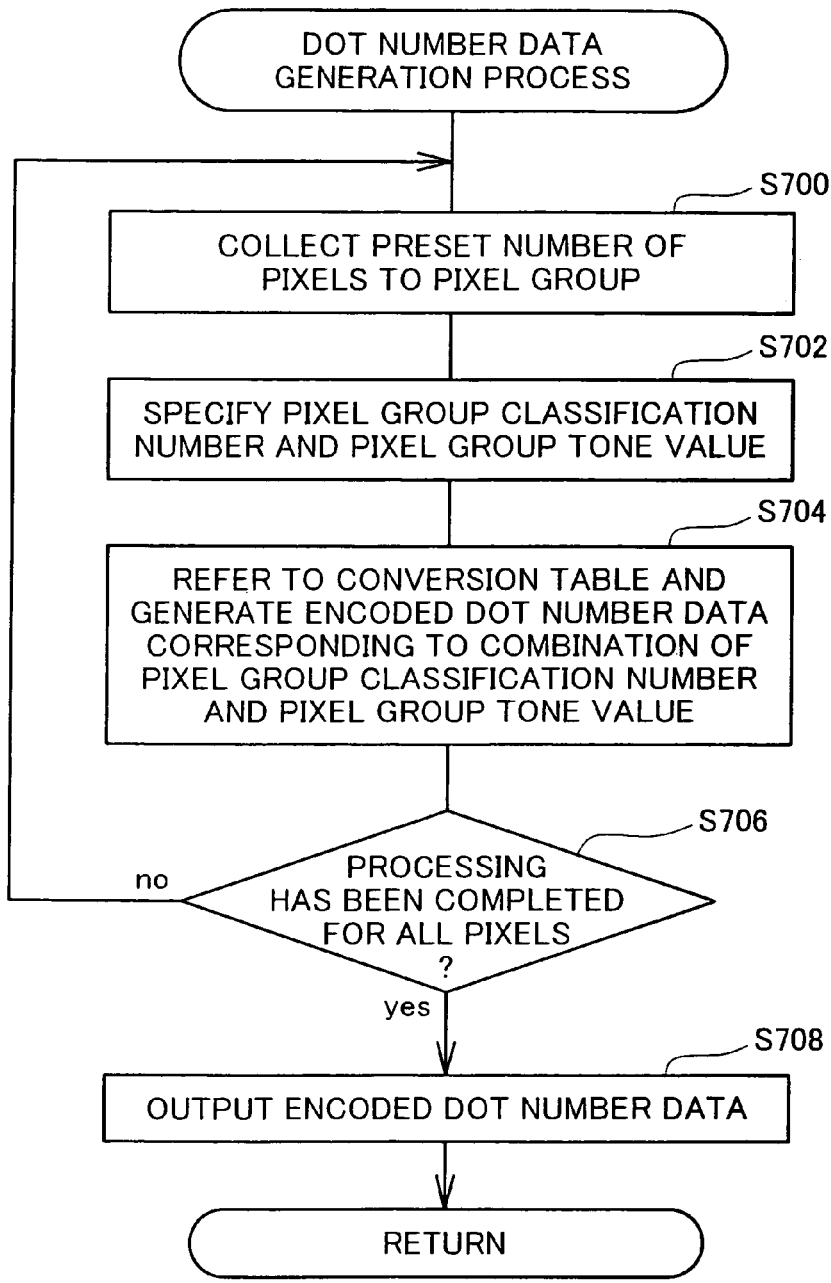
FIG. 27 is a flowchart showing the details of a dot number data generation process executed in a second embodiment of the invention.

FIG. 27 is a flowchart showing the details of the dot number data generation process executed in the second embodiment. The following description regards the dot number data generation process of the second embodiment executed by the computer 100. As mentioned above, however, the dot number data generation process of the second embodiment is extremely simple like the dot number data generation process of the first embodiment and is executable in the color printer 200 or in the digital camera 120.

The dot number data generation process of the second embodiment first collects a preset number of adjacent pixels included in an object image to one pixel group (step S700). For example, like the first embodiment, the pixel group includes the total of 8 pixels, that is, 4 pixels in the main scanning direction by 2 pixels in the sub-scanning direction. The dot number data generation process subsequently specifies a pixel group classification number and a pixel group tone value of the pixel group (step S702). The pixel group classification number and the pixel group tone value are both extremely easily specifiable by the procedure described in the first embodiment.

The dot number data generation process then refers to a conversion table to generate encoded dot number data corresponding to the combination of the pixel group classification number and the pixel group tone value (step S704). FIG. 28 conceptually shows the conversion table referred to in the dot number data generation process of the second embodiment. As illustrated, the conversion table stores encoded dot number data allocated to each combination of the pixel group classification number and the pixel group tone value. The dot number data generation process of the second embodiment can readily generate the encoded dot number data corresponding to the combination of the specified pixel group classification number and pixel group tone value by simply referring to the conversion table.

After generation of the encoded dot number data with regard to the pixel group, the dot number data generation process determines whether the processing has been completed for all the pixels included in the object image (step S706). When there is still any unprocessed pixel (step S706: No), the dot number data generation process returns to step S700 to specify another pixel group and repeats the subsequent series of processing. When the processing has been completed for all the pixels included in the object image (step S706: Yes) through the repetition of this processing flow, the computer 100 outputs the encoded dot number data generated with regard to the individual pixel groups to the color printer 200 (step S708) and terminates the dot number data generation process of the second embodiment shown in FIG. 27.

C-3. Pixel Position Determination Process of Second Embodiment

Figure 29:
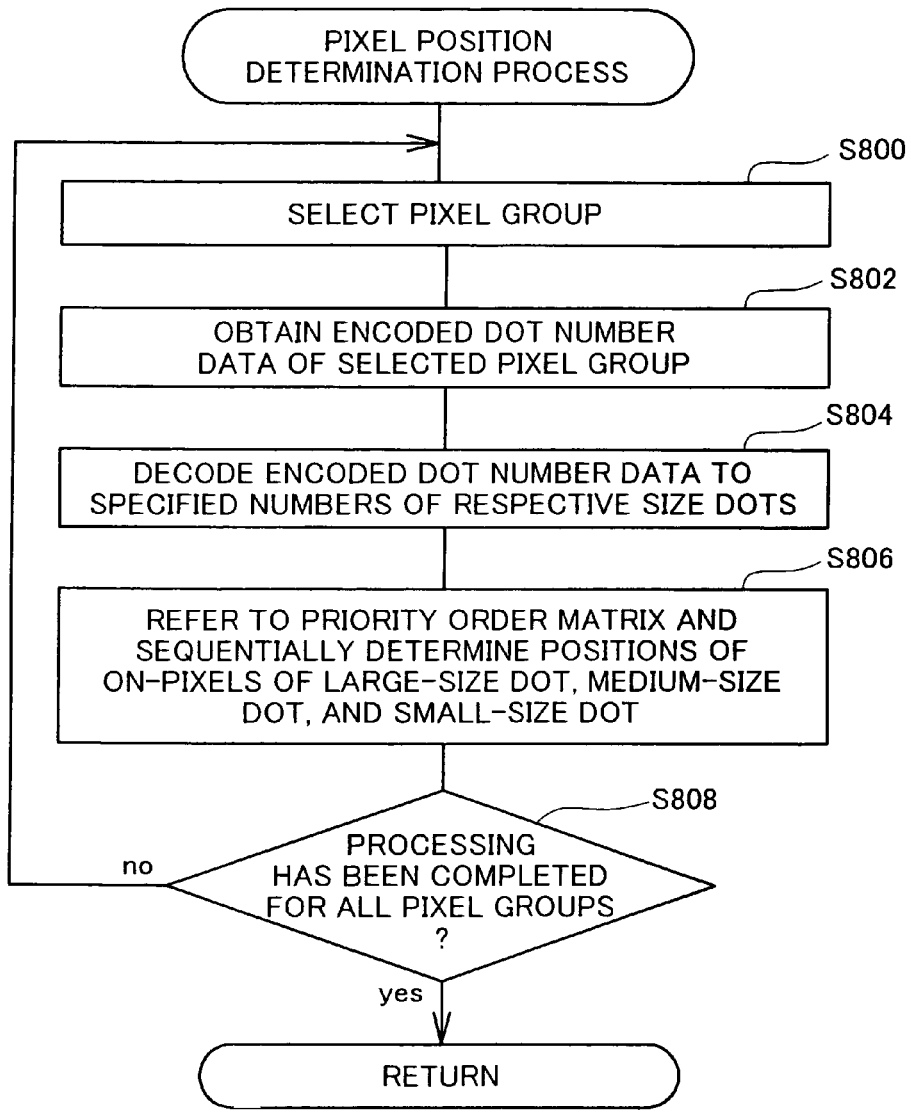
FIG. 29 is a flowchart showing the details of a pixel position determination process executed in the second embodiment.

The color printer 200 of the second embodiment executes the pixel position determination process to receive the encoded dot number data and determine the positions of the on-pixels of the large-size dot, the medium-size dot, and the small-size dot in each pixel group according to the encoded dot number data. FIG. 29 is a flowchart showing the details of the pixel position determination process executed in the second embodiment. Significant differences from the pixel position determination process of the first embodiment described above with reference to the flowchart of FIG. 16 are to decode the encoded dot number data into the specified numbers of large-size dots, medium-size dots, and small-size dots and to determine the positions of the on-pixels of the large-size dot, the medium-size dot, and the small-size dot. The following description mainly regards such different points in the pixel position determination process of the second embodiment.

The pixel position determination process of the second embodiment first selects a pixel group as a processing object (step S800) and obtains the encoded dot number data of the selected pixel group (step S802). The encoded dot number data is then decoded to the specified numbers of large-size dots, medium-size dots, and small-size dots to be created in the selected pixel group (step S804). The concrete procedure of the embodiment refers to a decoding table to decode the encoded dot number data. FIG. 30 conceptually shows the decoding table referred to in the pixel position determination process of the second embodiment to decode the encoded dot number data.

As illustrated, the decoding table sets a combination of the numbers of large-size dots, medium-size dots, and small-size dots corresponding to each encoded dot number data. For example, the encoded dot number data '1' is decoded to a combination of 0 large-size dot, 0 medium-size dot, and 1 small-size dot. The pixel position determination process of FIG. 29 refers to this decoding table and converts the encoded dot number data into the specified numbers of large-size dots, medium-size dots, and small-size dots at step S804.

Figure 31:
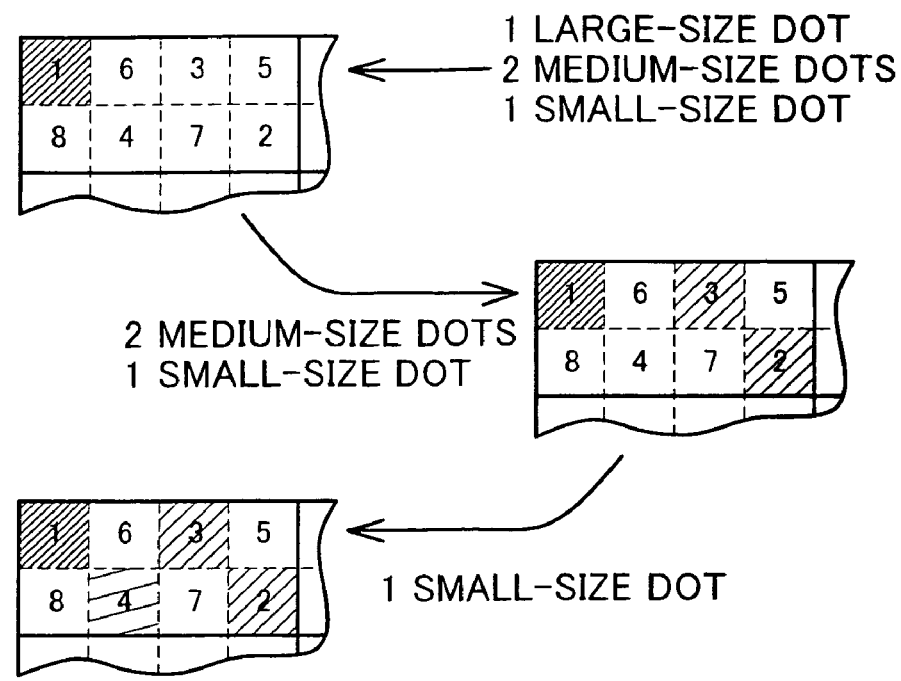
FIG. 31 conceptually shows determination of the positions of on-pixels of the large-size dot, the medium-size dot, and the small-size dot by referring to a priority order matrix.

The pixel position determination process subsequently refers to a priority order matrix stored at a position corresponding to the selected pixel group as the processing object and determines the positions of the on-pixels of the large-size dot, the medium-size dot, and the small-size dot in the selected pixel group (step S806). The priority order matrix represents the priority order of dot creation among the respective pixels in each pixel group as shown in FIG. 9d. FIG. 31 conceptually shows determination of the positions of on-pixels of the large-size dot, the medium-size dot, and the small-size dot by referring to the priority order matrix. In this illustrated example, the encoded dot number data is decoded to a combination of 1 large-size dot, 2 medium-size dots, and 1 small-size dot.

The procedure first determines the positions of the on-pixels of the large-size dot. In this example, the specified number of large-size dots is '1'. The large-size dot is accordingly to be created in a pixel position having the highest probability of dot creation, that is, a pixel position having an ordinal number '1' in the priority order matrix. In general, when the specified number of large-size dots is 'N', the large-size dot is to be created in pixel positions having ordinal numbers of '1' to 'N' in the priority order matrix. The rectangle filled with dense slant lines in FIG. 31 represents the pixel position determined as the on-pixel of the large-size dot.

The procedure then determines the positions of the on-pixels of the medium-size dot. In this example, the specified number of medium-size dots is '2'. Since the pixel position having the ordinal number '1' is determined as the on-pixel of the large-size dot, the medium-size dot is to be created in a pixel position having an ordinal number '2' and in a pixel position having an ordinal number '3'. The rectangles filled with slant lines in FIG. 31 represent the pixel positions determined as the on-pixels of the medium-size dot.

The procedure subsequently determines the positions of the on-pixels of the small-size dot. In this example, the specified number of small-size dots is '1'. Since the pixel position having the ordinal number '1' is determined as the on-pixel of the large-size dot and the pixel positions having the ordinal numbers '2' and '3' are determined as the on-pixels of the medium-size dot, the small-size dot is to be created in a pixel position having an ordinal number '4'. The rectangle filled with sparse slant lines in FIG. 31 represents the pixel position determined as the on-pixel of the small-size dot. The pixel position determination process of FIG. 29 refers to the priority order matrix in this manner and sequentially determines the positions of on-pixels of the large-size dot, the medium-size dot, and the small-size dot at step S806.

After decoding the encoded dot number data and determining the positions of on-pixels of the large-size dot, the medium-size dot, and the small-size dot with regard to the selected pixel group, the pixel position determination process determines whether the processing has been completed for all the pixel groups (step S808 in FIG. 29). When there is still any unprocessed pixel group (step S808: No), the pixel position determination process returns to step S800 to select another pixel group as a next processing object and repeats the subsequent series of processing. When the processing has been completed for all the pixel groups (step S808: Yes), the processing flow exits from the pixel position determination process of the second embodiment shown in FIG. 29 and returns to the image printing process to actually create the respective size dots on the printing paper. This completes a printed image according to the image data.

The pixel position determination process of the second embodiment decodes the encoded dot number data to the numbers of the respective size dots. Since the positions of the on-pixels are determined in the sequence of the large-size dot, the medium-size dot, and the small-size dot as described above, the encoded dot number data may alternatively be decoded to the number of large-size dots, the total number of large-size dots and medium-size dots, and the total number of large-size dots, medium-size dots, and small-size dots. In the illustrated example of FIG. 31, the encoded dot number data may be decoded to '1' as the number of large-size dots, '3' as the total number of large-size dots and medium-size dots, and '4' as the total number of large-size dots, medium-size dots, and small-size dots, instead of 1 large-size dot, 2 medium-size dots, and 1 small-size dot.

FIG. 32 conceptually shows another decoding table referred to for decoding the encoded dot number data in this modified manner. Such decoding enables quicker determination of the positions of on-pixels of the respective size dots. In the illustrated example of FIG. 31, the total number of large-size dots and medium-size dots is '3'. The procedure of determining the positions of on-pixels of the medium-size dot selects pixel positions having ordinal numbers '1' to '3', excludes the pixel positions already specified as the on-pixels of the large-size dot from the selected pixel positions, and specifies the remaining pixel positions as the on-pixels of the medium-size dot.

In the method of decoding the encoded dot number data to 1 large-size dot, 2 medium-size dots, and 1 small-size dot, the ordinal numbers of the pixel positions specified as the on-pixels of the medium-size dot depend upon the number of large-size dots. Similarly the ordinal number of the pixel position specified as the on-pixel of the small-size dot depends upon both the number of large-size dots and the number of medium-size dots. Consideration of the number of large-size dots or both the number of large-size dots and the number of medium-size dots is thus required for selection of the pixel positions having adequate ordinal numbers to determine the positions of the on-pixels of the medium-size dot or the positions of the on-pixels of the small-size dot. In the method of decoding the encoded dot number data to 1 as the number of large-size dots, 3 as the total number of large-size dots and medium-size dots, and 4 as the total number of large-size dots, medium-size dots, and small-size dots, on the other hand, the pixel positions having adequate ordinal numbers are selectable without consideration of the number of large-size dots or both the number of large-size dots and the number of medium-size dots. This modified method thus ensures quicker determination of the positions of on-pixels of the respective size dots.

As described above, the dot number data generation process of the second embodiment simply refers to the conversion table to directly obtain the encoded dot number data of each pixel group after specification of the pixel group classification number and the pixel group tone value of the pixel group. The process of the second embodiment thus ensures extremely high-speed generation of the encoded dot number data and desirably simplifies the processing protocol.

This advantage is described in some detail by comparison from the conventional method of generating dot number data without a conversion table. The dot number specification by the dither technique without a conversion table requires a rather complicated processing flow shown in the flowcharts of FIGS. 21 and 22. This conventional method also requires subsequent encoding of the combination of the specified numbers of the respective size dots. The dot number data generation process of the second embodiment refers to the conversion table and thus simplifies the processing flow as shown in the flowchart of FIG. 27.

As shown in the flowchart of FIG. 22, the conventional method has the conditional branching to specify creation or non-creation of the large-size dot, the medium-size dot, and the small-size dot with regard to the respective pixels in each pixel group. The CPU generally adopts the pipelining technique for the high-speed processing. The presence of the conditional branching, however, reduces the effects of pipelining and, in combination with pipelining, may even lower the total processing speed. The method of the second embodiment using the conversion table, on the other hand, has no conditional branching to generate the encoded dot number data as shown in the flowchart of FIG. 27. This sufficiently exerts the effects of the pipelining technique and enables the high-speed processing. The dot number data generation process of the second embodiment desirably facilitates the processing flow and is additionally adequate for the high-speed processing.

The method of the second embodiment simply refers to the conversion table to generate the encoded dot number data and is thus executable by a CPU of a relatively low throughput or even by an IC chip with an exclusive logic circuit. In the case of direct connection of the digital camera 120 or another image data generation device to the color printer 200, the dot number data generation process may be executed in the digital camera 120 or the color printer 200 to allow high-speed image printing.

The encoded dot number data has a reduced data volume and is thus promptly output for high-speed image printing.

The dot number data generation process of the second embodiment directly obtains the encoded dot number data by simply referring to the conversion table, and does not use a dither matrix as shown in FIG. 6 or a dot density conversion table as shown in FIG. 23 for conversion of the tone values of image data to the density data of the respective size dots. The structure of the second embodiment accordingly does not require storage of the dither matrix or the dot density conversion table, but needs to store the conversion table. As described below, however, the conversion table used in the dot number data generation process of the second embodiment has a relatively low data volume and is thus free from the restriction of the memory capacity.

FIG. 33 shows estimation results of data volume of the conversion table under various conditions. As described in the first embodiment with reference to FIG. 14, the data volume of the conversion table used in the second embodiment is affected by the variety of the pixel group classification numbers, the available range of the pixel group tone value, and the data length of each dot number data. The variety of the pixel group classification numbers depends upon the size of the dither matrix and the size of each pixel group. The data length of each dot number data is specified by the number of different states in each pixel group, that is, the variety of possible combinations of the numbers of large-size dots, medium-size dots, and small-size dots in each pixel group. In one example, each pixel group consists of 8 pixels, and each pixel in the pixel group may take one of the four different states, that is, creation of the large-size dot, creation of the medium-size dot, creation of the small-size dot, and creation of no dot. There are accordingly 165 possible combinations of the numbers of the respective size dots. The 165 combinations are expressible by an 8-bit data length, so that each dot number data has a data length of 1 byte. In another example, when each pixel group consists of 16 pixels, a 10-bit data length is required to express all the possible combinations of the numbers of the respective size dots. Each dot number data accordingly has a data length of 2 bytes.

FIG. 33 shows the estimated data volumes of the conversion table for the respective combinations of various sizes of the dither matrix and various sizes of the pixel group. The data length required for each dot number data is additionally shown in FIG. 33.

According to the estimation results of FIG. 33, the data volume of the conversion table in the second embodiment is 1 megabyte at the maximum and is generally in the range of 256 kilobytes to 512 kilobytes. The conversion table of such a small data volume can thus be kept in the general cache memory of the computer or may be stored in the memory of the digital camera 120 or another imaging device or in the color printer 200.

The data compression rate shown in FIG. 33 is explained briefly. The data compression rate indicates the compression degree of the data volume by output of the encoded dot number data representing the combination of the numbers of the respective size dots to be created in each pixel group, instead of output of the dot state data representing the dot on-off state in each pixel. The higher data compression rate allows the higher-speed data output from the computer 100 to the color printer 200. The data compression rate is determined in the following manner. In the embodiment described above, each pixel group consists of 8 pixels, and each pixel may take one of the four different states, that is, creation of the large-size dot, creation of the medium-size dot, creation of the small-size dot, and creation of no dot. Each pixel requires a 2-bit data length, so that each pixel group requires a 16-bit data length for expression of the variable size dots created in the respective pixels. The encoded dot number data, on the other hand, requires only a data length of 8 bits for each pixel group. This compresses the 16-bit data length to the 8-bit data length and gives the data compression rate of 0.5.

As shown in FIG. 33, the data compression rate varies about 0.5 according to the various conditions. Namely the method of encoding the combination of the numbers of large-size dots, medium-size dots, and small-size dots practically halves the required data volume, compared with the method of outputting the on-off states of the respective size dots with regard to each pixel. This enables high-speed output of the dot number data to the color printer 200 and accordingly ensures high-speed image printing.

D. Second Application of Invention

Figure 34:
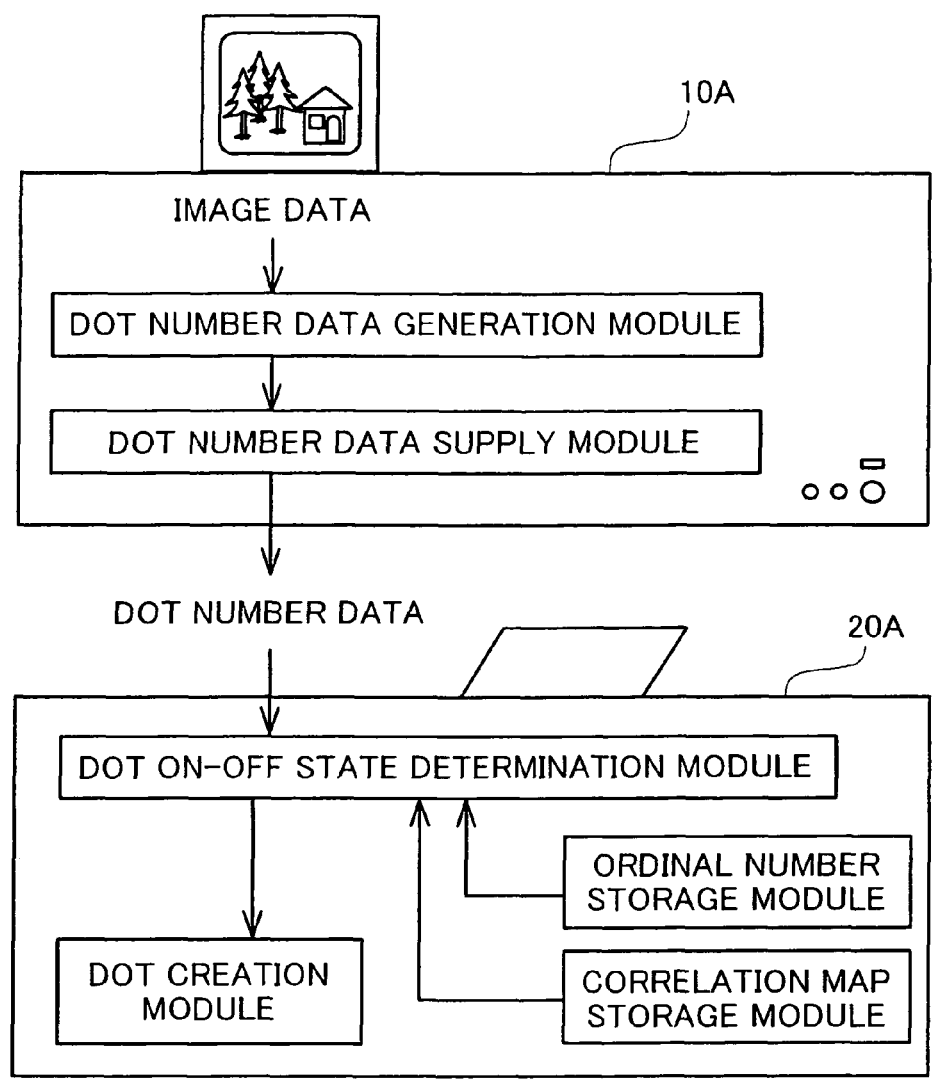
FIG. 34 schematically illustrates the general configuration of a printing system to describe a second application of the invention.

A second application of the invention and third and fourth embodiments following this application are described below. FIG. 34 schematically illustrates the general configuration of a printing system for image printing as one example of the image output system in the second application of the invention. In the configuration of the second application shown in FIG. 34, a computer 10A as an image processing device transmits dot number data to a printer 20A as an image output device, like the first application of the invention described above with reference to FIG. 1.

In the printing system of FIG. 34, the computer 10A collects every preset number of adjacent pixels in an object image to one pixel group and thereby divides the object image into multiple pixel groups. The computer 10A then generates dot number data representing the number of dots to be created in each pixel group. A dot number data generation module provided in the computer 10A divides an original image into multiple pixel groups and generates dot number data with regard to each pixel group. The dot number data thus generated are then supplied from a dot number data supply module in the computer 10A to the printer 20A.

A dot on-off state determination module provided in the printer 20A receives the dot number data supplied from the dot number data supply module and determines the dot on-off state in the respective pixels of each pixel group. A dot creation module in the printer 20A then actually creates dots on a printing medium according to the determined dot on-off state of the respective pixels, so as to complete a printed image.

The dot number data with regard to each pixel group has a significantly low data volume, compared with the dot state data representing the dot on-off state of individual pixels. The supply of the dot number data with regard to each pixel group, instead of the dot state data, from the computer 10A to the printer 20A thus ensures extremely high-speed data transfer.

The printer 20A receives the dot number data and determines the dot on-off state with regard to the respective pixels included in each pixel group. The printer 20A uses an ordinal number storage module and a correlation map storage module for this purpose. The ordinal number storage module stores ordinal numbers to be allocated to the respective pixels in one pixel group to show a priority order of dot creation in the pixel group. The correlation map storage module stores a correlation map of the combination of an ordinal number and dot number data with regard to each pixel to the dot on-off state of the pixel. The printer 20A receives the dot number data with regard to one pixel group, obtains an ordinal number of each pixel included in the pixel group, and refers to the correlation map to determine the dot on-off state of each pixel corresponding to the combination of the dot number data and the ordinal number of the pixel. The use of this correlation map enables high-speed conversion of the dot number data of each pixel group to determine the dot on-off state of the respective pixels included in the pixel group. The high-speed data conversion combined with the high-speed data transfer from the computer 10A enables high-speed image printing by the printer 20A. The second application of the invention is described more in detail with reference to the third and fourth embodiments.

E. Third Embodiment

Figure 35:
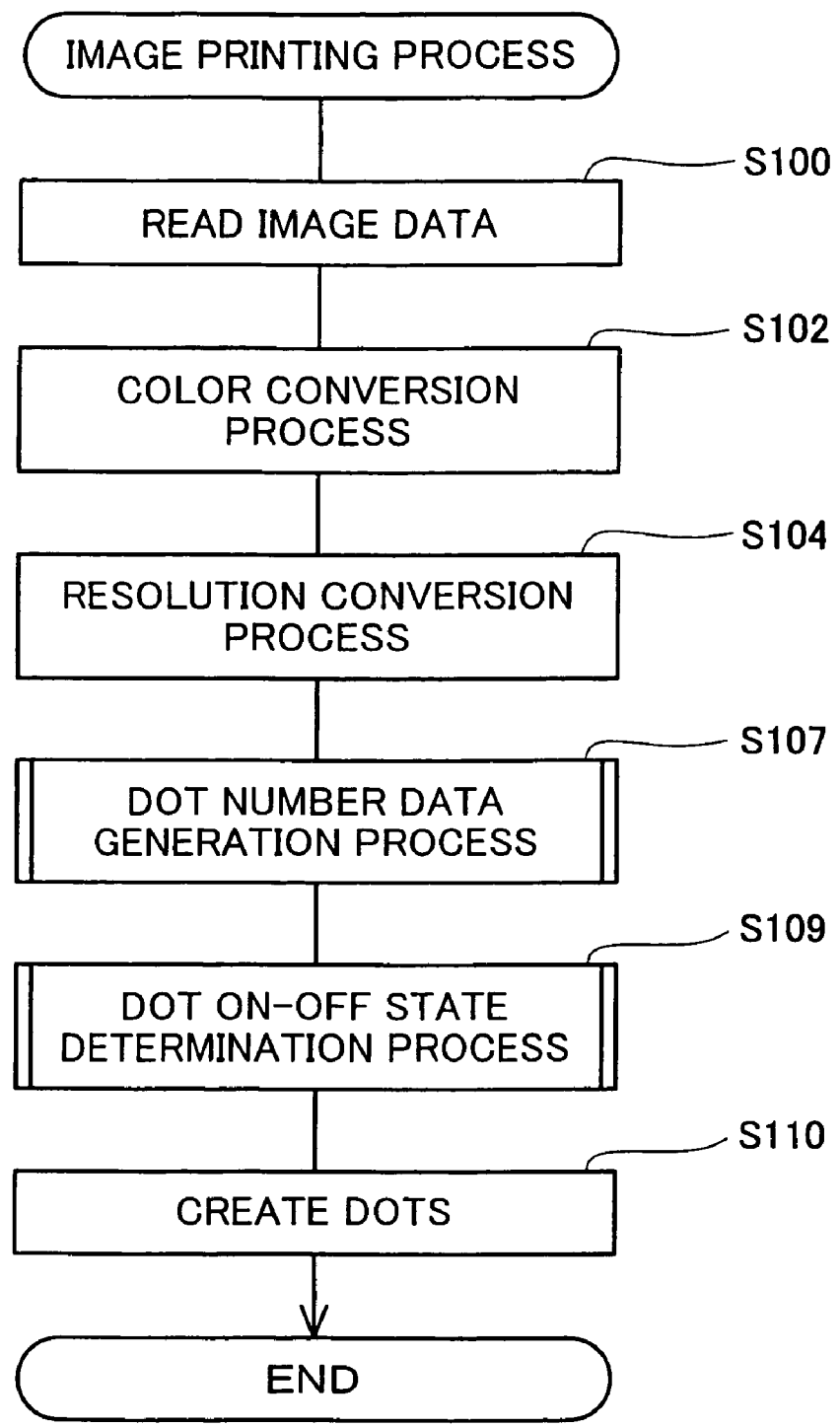
FIG. 35 is a flowchart showing the general flow of an image printing process executed in a third embodiment.

The hardware structure of a printing system in the third embodiment is identical with that in the first embodiment and is thus not specifically described here. The general flow of image printing process in the third embodiment is similar to the image printing process of the first embodiment (see FIG. 5) with some differences as shown in the flowchart of FIG. 35. The image printing process of the third embodiment includes a dot number data generation process of step S107 and a dot on-off state determination process of step S109, in place of the dot number data generation process of step S106 and the pixel position determination process of step S108 in the first embodiment. In the image printing process of the third embodiment, the computer 100 reads color image data to be processed (step S100), performs the color conversion process (step S102), and subsequently performs the resolution conversion process (step S104). After conversion to the printing resolution, the computer 100 starts the dot number data generation process (step S107), which will be described in detail later with reference to FIG. 36 and is explained only briefly here. The dot number data generation process collects every preset number of adjacent pixels to a pixel group and accordingly divides one image into multiple pixel groups. The dot number data generation process then generates dot number data representing the number of dots to be created in each pixel group. In general, the dot on-off state of each pixel is determined according to the image data of the pixel. The dot number data representing the number of dots to be created in each pixel group is thus generated according to image data of the respective pixels included in the pixel group. The dot number data generated with regard to each pixel group is then output to the color printer 200. In this manner, the dot number data generation process generates dot number data with regard to each pixel group according to the image data of the respective pixels included in the pixel group and supplies the generated dot number data to the color printer 200.

The internal CPU of the control circuit 260 included in the color printer 200 receives the dot number data supplied from the computer 100 and starts the dot on-off state determination process (step S109), which will be described in detail later and is explained only briefly here. The dot number data supplied from the computer 100 represents the number of dots to be created in each pixel group but does not include information on the positions of dot-on pixels in the pixel group. For printing an image, it is required to determine the dot on-off state with regard to the respective pixels in each pixel group. The dot on-off state determination process uses the storage of the ordinal numbers to be allocated to the respective pixels in one pixel group as a priority order of dot creation in the pixel group and readily determines the dot on-off state of the respective pixels in the pixel group based on the ordinal numbers and the received dot number data.

After determination of the dot on-off state with regard to the respective pixels in each pixel group, the printer 200 actually creates dots on an output medium according to the determined dot on-off state (step S110). The actual procedure of dot creation has been described previously and is not repeated here.

In the image printing process of the third embodiment, the computer 100 supplies only the dot number data representing the number of dots to be created in each pixel group to the color printer 200, but does not transmit the dot state data representing the dot on-off state of the respective pixels included in the pixel group. The dot number data representing the number of dots to be created in each pixel group occupies a significantly low data volume, compared with the conventional dot state data representing the dot on-off state of the respective pixels. Application of this method thus advantageously enables extremely high-speed data transmission from the computer 100 to the printer 200, like the first embodiment and the second embodiment.

As described above, the dot number data representing the number of dots to be created in each pixel group has a significantly lower data volume than the dot state data representing the dot on-off state of the respective pixels included in the pixel group. In the image printing process of the third embodiment, application of the dot number data thus enables extremely high-speed data transfer from the computer 100 to the color printer 200.

The color printer 200 receives the dot number data of each pixel group from the computer 100 and adopts the following procedure to readily determine the dot on-off state of the respective pixels included in the pixel group. As described later, supply of only the dot number data does not result in a significant deterioration of the picture quality, as long as the dot on-off state of each pixel is determined adequately according to the received dot number data. Especially under some specific conditions, the supply of the dot number data has the equivalent results to those in the supply of the dot state data representing the dot on-off state of each pixel.

E-1. Dot Number Data Generation Process of Third Embodiment

Figure 36:
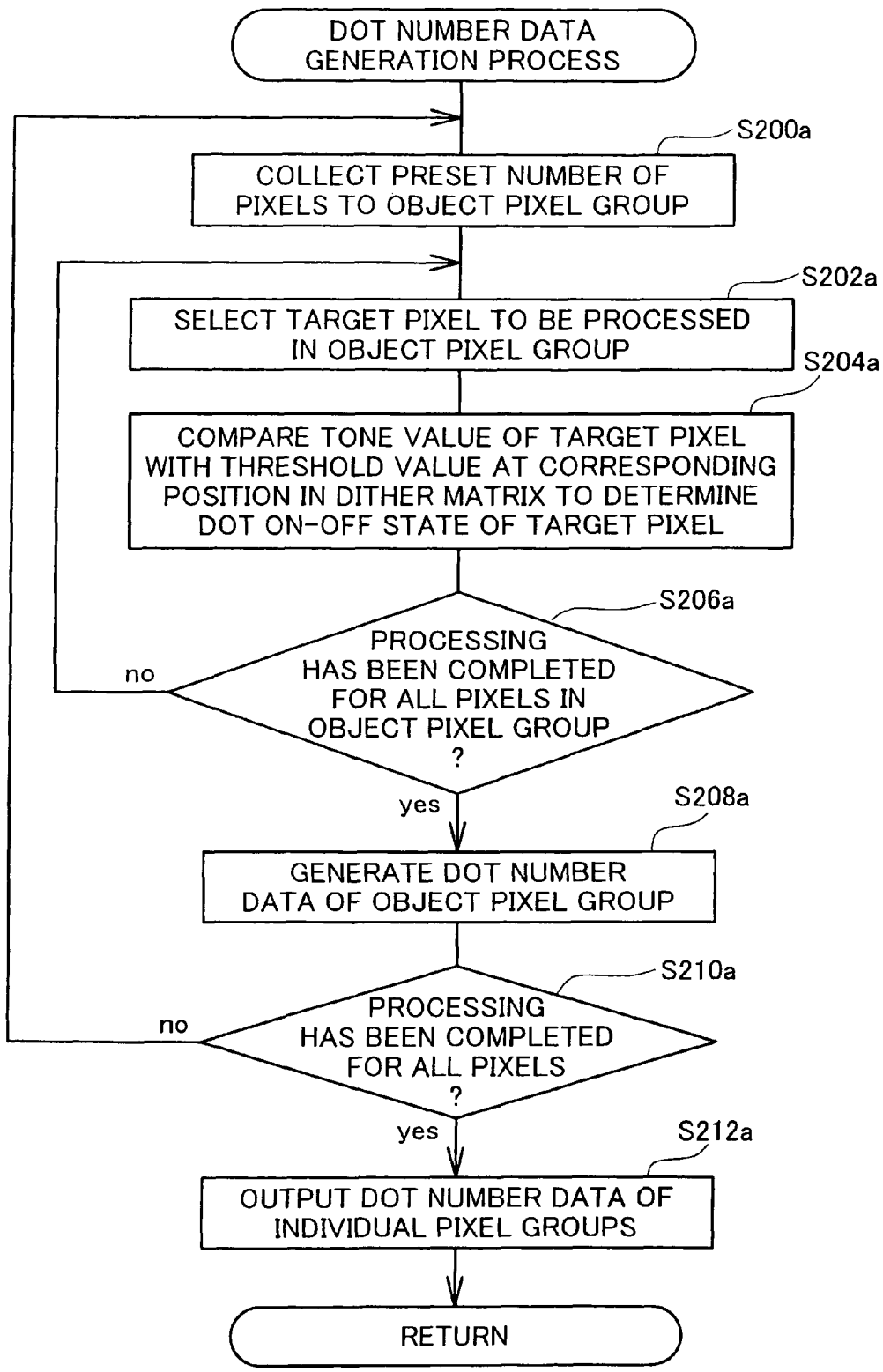
FIG. 36 is a flowchart showing the details of a dot number data generation process executed in the third embodiment.

The image printing process of the third embodiment shown in FIG. 35 has the dot number data generation process to generate dot number data from image data (step S107). FIG. 36 is a flowchart showing the details of the dot number generation process executed in the third embodiment. The dot number data generation process of the third embodiment is described in detail according to the flowchart of FIG. 36.

The dot number data generation process of the third embodiment first collects a preset number of adjacent pixels included in an object image to an object pixel group (step S200a). For example, the object pixel group includes the total of 8 pixels, that is, 4 pixels in the main scanning direction by 2 pixels in the sub-scanning direction. As in the other embodiments, the pixels collected to one pixel group may not be included in a rectangular range defined by straight horizontal and vertical sides, but may be any adjacent pixels having a preset positional relation.

The dot number data generation process then selects one target pixel as an object to be processed, among the preset number of pixels collected to the object pixel group (step S202a). Comparison between a tone value of image data at the selected target pixel and a threshold value at a corresponding position in a dither matrix determines the dot on-off state of the selected target pixel (step S204a). As described previously in the first embodiment with reference to FIG. 7, the pixel having the larger image data than the corresponding threshold value in the dither matrix is specified as the dot-on pixel, whereas the pixel having the larger threshold value than the image data is specified as the dot-off pixel.

The dot number data generation process then determines whether the processing has been completed for all the pixels included in the object pixel group (step S206a). When there is still any unprocessed pixel in the object pixel group (step S206a: No), the dot number data generation process returns to step S202a and repeats the processing of and after step S202a. When the processing has been completed to determine the dot on-off state with regard to all the pixels included in the object pixel group (step S206a: Yes), the dot number data generation process generates dot number data with regard to the object pixel group (step S208a). A concrete procedure of step S208a counts the number of the dot-on pixels in the object pixel group and specifies the counted number of dot-on pixels as the dot number data of the object pixel group. Some examples of the generated dot number data are shown in FIGS. 8a through 8d as described in the first embodiment.

On completion of the processing with regard to one object pixel group, the dot number data generation process determines whether the processing has been completed for all the pixels included in the object image (step S210a). When there is still any unprocessed pixel (step S210a: No), the dot number data generation process returns to step S200a to specify another pixel group as a next object pixel group and repeats the subsequent series of processing to generate the dot number data of the next object pixel group (step S208a). When the processing has been completed for all the pixels included in the object image (step S210: Yes) through the repetition of this processing flow, the computer 100 outputs the dot number data obtained with regard to the respective pixel groups to the color printer 200 (step S212a). The processing flow then exits from this dot number data generation process of FIG. 36 and goes back to the image printing process of FIG. 35. The color printer 200 accordingly receives the supplied dot number data of the individual pixel groups.

E-2. Dot on-Off State Determination Process of Third Embodiment

Figure 37:
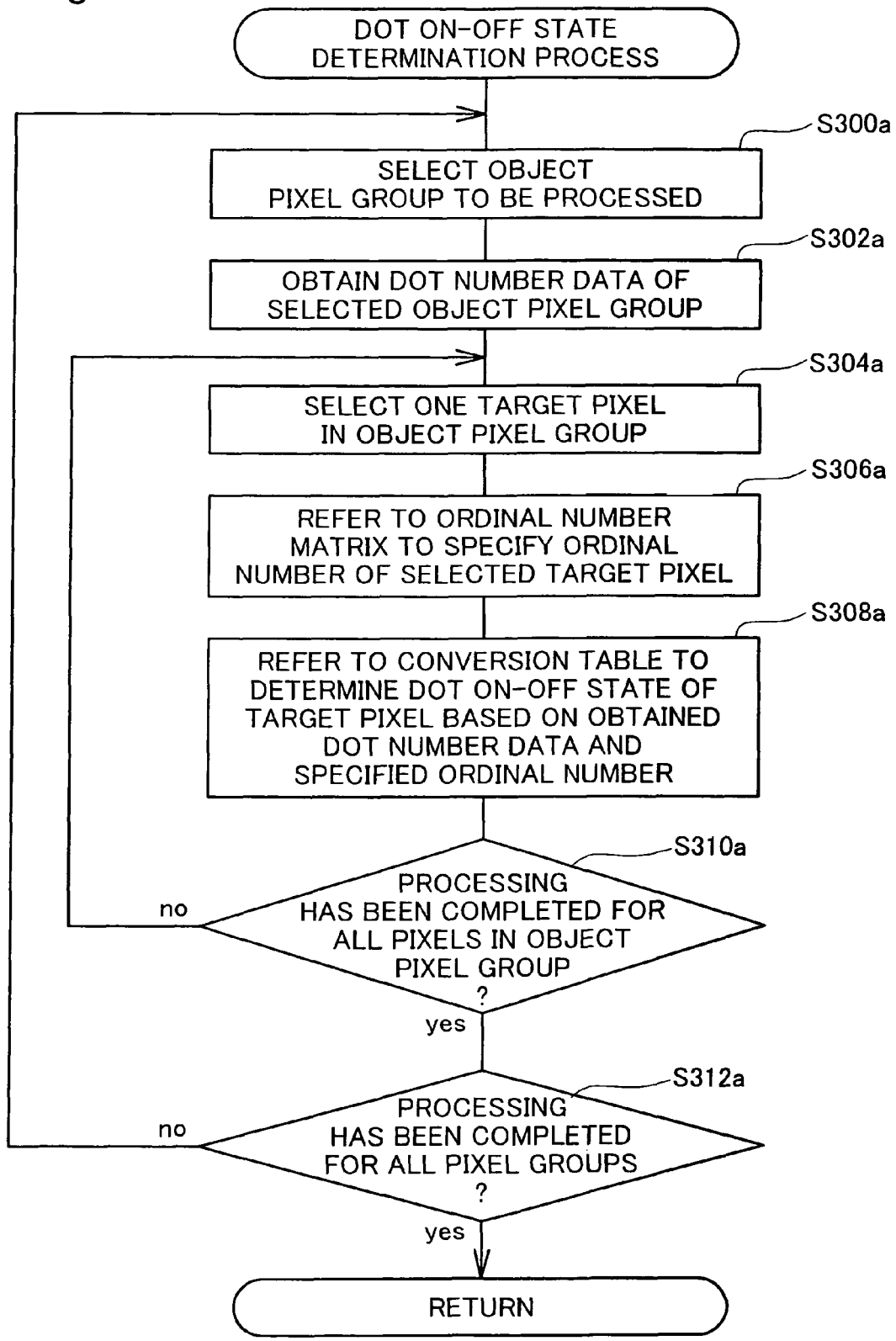
FIG. 37 is a flowchart showing the details of a dot on-off state determination process executed in the third embodiment.

The description regards the details of the dot on-off state determination process (step S109 in FIG. 35) to determine the dot on-off state of the respective pixels included in each pixel group, based on the dot number data supplied from the computer 100. FIG. 37 is a flowchart showing the details of the dot on-off state determination process executed in the third embodiment. This process is executed by the internal CPU of the control circuit 260 included in the color printer 200. FIGS. 38a, 38b, and 38c conceptually show determination of the dot on-off state of the respective pixels by the dot on-off state determination process. The dot on-off state determination process according to the flowchart of FIG. 37 is described below with reference to FIGS. 38a through 38c.

The dot on-off state determination process first selects one pixel group as an object to be processed (step S300a) and obtains the dot number data of the selected object pixel group (step S302a). The obtained dot number data of the object pixel group is '3' in the illustrated example of FIG. 38a.

The dot on-off state determination process then selects one target pixel as an object to be processed, among the respective pixels included in the selected object pixel group (step S304a) and specifies an ordinal number allocated to the selected target pixel, which shows the priority of dot creation in the target pixel in the object pixel group (step S306a). The ordinal number of the target pixel is readily specified by referring to a preset ordinal number matrix as shown in FIG. 38b. The ordinal number matrix of FIG. 38b sets ordinal numbers allocated to the respective pixel positions in each pixel group. For example, a pixel of an upper left corner in the pixel group has an ordinal number '1', and a pixel on the right adjacent to this corner pixel has an ordinal number '6'. The procedure of step S306a refers to the ordinal number matrix to specify the ordinal number allocated to the position of the selected target pixel. For the simplicity of explanation, it is here assumed that the processing flow consistently refers to one identical ordinal number matrix for specifying the ordinal numbers of all the pixels included in one image. The actual processing flow may store multiple different ordinal number matrixes and selectively use one of the ordinal number matrixes for each pixel group to specify the ordinal number of each target pixel.

After specification of the ordinal number of the selected target pixel, the dot on-off state determination process refers to a conversion table to determine the dot on-off state of the selected target pixel (step S308a). FIG. 39 conceptually shows a conversion table referred to for determination of the dot on-off state of each target pixel. The conversion table sets the dot on-off state corresponding to each combination of the ordinal number and the dot number data. Since each pixel group consists of 8 pixels, there are 8 ordinal numbers from 1 to 8 and the dot number data varies in the range of 0 to 8. The conversion table accordingly sets the dot on-off state corresponding to each of the 72 possible combinations. In the illustrated conversion table of FIG. 39, a value '1' representing the dot-on pixel is set to the combinations of dot creation, and a value '0' representing the dot-off pixel is set to the combinations of no dot creation.

In the illustrated example of FIG. 38, the object pixel group has the dot number data '3' as shown in FIG. 38a, and the pixel of the upper left corner in the pixel group has the ordinal number '1' as shown in FIG. 38b. The conversion table of FIG. 39 gives the value '1' corresponding to the combination of the ordinal number '1' and the dot number data '3'. Namely this pixel is specified as the dot-on pixel. In this manner, the procedure of step S308a in the flowchart of FIG. 37 refers to the conversion table and readily specifies the selected target pixel as either the dot-on pixel or the dot-off pixel, based on the dot number data of the object pixel group and the ordinal number of the target pixel.

After specification of the selected target pixel as either the dot-on pixel or the dot-off pixel, the dot on-off state determination process determines whether the processing has been completed for all the pixels included in the object pixel group (step S310a). When there is still any unprocessed pixel in the object pixel group (step S310a: No), the dot on-off state determination process returns to step S304a to select another pixel as a next target pixel in the object pixel group and repeats the processing of and after step S304a to determine the dot on-off state of the next target pixel.

When the processing has been completed to determine the dot on-off state with regard to all the pixels included in the object pixel group (step S310a: Yes), the dot on-off state determination process subsequently determines whether the processing has been completed for all the pixel groups supplied with the generated dot number data (step S312a). When there is still any unprocessed pixel group (step S312a: No), the dot on-off state determination process returns to step S300a to select another pixel group as a next object pixel group and repeats the subsequent series of processing. Repetition of this series of processing fully converts the dot number data supplied from the computer 100 into dot state data representing the dot on-off state of the individual pixels. On completion of the processing with regard to all the pixel groups (step S312a: yes), the processing flow exits from this dot on-off state determination process of FIG. 37 and goes back to the image printing process of FIG. 35.

As described above, the dot on-off state determination process of the third embodiment obtains the dot number data of each object pixel group, refers to the ordinal number matrix to specify an ordinal number of each target pixel included in the object pixel group, and refers to the conversion table to determine the dot on-off state of the target pixel corresponding to the combination of the obtained dot number data and the specified ordinal number. The dot on-off state of each pixel is thus readily determinable by this extremely simple procedure. This arrangement enables extremely high-speed generation of the dot state data representing the dot on-off state of the individual pixels from the dot number data.

The procedure of the third embodiment simply refers to the stored data to determine the dot on-off state of the individual pixels. The dot on-off state determination process of the third embodiment may thus be actualized by a hardware element, for example, an IC chip with an exclusive logic circuit. The hardware-based execution of the dot on-off state determination process enables the higher-speed processing and thus ensures the higher-speed image printing.

Another advantage of this embodiment is the less conditional branching, which is effectively combined with the latest pipelining technique adopted in the computer to enhance the processing speed, as described previously in the second embodiment.

The dot on-off state determination process of the third embodiment has various advantages for the high-speed processing as described above. Such advantages enable quick conversion of the dot number data into the dot state data representing the dot on-off state of the individual pixels under various conditions and thereby ensure the high-speed image printing.

E-3. Modifications

The dot on-off state determination process of the third embodiment consistently refers to one identical ordinal number matrix or selectively refers to one of multiple different ordinal number matrixes arranged at random to determine the dot on-off state of the individual pixels. As described previously in the first embodiment with reference to FIGS. 8a through 8d and FIGS. 9a through 9d, ordinal number matrixes may be provided according to a dither matrix. One adequate ordinal number matrix is selected corresponding to the position of each pixel group and is referred to for determination of the dot on-off state of the respective pixels included in the pixel group. This arrangement enables appropriate determination of the dot on-off state of the individual pixels and accordingly ensures the high-quality image printing. This technique is described below as a modified processing flow of the dot on-off state determination process as one modified example of the third embodiment.

Figure 40:
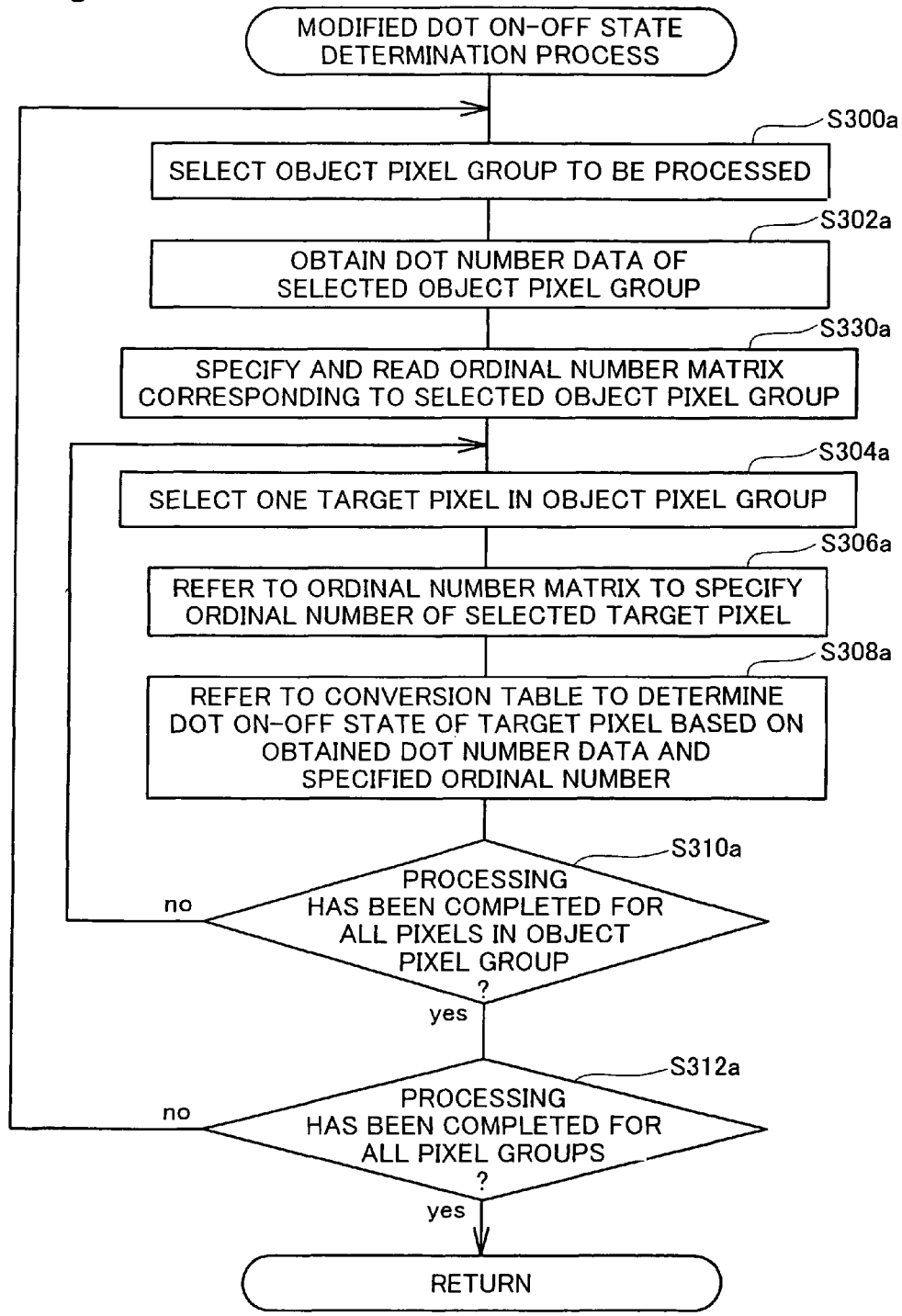
FIG. 40 is a flowchart showing a modified processing flow of the dot on-off state determination process.

FIG. 40 is a flowchart showing a modified processing flow of the dot on-off state determination process. This modified dot on-off state determination process of FIG. 40 is identical with the dot on-off state determination process of FIG. 37, except additional step S330a. After obtaining the dot number data of the selected object pixel group (step S302a), the modified dot on-off state determination process specifies and reads an ordinal number matrix corresponding to the selected object pixel group among stored multiple different ordinal number matrixes (step S330a). The procedure of this step is described in detail with reference to FIGS. 41a through 41d and FIGS. 42a through 42d.

Figure 41A:
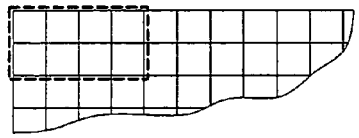
FIGS. 41a through 41d show a method of providing multiple ordinal number matrixes that are referred to in the modified processing flow of the dot on-off state determination process.

FIGS. 41a through 41d show a method of providing multiple ordinal number matrixes that are referred to in the modified processing flow of the dot on-off state determination process. As described above, each pixel group includes the total of 8 pixels, that is, 4 pixels in the main scanning direction by 2 pixels in the sub-scanning direction. The dither matrix is accordingly divided into multiple blocks, where each block includes threshold values for the total of 8 pixels, that is, 4 pixels in the main scanning direction by 2 pixels in the sub-scanning direction. FIG. 41a conceptually shows one block of threshold values for 8 pixels at an upper left corner of the dither matrix. As shown in FIG. 6 (see the first embodiment), the dither matrix used here has the size of 128 pixels in the main scanning direction and 64 pixels in the sub-scanning direction. When threshold values for 4 pixels in the main scanning direction by 2 pixels in the sub-scanning direction are collected to one block, the dither matrix is divided into the total of 1024 blocks, that is, 32 blocks in the main scanning direction and 32 blocks in the sub-scanning direction.

Figure 41B:
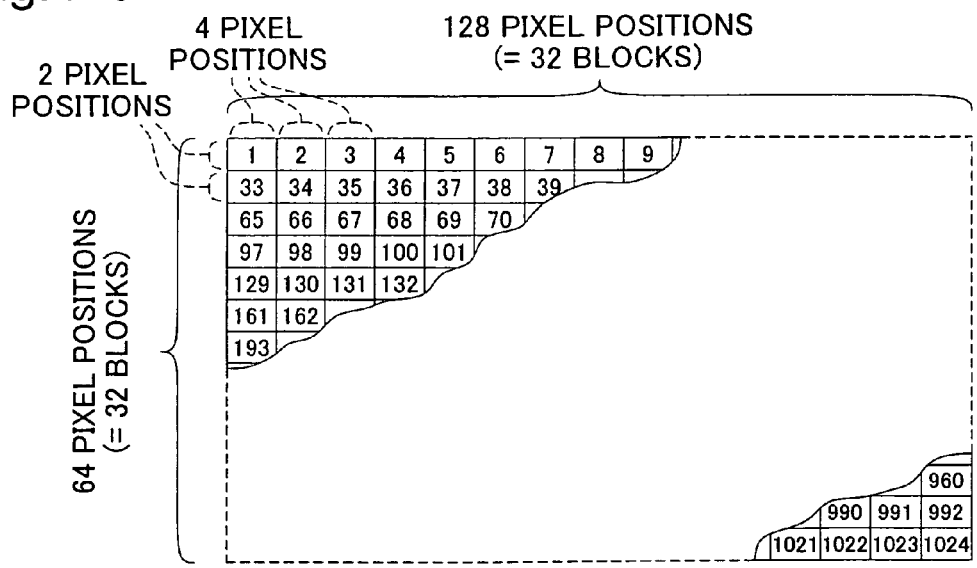
Figure 41C:
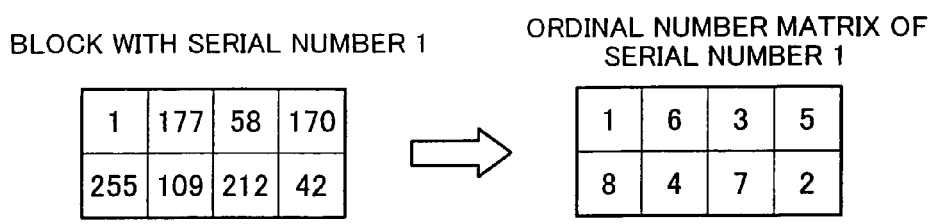

Serial numbers of 1 to 1024 are allocated to these 1024 blocks as shown in FIG. 41b. One ordinal number matrix is generated from each of the 1024 blocks with the serial numbers of 1 to 1024. FIG. 41c shows a procedure of generating an ordinal number matrix of the serial number 1 from a block with the serial number 1. The left half of FIG. 41c shows threshold values of the dither matrix included in the block with the serial number 1. As described previously with reference to FIG. 7, the dither technique compares the tone value of image data at each pixel with a threshold value at a corresponding pixel position in the dither matrix and specifies the pixel having the greater tone value than the threshold value as a dot-on pixel. Namely the pixel having the smaller threshold value at the corresponding position in the dither matrix has the higher potential for dot creation. In the block of the serial number 1 shown in FIG. 41c, a pixel having a smallest threshold value '1' is expected to have the highest priority of dot creation. An ordinal number '1' is thus given to this pixel. Similarly a pixel having a second smallest threshold value '42' is expected to have the second highest priority of dot creation. An ordinal number '2' is thus given to this pixel. In this manner, ordinal numbers '1' to '8' are sequentially allocated to the pixels of the block in the ascending order of the threshold values. This gives the ordinal number matrix of the serial number 1 shown in the right half of FIG. 41c.

Figure 41D:
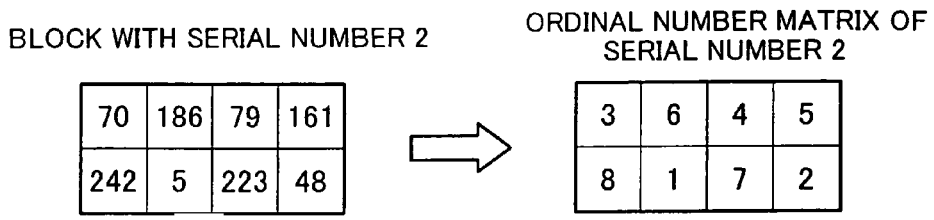

Similarly an ordinal number matrix of the serial number 2 is obtained by sequentially allocating the ordinal numbers '1' to '8' to the pixels of the block in the ascending order of the threshold values as shown in FIG. 41d. This series of operations is repeated with regard to all the blocks with the serial number '1' to the serial number '1024'. This generates and stores ordinal number matrixes of the serial number '1' to the serial number '1024'.

At step S330a in the flowchart of FIG. 40, the modified dot on-off state determination process specifies and reads an ordinal number matrix corresponding to the selected object pixel group among the ordinal number matrixes of the serial number '1' to the serial number '1024'. FIGS. 42a through 42d show a method of selecting one ordinal number matrix corresponding to an object pixel group. In the illustrated example of FIG. 42a, an object pixel group as the target of determination of the dot on-off state is located at a position defined by an n-th pixel group in the main scanning direction and an m-th pixel group in the sub-scanning direction from an upper left corner of an image as the origin. The position of this object pixel group is expressed by coordinate values (n,m).

The size of the dither matrix is generally not as large as an image. The dither technique thus repeatedly applies one identical dither matrix onto the image data with its successive positional shifts. Because of the similar reason, the modified dot on-off state determination process of FIG. 40 uses one identical dither matrix with its successive positional shifts. Any of diverse methods may be adopted to shift the position of the dither matrix in this modified dot on-off state determination process, as the applicability of the various techniques to the positional shifts in the dither technique. For the convenience of explanation, it is here assumed that the simplest method of shifting the dither matrix in the main scanning direction is adopted for the positional shifts. FIG. 42b conceptually shows repeated application of one identical dither matrix with its successive positional shifts in the main scanning direction.

As shown in FIG. 41a, the size of each block as a division of the dither matrix is identical with the size of each pixel group specified as the target of generation of dot number data. In the positional shift of the dither matrix as shown in FIG. 42b, each block in the dither matrix is located at the position of one pixel group. Namely one of the blocks as divisions of the dither matrix is applied to each pixel group.

In the illustrated example, a specific block of the dither matrix at a position defined by an N-th block in the main scanning direction and an M-th block in the sub-scanning direction is applied onto the object pixel group. As shown in FIG. 41b, the dither matrix includes 32 blocks both in the main scanning direction and in the sub-scanning direction. The object pixel group to be processed has the coordinate values (n,m) and is located at the position defined by the n-th pixel group in the main scanning direction and the m-th pixel group in the sub-scanning direction from the upper left corner of the image as the origin. The values N and M are thus given as:

$$N = n - \text{int}(n/32) \times 32$$

$$M = m - \text{int}(m/32) \times 32$$

where 'int' denotes an operator of dropping the figures after the decimal point and rounding down the value to the nearest integer. The arithmetic operation int(n/32) drops the figures after the decimal point and rounds down the value of n/32 to the nearest integer. The procedure of determining the dot on-off state with regard to a certain pixel group calculates the values N and M from the coordinate values (n,m) of the certain pixel group according to the above equations, specifies a serial number of the block at the corresponding position in the dither matrix defined by the calculated values N and M, and uses an ordinal number matrix generated from the block of the specified serial number.

The values M and N are obtainable by an extremely simpler method without the arithmetic operations of FIG. 42d. FIG. 43 shows a concrete procedure of selecting an ordinal number matrix according to the coordinate values (n,m) of the object pixel group. FIG. 43(a) conceptually shows 10-bit binary data representing the value 'n'. For the purpose of bit discrimination, serial numbers of 1 to 10 are sequentially allocated to the upper-most bit to the lower-most bit.

The procedure of selecting the ordinal number matrix first performs the arithmetic operation of int(n/32), which divides the value 'n' by 32 and drops the figures after the decimal point. The division by 32 is equivalent to a rightward shift of the binary data by 5 bits. The calculation of the binary data as an integer automatically drops the figures after the decimal point. Namely the binary data of int(n/32) is obtained by a simple rightward shift of the binary data of the value 'n' shown in FIG. 43(a) by 5 bits. FIG. 43(b) conceptually shows binary data of int(n/32) obtained by the bit shift of the binary data of the value 'n'.

The binary data of int(n/32) is multiplied by 32. The multiplication by 32 is equivalent to a leftward shift of the binary data by 5 bits. FIG. 43(c) conceptually shows binary data of int(n/32)×32 obtained by the bit shift of the binary data of the value 'n'.

Subtraction of the binary data of int(n/32)×32 from the binary data of the value 'n' gives the value N. As clearly understood from the comparison between the binary data of the value 'n' (see FIG. 43(a)) and the binary data of int(n/32)×32 (see FIG. 43(c)), these two binary data have common digits in the upper 5 bits. The binary data of the subtrahend int(n/32)×32 has 0 in all the lower 5 bits. Simple extraction of the lower 5 bits from the binary data of the minuend 'n' accordingly determines the value N. Namely the value N is readily obtainable by the simple AND operation (logical multiplication) of the binary data of FIG. 43(a) and the mask data of FIG. 43(e).

The above description with reference to FIG. 43 regards the process of calculating the value N representing the block position in the dither matrix from the value 'n' in the coordinate values (n,m) of the object pixel group. In a similar manner, the value M representing the block position in the dither matrix is readily obtainable from the value 'm'. Namely the procedure of this embodiment calculates the values N and M from the values 'n' and 'm' in the given coordinate values (n,m) of each object pixel group and specifies the serial number of an ordinal number matrix to be applied to the object pixel group. At step S330a, the modified dot on-off state determination process of FIG. 40 specifies and reads an ordinal number matrix corresponding to the selected object pixel group according to the above procedure.

After specifying and reading the ordinal number matrix corresponding to the selected object pixel group, the modified flow of the dot on-off state determination process selects one target pixel as an object to be processed, among the respective pixels included in the selected object pixel group (step S304a), refers to the ordinal number matrix to specify an ordinal number allocated to the selected target pixel (step S306a), and refers to the conversion table to determine the dot on-off state of the selected target pixel (step S308a). The series of processing is repeated until completion of the processing with regard to all the pixels in the selected object pixel group and eventually with regard to all the pixel groups. On completion of the processing with regard to all the pixel groups (step S312a: yes), the processing flow exits from this modified dot on-off state determination process of FIG. 40 and goes back to the image printing process of FIG. 35.

As described above, the modified dot on-off state determination process provides multiple ordinal number matrixes based on the dither matrix and uses an ordinal number matrix generated from a corresponding portion of the dither matrix, which is to be applied to the position of a certain pixel group in the dither technique, to determine the dot on-off state in the certain pixel group. This arrangement determines the dot on-off state to give a dot distribution substantially equivalent to the dot distribution according to the dither matrix. As known in the art, the dither matrix has the adequately arranged threshold values to give an adequate dot distribution. The substantially equivalent dot distribution by this modified dot on-off state determination process accordingly leads to the high-quality image printing.

Application of the same dither matrix used in the dot number data generation process of FIG. 36 to provide the ordinal number matrixes enables the dot distribution according to the dot number data to be, in most cases, the same as the dot distribution according to the determination of the dot on-off state of each pixel by the dither technique, as described in the first embodiment (see FIGS. 8a through 8d and FIGS. 9a through 9d). A drastic change in tone value of the image data in one pixel group gives a different dot distribution. The image data, however, generally has similar (or identical) tone values in adjoining pixels and accordingly gives the same dot distribution in most cases. Application of the same dither matrix thus determines the dot on-off state to give an adequate dot distribution and ensures the high-quality image printing.

The modified dot on-off state determination process requires storage of multiple ordinal number matrixes (1024 ordinal number matrixes in the above example), in addition to the conversion table. Occupying a large memory capacity by the storage of the conversion table and the multiple ordinal number matrixes is undesirable for practical application on actual products. As described below, however, the storage of the conversion table and the multiple ordinal number matrixes does not occupy the large memory capacity.

The description first regards the memory capacity required for storage of the conversion table. As shown in FIG. 39, the conversion table sets the dot on-off state corresponding to each combination of the ordinal number and the dot number data. The data size of the conversion table is accordingly specified by the total number of different ordinal numbers and the total number of dot number data and the data length required for expressing the dot on-off state of each pixel. The ordinal numbers represent the sequence of dot creation in the respective pixels included in each pixel group. The total number of different ordinal numbers is accordingly identical with the number of pixels included in one pixel group. The dot number data represents the number of dots to be created in each pixel group and takes one of the (number of pixels+1) options, that is, from 0 to the number of pixels. Each pixel takes one of the two states, that is, the dot-on state or the dot-off state, so that the dot on-off state of one pixel is expressible as 1-bit data. The memory capacity required for storage of the conversion table is accordingly given by:

$$n \times (n+1) \text{ bits}$$

where 'n' represents the number of pixels included in one pixel group. The number of pixels included in one pixel group is 16 at the maximum. The storage of the conversion table thus occupies only a small memory capacity.

The description then regards the memory capacity required for storage of the ordinal number matrixes. The memory capacity for storage of the ordinal number matrixes is given as the product of the memory capacity of one ordinal number matrix and the number of the ordinal number matrixes. The ordinal number matrix sets the priorities of dot creation in the respective pixels included in each pixel group. The memory capacity of one ordinal number matrix accordingly depends upon the number of pixels included in one pixel group. The number of ordinal number matrixes is equal to the number of blocks, which are obtained as divisions of the dither matrix to have the identical size with the size of each pixel group as described previously with reference to FIGS. 41a through 41d, and is specified by the size of the dither matrix and the size of each pixel group. The memory capacity required for storage of the ordinal number matrixes is accordingly determined by the size of the dither matrix and the size of each pixel group.

FIG. 44 shows estimation results of the memory capacity required for storage of ordinal number matrixes with regard to combinations of different sizes of the dither matrix and different sizes of each pixel group. The estimation is based on three different sizes of the dither matrix, 64×64 (64 pixels in the main scanning direction by 64 pixels in the sub-scanning direction), 128×64 (128 pixels in the main scanning direction by 64 pixels in the sub-scanning direction), and 128×128 (128 pixels in the main scanning direction by 128 pixels in the sub-scanning direction), and three different sizes of each pixel group, 2×2 (2 pixels in the main scanning direction by 2 pixels in the sub-scanning direction), 4×2 (4 pixels in the main scanning direction by 2 pixels in the sub-scanning direction), and 4×4 (4 pixels in the main scanning direction by 4 pixels in the sub-scanning direction). The estimation result of the above embodiment, that is, under the conditions of 128× 64 as the size of the dither matrix and 4×2 as the size of each pixel group, is encircled by the broken line in FIG. 44. The estimation of the memory capacity required for storage of ordinal number matrixes is described below with regard to this example.

The number of different ordinal number matrixes is equal to the number of blocks obtained as divisions of the dither matrix to have the identical size with the size of each pixel group. Division of the number of pixels (128×64) in the dither matrix by the number of pixels (4×2) in each pixel group gives 1024 as the number of ordinal number matrixes. The ordinal numbers set in each ordinal number matrix are in the range of 1 to 8, so that one ordinal number is expressible by 3-bit data. Each ordinal number matrix has 8 ordinal numbers, and the memory capacity required for storage of one ordinal number matrix is 3×8=24 bits (3 bytes). The memory capacity required for storage of all the 1024 ordinal number matrixes is 3 kilobytes.

When each pixel group includes 4 pixels, the ordinal numbers set in each ordinal number matrix are in the range of 1 to 4 and one ordinal number is expressible by 2-bit data. Each ordinal number matrix has 4 ordinal numbers, and the memory capacity required for storage of one ordinal number matrix is 2×4=8 bits (1 byte). When each pixel group includes 16 pixels, the data length required for expressing one ordinal number is 4 bits. The memory capacity required for storage of one ordinal number matrix including 16 ordinal numbers is 4×16=64 bits (8 bytes).

FIG. 44 shows the estimation results of the memory capacity required for storage of all the ordinal number matrixes under various conditions. As clearly understood from these estimation results, the memory capacity required for storage of the ordinal number matrixes is 10 kilobytes at the maximum. Namely the storage of the conversion table and the ordinal number matrixes does not require a large memory capacity and makes no severe interference in practical application on actual products.

F. Fourth Embodiment

In the system of the third embodiment described above, the color printer 200 is capable of creating only one type of dots. For the enhanced printing quality, multivalued dot printers have widely been used to create multiple different types of dots, for example, variable size dots or dots of different ink densities. The second application of the invention is adoptable in the multivalued dot printers to exert the significant effects. The second application of the invention executed by a multivalued dot printer is described below as a fourth embodiment.

F-1. General Flow of Image Printing Process in Fourth Embodiment

The general flow of the image printing process of the fourth embodiment is similar to the general flow of the image printing process of the third embodiment shown in the flowchart of FIG. 35. The image printing process of the fourth embodiment is described briefly with reference to the flowchart of FIG. 35.

In the image printing process of the fourth embodiment, the computer 100 receives image data (step S100 in FIG. 35), performs the color conversion process (step S102), performs the resolution conversion process to convert the resolution of image data into the printing resolution (step S104), and starts the dot number data generation process (step S107).

As mentioned above, in the system of the third embodiment, the color printer 200 is capable of creating only one type of dots. The dot number data generation process of the third embodiment generates dot number data representing the number of dots to be created in each pixel group and outputs the generated dot number data to the color printer 200. In the system of the fourth embodiment, on the other hand, the color printer 200 is capable of creating multiple different types of dots, for example, three variable size dots, that is, large-size dot, medium-size dot, and small-size dot. The dot number data generation process of the fourth embodiment accordingly generates dot number data representing the numbers of large-size dots, medium-size dots, and small-size dots to be created in each pixel group.

For the efficient transmission of the dot number data, the data representing the numbers of large-size dots, medium-size dots, and small-size dots is not directly output but is encoded for reduction of the data volume. The details of the dot number data generation process of the fourth embodiment will be described later. In the following description, the color printer 200 creates the variable size dots, the large-size dot, the medium-size dot, and the small-size dot. The multiple different types of dots are, however, not restricted to such variable size dots but may be, for example, dots of different ink densities or dots of different minute-dot formation densities when each dot is formed by multiple minute dots.

The CPU included in the control circuit 260 of the color printer 200 receives the dot number data supplied from the computer 100 and starts a dot on-off state determination process (step S109 in FIG. 35). The dot on-off state determination process of the fourth embodiment receives the encoded dot number data and determines the dot on-off state in each of the pixels included in each pixel group, that is, creation of the large-size dot, creation of the medium-size dot, creation of the small-size dot, or creation of no dot. The details of the dot on-off state determination process of the fourth embodiment will be described later.

After determination of the dot on-off state with regard to the variable size dots, the large-size dot, the medium-size dot, and the small-size dot, the printer 200 actually creates the large-size dots, the medium-size dots, and the small-size dots according to the obtained dot state data (step S110 in FIG. 35). The creation of the large-size dots, the medium-size dots, and the small-size dots gives a resulting printed image according to the image data.

F-2. Dot Number Data Generation Process of Fourth Embodiment

In the image printing process of the fourth embodiment, the dot number data generation process generates encoded dot number data representing the numbers of large-size dots, medium-size dots, and small-size dots to be created in each pixel group.

Figure 45:
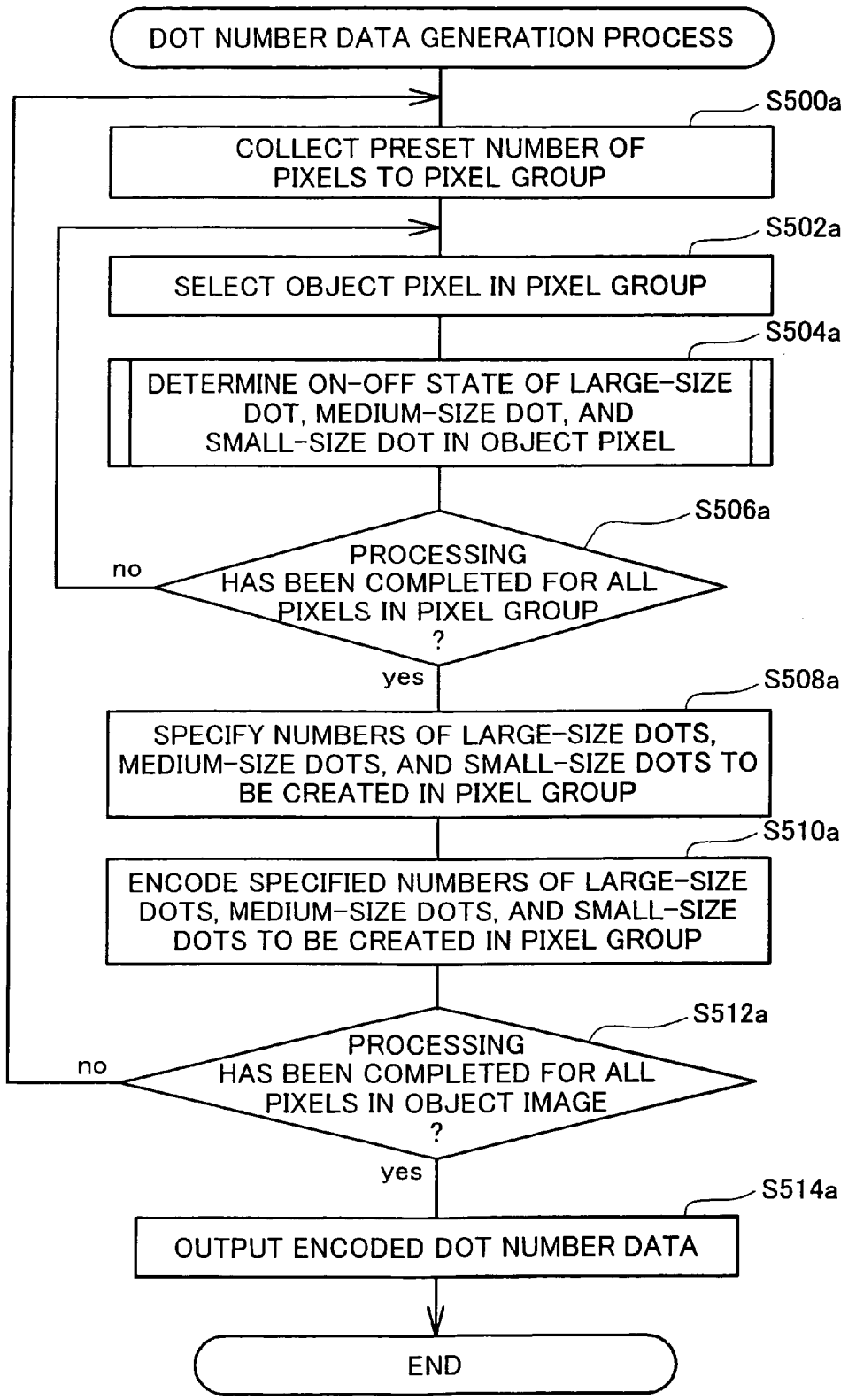
FIG. 45 is a flowchart showing a process of specifying the numbers of large-size dots, medium-size dots, and small-size dots to be created in each pixel group and generating dot number data in a fourth embodiment.

FIG. 45 is a flowchart showing a process of specifying the numbers of large-size dots, medium-size dots, and small-size dots to be created in each pixel group and generating dot number data. The details of this process are disclosed in Japanese Patent No. 3292104 as mentioned previously. The dot number data generation process first collects a preset number of adjacent pixels included in an object image to one pixel group (step S500a). Like the third embodiment described above, the pixel group includes the total of 8 pixels, that is, 4 pixels in the main scanning direction by 2 pixels in the sub-scanning direction.

The dot number data generation process then selects one pixel in the pixel group as a processing object for determination of the dot on-off state (step S502a) and determines the dot on-off state of the selected object pixel with regard to the large-size dot, the medium-size dot, and the small-size dot (step S504a). The determination of the dot on-off state with regard to the large-size dot, the medium-size dot, and the small-size dot means conversion of a multi-tone image into data of the lower number of tones expressed by combinations of the large-size dot, the medium-size dot, and the small-size dot. Such conversion is one application of the halftoning technique (multi-valuing process) in the broad sense. The halftoning technique has been explained previously with reference to FIGS. 22, 23, 24, and 26 and is not specifically described here.

The dot number data generation process adopts the halftoning technique to sequentially determine the dot on-off state of each object pixel as one of the four states, creation of the large-size dot, creation of the medium-size dot, creation of the small-size dot, and creation of no dot and determines whether the processing has been completed with regard to all the pixels included in the pixel group (step S506a). On completion of the processing (step S506a: Yes), the dot number data generation process specifies the numbers of large-size dots, medium-size dots, and small-size dots to be created in the pixel group (step S508a).

After specification of the numbers of the respective size dots to be created in the pixel group, the dot number data generation process encodes the specified combination of the numbers of the respective size dots (for example, 1 large-size dot, 2 medium-size dots, and 1 small-size dot) (step S510a). Such encoding is required because of the following reason. When there are three different size dots, that is, the large-size dot, the medium-size dot, and the small-size dot, the processing flow without the encoding technique requires three individual outputs of the specified numbers of the three different size dots for each pixel group. The three individual outputs for each pixel group undesirably damage the effect of quick data supply from the computer 100 to the color printer 200 for the high-speed image printing. The dot number generation process of this embodiment accordingly encodes the combination of the specified numbers of the respective size dots to a preset code, instead of the individual outputs of the specified numbers of the respective size dots. The concrete procedure of encoding the combination of the numbers of large-size dots, medium-size dots, and small-size dots has been explained previously (see FIG. 26) and is not specifically described here.

After encoding the combination of the numbers of the respective size dots with regard to the pixel group, the dot number data generation process determines whether the processing has been completed for all the pixels included in the object image (step S512a). When there is still any unprocessed pixel, the dot number data generation process returns to step S500a and repeats the subsequent series of processing. When the processing has been completed for all the pixels included in the object image, the dot number data generation process of FIG. 45 terminates after output of the encoded dot number data (step S514a).

F-3. Dot on-Off State Determination Process of Fourth Embodiment

The description regards the details of the dot on-off state determination process of the fourth embodiment that receives encoded dot number data for each pixel group and determines the dot on-off state in each of the pixels included in the pixel group. The dot on-off state determination process of the third embodiment refers to the conversion table to directly determine the dot on-off state in each pixel corresponding to the combination of the received dot number data and the ordinal number of the pixel. The dot on-off state determination process of the fourth embodiment similarly refers to a conversion table to directly determine the dot on-off state in each pixel with regard to the large-size dot, the medium-size dot, and the small-size dot corresponding to the combination of the encoded dot number data and the ordinal number of the pixel. The conventional dot on-off state determination process based on the dot number data without using a conversion table is described first for the purpose of comparison with the higher-speed processing using a conversion table. The description then regards the dot on-off state determination process of the fourth embodiment that directly determines the dot on-off state in each pixel with regard to the large-size dot, the medium-size dot, and the small-size dot based on the dot number data with reference to a conversion table.

F-3-1. Dot on-Off State Determination Process without Conversion Table

Figure 46:
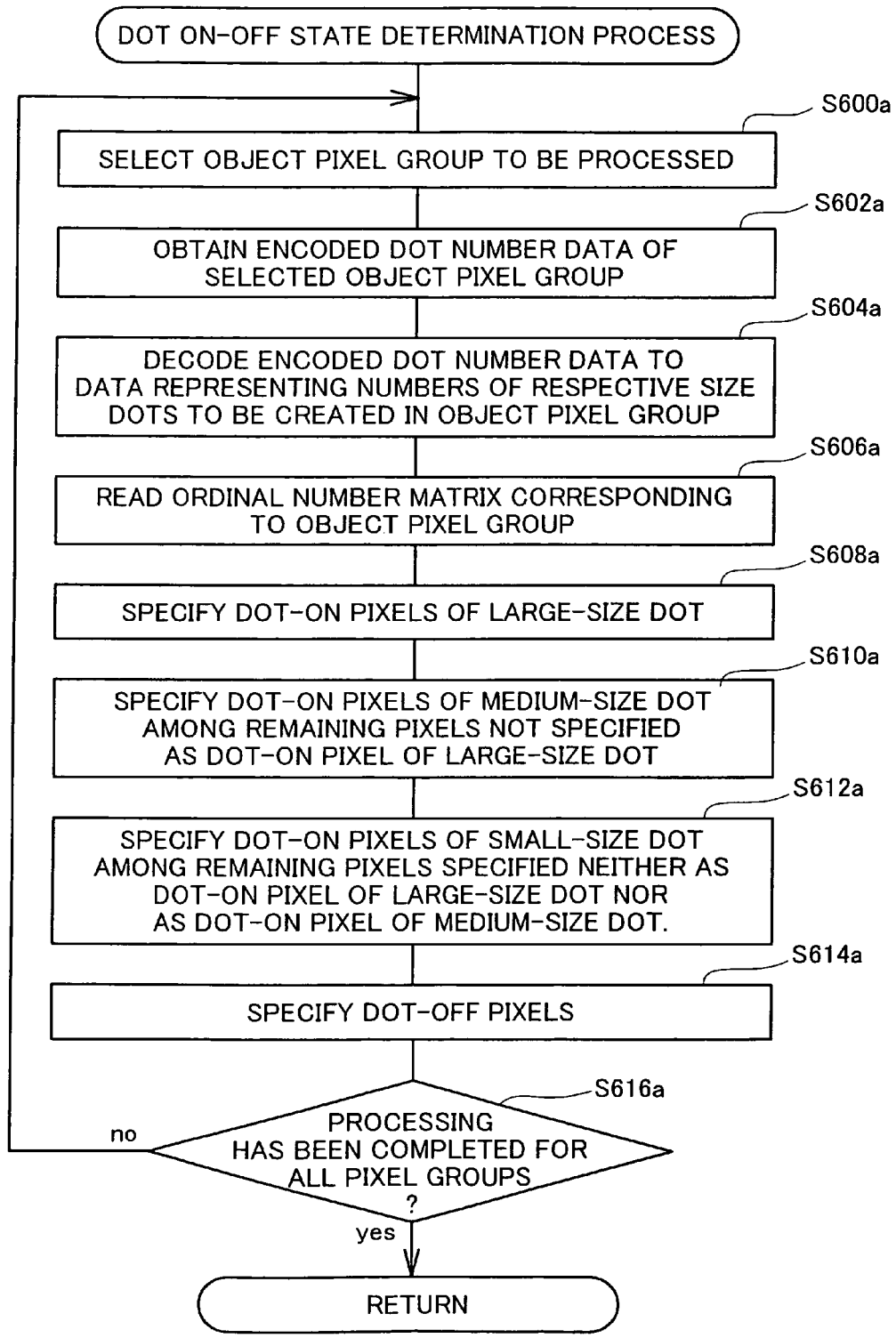
FIG. 46 is a flowchart showing a dot on-off state determination process that determines the dot on-off state in each pixel with regard to the large-size dot, the medium-size dot, and the small-size dot without referring to a conversion table.

FIG. 46 is a flowchart showing a dot on-off state determination process that determines the dot on-off state in each pixel with regard to the large-size dot, the medium-size dot, and the small-size dot without referring to a conversion table. This conventional process is described briefly according to the flowchart. The dot on-off state determination process of FIG. 46 first selects an object pixel group as a current processing target (step S600a) and obtains dot number data of the selected object pixel group (step S602a). The obtained dot number data has been encoded in advance. The process accordingly decodes the obtained dot number data to data representing the numbers of large-size dots, medium-size dots, and small-size dots to be created in the object pixel group (step S604a). The dot number data is decoded according to a decoding table (see FIG. 30).

The process reads an ordinal number matrix corresponding to the object pixel group with the decoded dot number data (step S606a) and refers to the ordinal number matrix to sequentially determine the dot on-off state of the large-size dot, the medium-size dot, and the small-size dot in each of the pixels included in the object pixel group. The ordinal number matrix sets the priorities of dot creation allocated to the respective pixels included in one pixel group as described previously with reference to FIGS. 41a through 41d. Determination of the dot on-off state in each pixel with regard to the large-size dot, the medium-size dot, and the small-size dot according to the ordinal number matrix has described above with reference to FIG. 31.

The process first specifies dot-on pixels of the large-size dot (step S608a). In the illustrated example, the number of large-size dots to be created in the object pixel group is equal to 1. A pixel having the highest potential for dot creation, that is, a pixel having an ordinal number '1' in the ordinal number matrix, is specified as a dot-on pixel of the large-size dot. When the number of large-size dots to be created in a certain pixel group is equal to N, pixels having ordinal numbers '1' to 'N' in a corresponding ordinal number matrix are specified as N dot-on pixels of the large-size dot. In the illustrated example of FIG. 31, the dot-on pixel of the large-size dot is filled with dense slant lines.

After specification of the dot-on pixels of the large-size dot, the process specifies dot-on pixels of the medium-size dot among the remaining pixels that have not been specified as the dot-on pixel of the large-size dot (step S610a). The process sequentially specifies dot-on pixels of the small-size dot among the remaining pixels that have specified neither as the dot-on pixel of the large-size dot nor the dot-on pixel of the medium-size dot (step S612a), and sets all the remaining pixels that have not been specified as any of the dot-on pixel of the large-size dot, the dot-on pixel of the medium-size dot, and the dot-on pixel of the small-size dot to dot-off pixels (step S614a).

After decoding the encoded dot number data of the selected pixel group and specifying the dot-on pixels of the large-size dot, the medium-size dot, and the small-size dot, the process determines whether the specification has been completed for all pixel groups (step S616a). When there is any unprocessed pixel group (step S616a: No), the process returns to step S600a to select a next object pixel group and repeats the subsequent series of processing. On completion of the processing for all the pixel groups (step S616a: Yes), the dot on-off state determination process of FIG. 46 is terminated.

F-3-2. Dot on-Off State Determination Process with Conversion Table

The conventional dot on-off state determination process of FIG. 46 receives the encoded dot number data of each pixel group, decodes the encoded dot number data into data representing the numbers of large-size dots, medium-size dot, and small-size dots to be created in the pixel group, and specifies the dot-on pixels of the respective size dots in the pixel group. This conventional procedure requires the two-step processing. The dot on-off state determination process of the fourth embodiment, however, refers to a conversion table and immediately specifies the dot-on pixels of the respective size dots in each pixel group without decoding the dot number data as described below.

The dot on-off state determination process of the fourth embodiment is similar to the modified dot on-off state determination process of FIG. 40 described above as the modified example of the third embodiment but uses a different conversion table. The dot on-off state determination process of the fourth embodiment is thus described below with reference to the flowchart of FIG. 40.

The dot on-off state determination process of the fourth embodiment first selects an object pixel group as a processing target (step S300a), obtains dot number data of the selected object pixel group (step S302a), and reads an ordinal number matrix corresponding to the selected object pixel group among storage of multiple ordinal number matrixes (step S330a). As described previously with reference to FIGS. 41a through 41d and FIGS. 42a through 42d, the values N and M are determined by extraction of the lower 5 bits of the coordinate values 'n' and 'm' of the pixel group. The selected ordinal number matrix is generated from the N-th row, M-th column block in the dither matrix.

The dot on-off state determination process of the fourth embodiment then selects one target pixel as an object of determination of the dot on-off state from the selected object pixel group (step S304a) and refers to the ordinal number matrix to obtain the ordinal number of the target pixel (step S306a). The process then refers to a conversion table to specify the dot on-off state of the target pixel (step S308).

The conversion table used in the dot on-off state determination process of the third embodiment stores the setting of the dot on-off data corresponding to each combination of the dot number data and the ordinal number (see FIG. 39). The conversion table used in the dot on-off state determination process of the fourth embodiment, on the other hand, stores the setting of the dot on-off state as one of the four different options, that is, creation of the large-size dot, creation of the medium-size dot, creation of the small-size dot, and creation of no dot, corresponding to each combination of the encoded dot number data and the ordinal number.

FIG. 47 conceptually shows a conversion table referred to in the dot on-off state determination process of the fourth embodiment. As described previously with reference to FIG. 26, the encoded code data takes one of 165 values in the range of 0 to 164. Each pixel group consists of 8 pixels and accordingly has ordinal numbers in the range of 1 to 8. The conversion table of the fourth embodiment sets one of the four values, '0' representing creation of no dot, '1' representing creation of the small-size dot, '2' representing creation of the medium-size dot, and '3' representing creation of the large-size dot, corresponding to each of 165×8=1320 combinations. Namely the dot on-off state of each target pixel is immediately determinable from the dot number data of an object pixel group and the ordinal number of the target pixel. The dot on-off state determination process of the fourth embodiment refers to the conversion table to immediately specify one of the four different dot states, that is, creation of the large-size dot, creation of the medium-size dot, creation of the small-size dot, and creation of no dot, in the target pixel (step S308a in FIG. 40).

The use of the conversion table as shown in FIG. 47 enables appropriate determination of the dot on-off state with regard to the large-size dot, the medium-size dot, and the small-size dot, because of the following reason. As described in the second embodiment with reference to FIGS. 30 and 31, the dot on-off state determination process without a conversion table generally has two processing steps. The first step converts encoded dot number data of one object pixel group to a combination of the numbers of large-size dots, medium-size dots, and small-size dots to be created in the object pixel group. The subsequent second step determines the dot on-off state of each pixel according to an ordinal number matrix allocated to the object pixel group. As shown in FIG. 30, the encoded dot number data one-to-one corresponds to the combination of the numbers of large-size dots, medium-size dots, and small-size dots. Namely one encoded dot number data unequivocally specifies the combination of the numbers of the respective size dots.

After decoding to the combination of the numbers of the respective size dots to be created in the object pixel group, the dot on-off state in each of the pixels included in the object pixel group is determined according to the ordinal number matrix allocated to the object pixel group as shown in FIG. 31. The dot on-off state in each pixel is thus determined by combining the ordinal number matrix with the specified numbers of the respective size dots. As mentioned above, the encoded dot number data unequivocally specifies the combination of the numbers of the respective size dots. Namely the combination of an ordinal number matrix allocated to each pixel group with encoded dot number data of the pixel group unequivocally determines the dot on-off state of the large-size dot, the medium-size dot, and the small-size dot in each of the pixels included in the pixel group.

The concrete procedure of determining the dot on-off state of each pixel based on the combination of the numbers of the respective size dots and the ordinal number matrix has been described previously as the second embodiment (see FIGS. 30 and 31).

The dot on-off state determination process of the fourth embodiment specifies in advance the dot type to be created in each pixel corresponding to each combination of the dot number data and the ordinal number and stores the settings as the conversion table shown in FIG. 47. The concrete procedure refers to the ordinal number matrix allocated to each pixel group to read the ordinal number of each pixel in the pixel group and subsequently refers to the conversion table to specify the dot type to be created in the pixel having the ordinal number. This appropriately determines the dot on-off state in each of the pixels included in one pixel group.

After determination of the dot on-off state of one target pixel, the dot on-off state determination process of the fourth embodiment determines whether the processing has been completed for all the pixels included in the object pixel group (step S310a in FIG. 40). When there is still any unprocessed pixel in the object pixel group (step S310a: No), the dot on-off state determination process returns to step S304a to select another pixel as a next target pixel in the object pixel group and repeats the subsequent series of processing. When the processing has been completed to determine the dot on-off state with regard to all the pixels included in the object pixel group (step S310a: Yes), the dot on-off state determination process subsequently determines whether the processing has been completed for all the pixel groups supplied with the encoded dot number data (step S312a). When there is still any unprocessed pixel group (step S312a: No), the dot on-off state determination process returns to step S300a to select another pixel group as a next object pixel group and repeats the subsequent series of processing. On completion of the processing with regard to all the pixel groups (step S312a: yes), the dot on-off state determination process of the fourth embodiment is terminated.

The dot on-off state determination process of the fourth embodiment receives encoded dot number data of each pixel group and refers to an ordinal number matrix allocated to the pixel group to read an ordinal number of each target pixel included in the pixel group. The process then refers to the conversion table and immediately specifies the dot on-off state of the target pixel with regard to the respective size dots corresponding to the combination of the encoded dot number data and the ordinal number of the target pixel. This arrangement does not require decoding of the encoded dot number data and enables prompt determination of the dot on-off state in each pixel, thus ensuring high-speed image output.

The dot on-off state determination process of the fourth embodiment simply reads data from the ordinal number matrix and the conversion table. This extremely simple processing is executable at a sufficiently high speed by even the color printer 200 of a relatively low throughput, as well as by the computer 100, and thereby ensures the high-speed image printing.

The dot on-off state determination process of the fourth embodiment determines the dot on-off state of each pixel by simply referring to the ordinal number matrix and the conversion table. This processing flow does not include conditional branching, which is effectively combined with the latest pipelining technique adopted in the computer to enhance the processing speed.

The dot on-off state determination process of the fourth embodiment readily and promptly determines the dot on-off state in each of the pixels included in each pixel group. This process requires storage of a large number of ordinal number matrixes and the conversion table as shown in FIG. 47. The storage of the conversion table and the ordinal number matrixes used in the dot on-off state determination process of the fourth embodiment does not require a large memory capacity and makes no severe interference in practical application on actual products, as in the third embodiment. The required memory capacity is described briefly.

As described in the third embodiment, the memory capacity required for storage of the ordinal number matrixes depends upon the size of the dither matrix and the size of each pixel group. The memory capacity of approximately 10 kilobytes is sufficient for storage of the ordinal number matrixes as shown in FIG. 44.

The conversion table stores the setting of the dot on-off state corresponding to each combination of the ordinal number and the dot number data as shown in FIG. 47. When each pixel group includes 8 pixels, there are 8 different ordinal numbers in the pixel group. The availability of the three variable size dots, that is, the large-size dot, the medium-size dot, and the small-size dot, gives 165 different values of the dot number data as described previously with reference to FIG. 26. The dot on-off state of each pixel takes one of the four different options, creation of the large-size dot, creation of the medium-size dot, creation of the small-size dot, and creation of no dot. One determination result of the dot on-off state is thus expressible as 2-bit data. The memory capacity required for storage of the conversion table of FIG. 47 is accordingly calculated as 8×165×2=2650 bits (=0.322 kilobytes).

FIG. 48 shows estimation results of the memory capacity required for storage of the conversion table with regard to various sizes of pixel groups. The memory capacity of several kilobytes is sufficient for storage of the conversion table. Namely the storage of the conversion table and the ordinal number matrixes used in the dot on-off state determination process of the fourth embodiment does not require a large memory capacity and makes no severe interference in practical application on actual products.

G. Third Application of Invention

Figure 49:
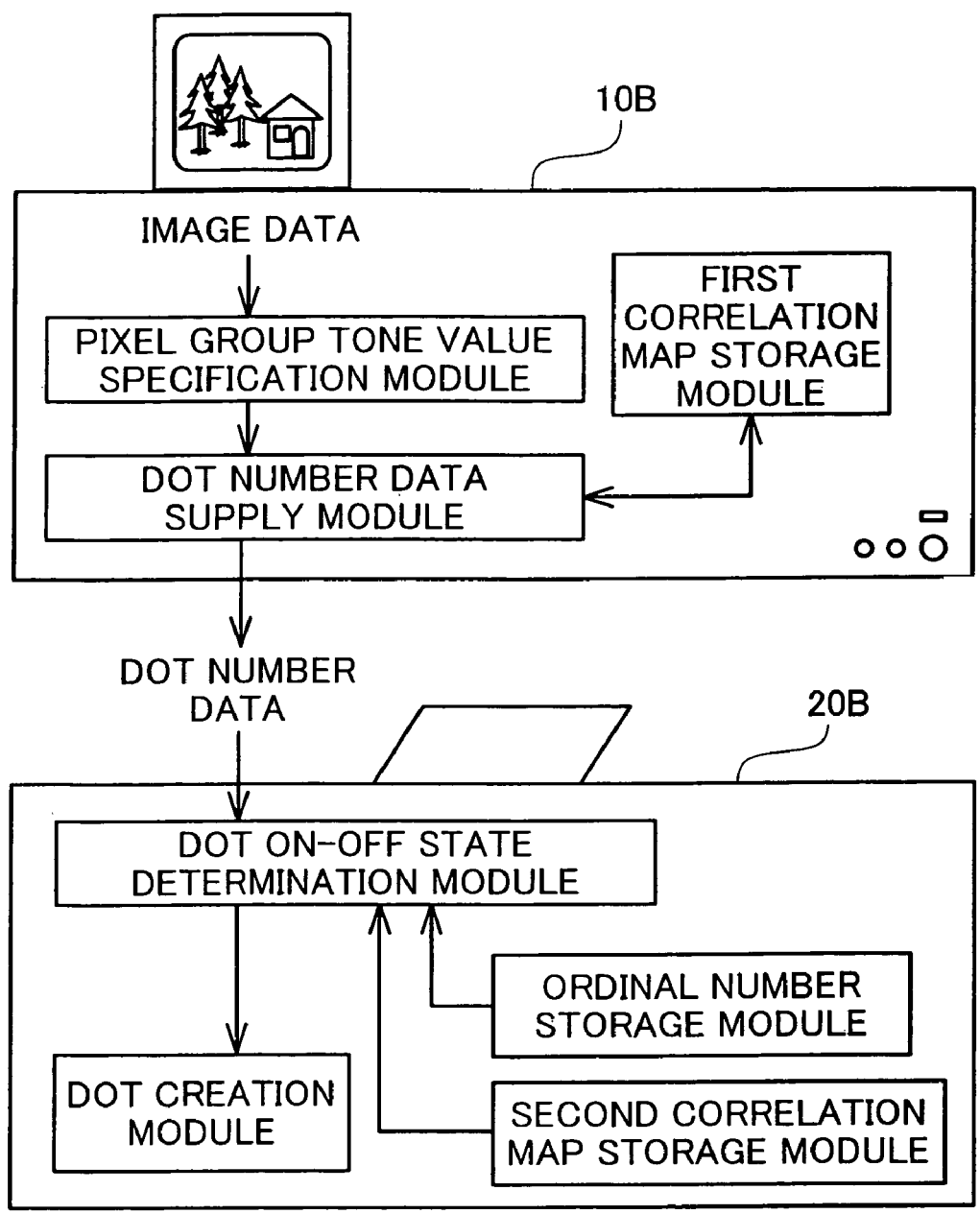
FIG. 49 schematically illustrates the general configuration of a printing system to describe a third application of the invention.

The technique of the invention may be actualized by diversity of other embodiments. A third application of the invention is described with reference to FIG. 49. FIG. 49 schematically illustrates the general configuration of a printing system to describe the third application of the invention. The printing system of the third application includes a computer 10B as an image processing device and a printer 20B as an image output device. The computer 10B loads and executes a predetermined program to function, in combination with the printer 20B, as an integral image output system, in the same manner as the first application and the second application of the invention described above.

In the printing system of FIG. 49, the computer 10B collects every preset number of adjacent pixels in an object image to one pixel group and thereby divides the object image into multiple pixel groups. The computer 10B then generates dot number data representing the number of dots to be created in each pixel group and transmits the generated dot number data to the printer 20B. The dot number data supplied to the printer 20B is processed by a dot on-off state determination module and is converted to data representing the dot on-off state in each of the pixels included in each pixel group. A dot creation module provided in the printer 20B then actually creates dots on a printing medium according to the determined dot on-off state of the respective pixels, so as to complete a printed image.

The dot number data with regard to each pixel group has a significantly low data volume, compared with the dot state data representing the dot on-off state of individual pixels. The supply of the dot number data with regard to each pixel group, instead of the dot state data, from the computer 10B to the printer 20B thus ensures extremely high-speed data transfer.

The dot number data with regard to each pixel group is generated by the computer 10B. A pixel group tone value specification module specifies pixel group tone values of the multiple pixel groups as divisions of the object image. The pixel group tone value is a representative tone value of each pixel group and is specified according to image data of the respective pixels included in the pixel group. A first correlation map storage module stores a first correlation map that correlates dot number data of each pixel group to each combination of a pixel group classification number allocated to the pixel group and the specified pixel group tone value of the pixel group. The pixel group classification number may be allocated to each pixel group by classifying the pixel groups into plural different classes according to the positions of the respective pixel groups in the object image. In the case of fixed division of each object image into multiple pixel groups, an adequate pixel group classification number may be allocated in advance to each pixel group. A simpler technique may use random digits to allocate the pixel group classification numbers at random to the respective pixel groups. A dot number data supply module refers to the first correlation map to specify the dot number data of each pixel group corresponding to the combination of the pixel group classification number and the pixel group tone value of the pixel group, and supplies the specified dot number data to the printer 20B.

The pixel group tone value of each pixel group is readily specified. The pixel group classification number is also readily specified and allocated to each pixel group. The dot number data with regard to each pixel group is easily determined corresponding to the combination of the pixel group classification number and the pixel group tone value of the pixel group by simply referring to the stored first correlation map. The printing system of FIG. 49 accordingly achieves the high-speed generation of the dot number data with regard to each pixel group and the high-speed supply of the generated dot number data to the printer 20B.

The printer 20B receives the supplied dot number data and determines the dot on-off state with regard to the respective pixels included in each pixel group. The printer 20B uses an ordinal number storage module and a second correlation map storage module for this purpose. The ordinal number storage module stores ordinal numbers to be allocated to the respective pixels in one pixel group to show a priority order of dot creation in the pixel group. The second correlation map storage module stores a second correlation map of the combination of an ordinal number and dot number data with regard to each pixel to the dot on-off state of the pixel. The printer 20B receives the dot number data with regard to one pixel group, obtains an ordinal number of each pixel included in the pixel group, and refers to the second correlation map to determine the dot on-off state of each pixel corresponding to the combination of the dot number data and the ordinal number of the pixel. The use of this second correlation map enables high-speed conversion of the dot number data of each pixel group to determine the dot on-off state of the respective pixels included in the pixel group. Satisfaction of several conditions described later enables the appropriate determination of the dot on-off state in each pixel according to the dot number data, while keeping the high picture quality of a resulting printed image.

In the printing system of FIG. 49, the dot number data is supplied from the computer 10B to the printer 20B. This attains the high-speed data transfer of even an object image having a large number of pixels. The dot number data is readily and promptly generated by simply referring to the stored first correlation map. The printer 20B readily and promptly converts the received dot number data of each pixel group to the data representing the dot on-off state of the respective pixels in the pixel group by simply referring to the second correlation map. This attains the high-speed printing of even an object image having a large number of pixels. This function is sufficiently executable by a device of a relatively low throughput instead of a device of a high throughput like the computer 10B and thus enables the simple configuration of the printing system. The third application of the invention is attained by combining the image processing device (computer 10B) of the first application with the image output device (printer 20B) of the second application. The third application of the invention is described more in detail with reference to fifth and sixth embodiments.

H. Fifth Embodiment

The hardware structure of a printing system in a fifth embodiment is identical with those in the first through the fourth embodiments and is thus not specifically described here. The general flow of image printing process executed by the computer 100 and the color printer 200 for image printing in the fifth embodiment is basically identical with the image printing process of the third embodiment (see FIG. 35) and is thus not specifically described here.

H-1. Dot Number Data Generation Process of Fifth Embodiment

Figure 50:
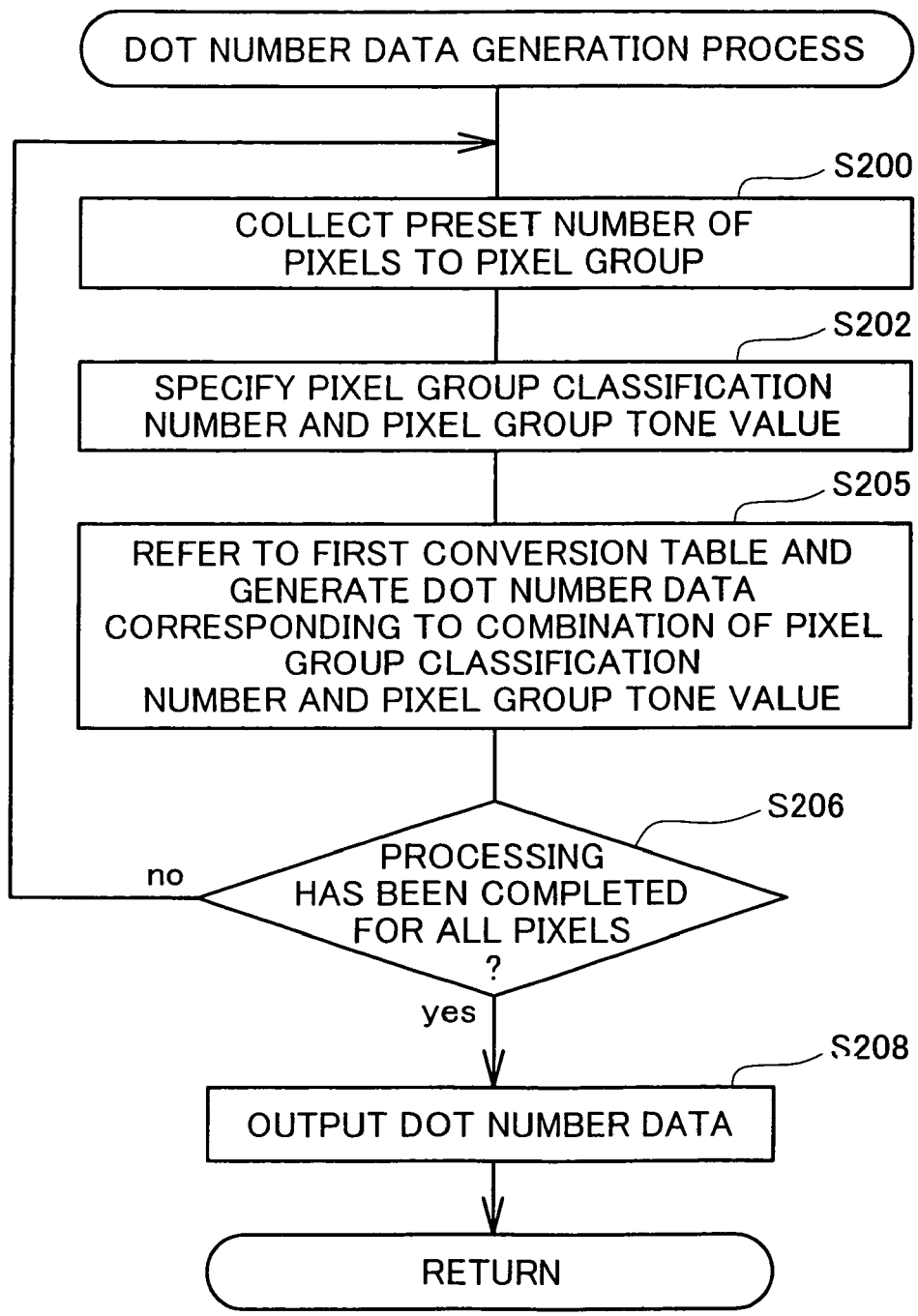
FIG. 50 is a flowchart showing the details of a dot number data generation process executed in a fifth embodiment.

The dot number data generation process of the fifth embodiment is executed to generate dot number data from image data at step S107 in the image printing process described previously as the third embodiment with reference to FIG. 35. FIG. 50 is a flowchart showing the details of the dot number generation process executed in the fifth embodiment. The following description regards the dot number data generation process executed by the computer 100. The dot number data generation process is, however, extremely simple as described later and is thus executable in the color printer 200 or in the digital camera 120. The dot number data generation process of the fifth embodiment is similar to the dot number generation process of the first embodiment (see FIG. 10) described as one example of the first application of the invention, except replacement of step S204 with step S205.

The dot number data generation process of the fifth embodiment first collects a preset number of adjacent pixels included in an object image to one pixel group (step S200), and specifies a pixel group classification number and a pixel group tone value of the pixel group (step S202). The concrete procedure of specifying the pixel group classification number and the pixel group tone value has been described previously in the first embodiment. The dot number data generation process refers to a first conversion table and generates dot number data corresponding to the combination of the specified pixel group classification number and the specified pixel group tone value (step S205). The first conversion table is identical with the conversion table of the first embodiment shown in FIG. 14. The first conversion table thus stores the dot number data correlated to each combination of the pixel group classification number and the pixel group tone value. Upon specification of the pixel group classification number and the pixel group tone value, the dot number data can readily be generated by simply referring to the first conversion table.

After generation of the dot number data with regard to the pixel group, the dot number data generation process determines whether the processing has been completed for all the pixels included in the object image (step S206). When there is still any unprocessed pixel (step S206: No), the dot number data generation process returns to step S200 to specify another pixel group and repeats the subsequent series of processing. When the processing has been completed for all the pixels included in the object image (step S206: Yes) through the repetition of this processing flow, the computer 100 outputs the dot number data generated with regard to the individual pixel groups to the color printer 200 (step S208) and terminates the dot number data generation process of the fifth embodiment shown in FIG. 50.

H-2. Dot on-Off State Determination Process of Fifth Embodiment

Figure 51:
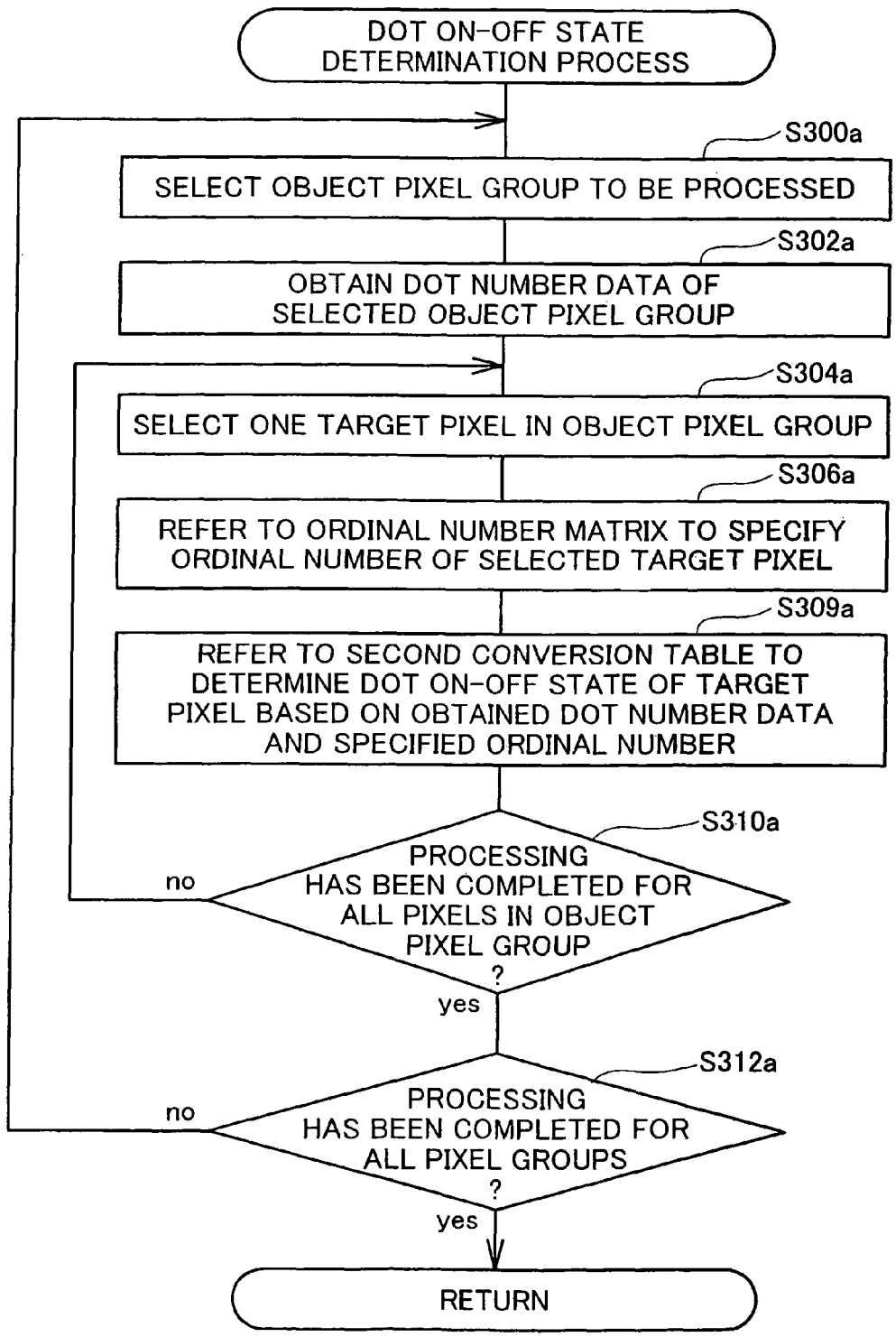
FIG. 51 is a flowchart showing the details of a dot on-off state determination process executed in the fifth embodiment.

The dot on-off state determination process of the fifth embodiment is executed to determine the dot on-off state in each of pixels included in each pixel group according to dot number data at step S109 in the image printing process of FIG. 35. FIG. 51 is a flowchart showing the details of the dot on-off state determination process executed in the fifth embodiment. This process is executed by the internal CPU of the control circuit 260 included in the color printer 200. The dot on-off state determination process of the fifth embodiment is similar to the dot on-off state determination process of the third embodiment (see FIG. 37) described as one example of the second application of the invention, except replacement of step S308a with step S309a. The concrete procedure of determining the dot on-off state of each pixel is described with reference to the conceptual view of FIG. 38.

The dot on-off state determination process of the fifth embodiment first selects one pixel group as an object to be processed (step S300a) and obtains the dot number data of the selected object pixel group (step S302a). The dot on-off state determination process then selects one target pixel as an object to be processed, among the respective pixels included in the selected object pixel group (step S304a) and specifies an ordinal number allocated to the selected target pixel, which shows the priority of dot creation in the target pixel in the object pixel group (step S306a). The ordinal number of the target pixel is readily specified by simply referring to the preset ordinal number matrix as shown in FIG. 38b.

After specification of the ordinal number of the selected target pixel, the dot on-off state determination process refers to a second conversion table to determine the dot on-off state of the selected target pixel (step S309a). The second conversion table referred to for determination of the dot on-off state in each target pixel is identical with the conversion table of the third embodiment shown in FIG. 39. While the first conversion table stores the dot number data correlated to each combination of the pixel group classification number and the pixel group tone value (see FIG. 14), the second conversion table sets the dot on-off state corresponding to each combination of the ordinal number and the dot number data (see FIG. 39). Since each pixel group consists of 8 pixels, there are 8 ordinal numbers from 1 to 8 and the dot number data varies in the range of 0 to 8. The second conversion table accordingly sets the dot on-off state corresponding to each of the 72 possible combinations.

In the illustrated example of FIG. 38, the object pixel group has the dot number data '3' as shown in FIG. 38a, and the pixel of the upper left corner in the pixel group has the ordinal number '1' as shown in FIG. 38b. The second conversion table (FIG. 39) gives the value '1' corresponding to the combination of the ordinal number '1' and the dot number data '3'. Namely this pixel is specified as the dot-on pixel. In this manner, the procedure of step S309a in the flowchart of FIG. 51 refers to the second conversion table and readily specifies the selected target pixel as either the dot-on pixel or the dot-off pixel, based on the dot number data of the object pixel group and the ordinal number of the target pixel.

After specification of the selected target pixel as either the dot-on pixel or the dot-off pixel, the dot on-off state determination process determines whether the processing has been completed for all the pixels included in the object pixel group (step S310a). When there is still any unprocessed pixel in the object pixel group (step S310a: No), the dot on-off state determination process returns to step S304a to select another pixel as a next target pixel in the object pixel group and repeats the processing of and after step S304a to determine the dot on-off state of the next target pixel.

When the processing has been completed to determine the dot on-off state with regard to all the pixels included in the object pixel group (step S310a: Yes), the dot on-off state determination process subsequently determines whether the processing has been completed for all the pixel groups supplied with the generated dot number data (step S312a). When there is still any unprocessed pixel group (step S312a: No), the dot on-off state determination process returns to step S300a to select another pixel group as a next object pixel group and repeats the subsequent series of processing. Repetition of this series of processing fully converts the dot number data supplied from the computer 100 into dot state data representing the dot on-off state of the individual pixels. On completion of the processing with regard to all the pixel groups (step S312a: yes), the processing flow exits from this dot on-off state determination process of FIG. 51 and goes back to the image printing process.

The image printing process of the fifth embodiment includes the dot number data generation process (FIG. 50) and the dot on-off state determination process (FIG. 51) described above. The dot number data generation process of the fifth embodiment collects a preset number of adjacent pixels to one pixel group, specifies the pixel group classification number and the pixel group tone value of the pixel group, and generates the dot number data. Both the pixel group classification number and the pixel group tone value are specified very easily as described above. Upon specification of the pixel group classification number and the pixel group tone value, the dot number data is generated very easily by simply referring to the first conversion table. The dot number data has a significantly lower data volume than the conventional dot state data representing the dot on-off state of individual pixels. This enables high-speed data transfer from the computer 100 to the color printer 200. The dot number data generation process of the fifth embodiment thus ensures high-speed generation and output of the dot number data.

The dot on-off state determination process of the fifth embodiment receives dot number data of an object pixel group promptly supplied from the computer 100, refers to the ordinal number matrix to specify an ordinal number of each target pixel included in the object pixel group, and refers to the second conversion table to determine the dot on-off state of the target pixel corresponding to the combination of the received dot number data and the specified ordinal number. The dot on-off state of each pixel is thus readily determinable by simply referring to the ordinal number matrix and the second conversion table.

The dot number data generation process of the fifth embodiment simply refers to the first conversion table to generate the dot number data corresponding to the readily specified pixel group classification number and pixel group tone value. The dot on-off state determination process of the fifth embodiment also simply refers to the ordinal number matrix and the second conversion table to determine the dot on-off state of the individual pixels according to the dot number data. Neither of these processes essentially requires a device of a high throughput, such as the computer 100, but is executable at a sufficiently practical speed even by a device of a relatively low throughput.

In the image printing process of the fifth embodiment, the essential part of the processing simply refers to the data stored in the matrixes and the tables. Either of the dot number data generation process and the dot on-off state determination process of the fifth embodiment may thus be actualized by a hardware element, for example, an IC chip with an exclusive logic circuit, instead of as the software configuration by the CPU. The hardware-based execution of the dot number data generation process or the dot on-off state determination process enables the higher-speed processing and thus ensures the higher-speed image printing. Another advantage of this embodiment is the less conditional branching, which is effectively combined with the latest pipelining technique adopted in the computer to enhance the processing speed, as described previously.

The dot number data generation process and the dot on-off state determination process of the fifth embodiment have the various advantages for the high-speed processing as described above. Such advantages enable the high-speed image data processing and the high-speed image printing under various conditions.

H-3. Modifications

The modified arrangement of the first embodiment described in 'B-7. Modifications' (see FIGS. 18 through 20)

may be adopted in the image printing process of the fifth embodiment. The image printing process of the fifth embodiment may be combined with any of various arrangements in the first application of the invention, as well as with any of various arrangements in the second application of the invention (for example, see FIGS. 37 through 39).

I. Sixth Embodiment

In the system of the fifth embodiment or its modified example described above, the color printer 200 is capable of creating only one type of dots. The third application of the invention is also adoptable in multivalued dot printers that create multiple different types of dots. The third application of the invention executed by a multivalued dot printer is described below as a sixth embodiment. The image printing process of the fifth embodiment creates only one type of dots for image printing. The computer 100 refers to the first conversion table to directly obtain the dot number data, and the printer 200 refers to the second conversion table to directly determine the dot on-off state of each target pixel corresponding to the combination of the dot number data and the ordinal number. The image printing process of the sixth embodiment creates multiple different types of dots for image printing. The dot number data generated in the sixth embodiment is encoded for the high-speed data transfer.

The general flow of the image printing process of the sixth embodiment follows the flowchart of FIG. 35, like the fifth embodiment. The outline of the image printing process of the sixth embodiment is briefly described with reference to the flowchart of FIG. 35.

In the image printing process of the sixth embodiment, the computer 100 receives image data (step S100 in FIG. 35), performs the color conversion process (step S102), performs the resolution conversion process to convert the resolution of image data into the printing resolution (step S104), and starts the dot number data generation process (step S107). The dot number data generated by the dot number data generation process (step S107) is output to the printer 200. The printer 200 then executes the dot on-off state determination process (step S109) and actually creates dots according to the determination result (step S110).

In the image printing process of the sixth embodiment, the dot number data generation process (step S107) generates the dot number data with regard to the large-size dot, the medium-size dot, and the small-size dot and encodes the generated dot number data. As mentioned above, in the system of the fifth embodiment, the color printer 200 is capable of creating only one type of dots. The dot number data generation process of the fifth embodiment generates dot number data representing the number of dots to be created in each pixel group with regard to the one type of dots and outputs the generated dot number data to the color printer 200. In the system of the sixth embodiment, on the other hand, the color printer 200 is capable of creating multiple different types of dots, for example, three variable size dots, that is, large-size dot, medium-size dot, and small-size dot. The dot number data generation process of the sixth embodiment accordingly generates dot number data representing the numbers of large-size dots, medium-size dots, and small-size dots to be created in each pixel group. For the efficient transmission of the dot number data, the data representing the numbers of large-size dots, medium-size dots, and small-size dots is not directly output but is encoded for reduction of the data volume. The encoding technique has been described previously in the first embodiment with reference to FIGS. 21 through 26 and is thus not specifically described here. In one available dot number data generation process, the computer 100 first specifies the numbers of large-size dots, medium-size dots, and small-size dots to be created in each pixel group by the dither technique (see FIGS. 21 through 25) and then refers to the conversion table (see FIG. 26) to encode the combination of the specified numbers of the respective size dots. Namely this dot number data generation process adopts the two-step processing to generate encoded dot number data.

This two-step dot number data generation process specifies the numbers of large-size dots, medium-size dots, and small-size dots to be created in each pixel group by the dither technique, encodes the combination of the specified numbers of the respective size dots to generate encoded dot number data, and supplies the encoded dot number data to the printer 200. The dot number data generation process of the sixth embodiment, on the other hand, uses a first conversion table to directly convert the image data of each pixel group to encoded dot number data and outputs the encoded dot number data to the color printer 200. This arrangement facilitates and accelerates generation of encoded dot number data. The dot number data generation process of the sixth embodiment does not require a device of a high throughput such as a computer but is executable at a sufficiently practical speed even by a device of a relatively low throughput.

The dot number data generation process of the sixth embodiment may follow the processing flow of FIG. 27 with some modification. The dot number data generation process of the sixth embodiment specifies a pixel group classification number and a pixel group tone value (step S702 in FIG. 27) and refers to a first conversion table to directly obtain encoded dot number data corresponding to the combination of the specified pixel group classification number and the specified pixel group tone value (step S704). The concrete procedure of specifying the pixel group classification number and the pixel group tone value has been described previously and is not specifically described here.

The first conversion table referred to in the dot number data generation process of the sixth embodiment is identical with the conversion table of FIG. 28. The first conversion table stores encoded dot number data correlated to each combination of the pixel group classification number and the pixel group tone value. The dot number data generation process of the sixth embodiment readily (at one step) generates the encoded dot number data corresponding to the combination of the specified pixel group classification number and the specified pixel group tone value by simply referring to the first conversion table.

The color printer 200 executes the dot on-off state determination process of the sixth embodiment that receives the encoded dot number data and determines the dot on-off state of each pixel with regard to the large-size dot, the medium-size dot, and the small-size dot. The dot on-off state determination process of the fifth embodiment refers to the second conversion table to directly determine the dot on-off state of each pixel corresponding to the combination of the dot number data and the ordinal number. The dot on-off state determination process of the sixth embodiment similarly refers to a second conversion table to directly determine the dot on-off state of each pixel with regard to the large-size dot, the medium-size dot, and the small-size dot corresponding to the combination of the encoded dot number data and the ordinal number. The availability of this simple and high-speed processing has been described in detail previously in the fourth embodiment with reference to FIGS. 46 through 48 and is thus not specifically explained here. The second conversion table referred to in the dot on-off state determination process of the sixth embodiment is identical with the conversion table of FIG. 47.

The principle of determining the dot on-off state with reference to the second conversion table as shown in FIG. 47 is described briefly. As shown in FIG. 30, each encoded dot number data is correlated to one combination of the numbers of large-size dots, medium-size dots, and small-size dots. Namely one given encoded dot number data unequivocally specifies one combination of the numbers of the respective size dots.

After decoding to the combination of the numbers of the respective size dots to be created in each pixel group, the dot on-off state in each of the pixels included in the pixel group is determined according to the ordinal number matrix allocated to the pixel group as shown in FIG. 31. The dot on-off state of each pixel thus one-to-one corresponds to the combination of the ordinal number matrix with the specified numbers of the respective size dots. As mentioned above, the encoded dot number data unequivocally specifies the combination of the numbers of the respective size dots. Namely the combination of an ordinal number matrix allocated to each pixel group with encoded dot number data of the pixel group unequivocally determines the dot on-off state of the large-size dot, the medium-size dot, and the small-size dot in each of the pixels included in the pixel group.

The image printing process of the sixth embodiment includes the dot number data generation process and the dot on-off state determination process described above. The dot number data generation process of the sixth embodiment directly generates the encoded dot number data corresponding to the combination of the specified pixel group classification number and the specified pixel group tone value by simply referring to the first conversion table. This arrangement ensures extremely high-speed generation of encoded dot number data. The dot on-off state determination process of the sixth embodiment receives the encoded dot number data of each pixel group, refers to the ordinal number matrix allocated to the pixel group to obtain the ordinal number of each target pixel included in the pixel group, and refers to the second conversion table to directly determine the dot on-off state of the target pixel with regard to the respective size dots corresponding to the combination of the encoded dot number data and the ordinal number. This arrangement promptly and readily determines the dot on-off state of each pixel with regard to the large-size dot, the medium-size dot, and the small-size dot without decoding the encoded dot number data, thus enabling the high-speed image output.

The dot number data generation process and the dot on-off state determination process of the sixth embodiment are significantly simplified and executable at extremely high speed. Such advantages are explained briefly.

The dot number data generation process without using the first conversion table adopts the dither technique to specify the numbers of the respective size dots to be created in each pixel group and then encodes the combination of the specified numbers of the respective size dots. The dot number data generation process with using the first conversion table, on the other hand, achieves the same processing results by the significantly simpler processing flow as shown in FIG. 27.

The dot number data generation process with the first conversion table has less conditional branching, which is effectively combined with the latest pipelining technique adopted in the high-performance computer to enhance the processing speed, like the first application and the second application of the invention.

The dot on-off state determination process without using the second conversion table sequentially determines the dot on-off state of each pixel with regard to the large size dot, the medium-size dot, and the small-size dot. The dot on-off state determination process with using the second conversion table, on the other hand, immediately specifies the dot on-off state of each pixel among the four possible options, that is, creation of the large-size dot, creation of the medium-size dot, creation of the small-size dot, and creation of no dot by simply referring to the second conversion table only once.

The conventional processing flow of the dot on-off state determination process has frequent conditional branching in the course of sequential determination of the dot on-off state with regard to the large-size dot, the medium-size dot, and the small-size dot. The dot on-off state determination process with the second conversion table has less conditional branching and is effectively combined with the pipelining technique to enhance the processing speed, like the dot number data generation process with the first conversion table.

Neither the first conversion table nor the second conversion table used in the image printing process of the sixth embodiment occupies a large memory capacity as described in the first application of the invention (see FIG. 33) and the second application of the invention (see FIG. 48). Both the first conversion table and the second conversion table require a relatively small memory capacity to be storable even in a cache memory of the general computer. The first conversion table and the second conversion table may be stored in a memory of an imaging device such as the digital camera 120 or an image output device such as the color printer 200.

The embodiments and their modified examples discussed above are to be considered in all aspects as illustrative and not restrictive. There may be many modifications, changes, and alterations without departing from the scope or spirit of the main characteristics of the present invention. For example, the embodiments regard the image printing device that creates dots on printing paper to give a printed image. The technique of the invention is, however, not restricted to such image printing devices but is also applicable to diversity of other image-relating devices, for example, to liquid crystal display devices that disperse bright points at an appropriate density on a liquid crystal screen to express an image of continuously varying tone.

In the dot number data generation process by the dither technique, the dot distribution is arbitrarily adjustable by appropriately designing a dither matrix. For example, application of either a dither matrix with a blue noise mask characteristic or a dither matrix with a green noise mask characteristic gives an image of the characteristic-dependent dot distribution, regardless of the image data processing in the units of pixel groups.

Figure 52:
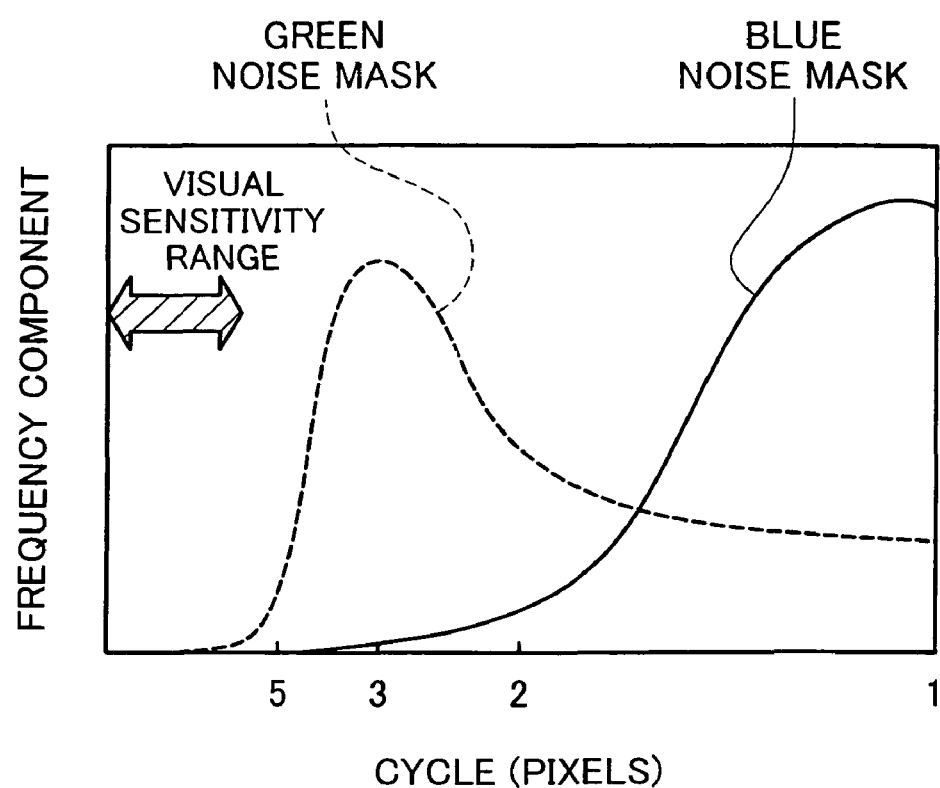
FIG. 52 conceptually shows spatial frequency characteristics of threshold values set in a dither matrix with a blue noise mask characteristic and in a dither matrix with a green noise mask characteristic.

FIG. 52 conceptually shows spatial frequency characteristics of threshold values set in the dither matrix with the blue noise mask characteristic and in the dither matrix with the green noise mask characteristic. For the convenience of illustration, the abscissa in the graph of FIG. 52 represents the cycle in place of the spatial frequency. As is generally known, the shorter cycle leads to the higher spatial frequency. The ordinate in the graph of FIG. 52 represents a variation in spatial frequency component against the varying cycle. The spatial frequency component is smoothed to have a smooth variation in the graph of FIG. 52.

The solid-line curve conceptually shows a variation in spatial frequency component of the blue noise mask. The blue noise mask has a peak of the spatial frequency component in a high frequency domain having one cycle length of not greater than 2 pixels. The threshold values of the blue noise mask are set to have such a spatial frequency characteristic. Determination of the dot on-off state based on the blue noise mask thus tends to create dots in an individually dispersed arrangement. The broken-line curve conceptually shows a variation in spatial frequency component of the green noise mask. The green noise mask has a peak of the spatial frequency component in a middle frequency domain having one cycle length of 2 pixels to ten-odd pixels. The threshold values of the green noise mask are set to have such a spatial frequency characteristic. Determination of the dot on-off state based on the green noise mask thus tends to create dot blocks in a mutually dispersed arrangement, where each dot block consists of several dots adjacent and close to one another.

Generation of the dot number data of each pixel group and specification of the dot-on pixels in the pixel group according to either the dither matrix with the blue noise mask characteristic or the dither matrix with the green noise mask characteristic enables dot creation having a dot distribution reflecting the blue noise mask characteristic or the green noise mask characteristic, regardless of the image data processing in the units of pixel groups.

In the second application and the third application of the invention, multiple ordinal number matrixes are prepared in advance according to a dither matrix and are stored in relation to individual pixel groups. In these second and third applications of the invention, the dot on-off state determination process receives the dot number data of each pixel group and refers to an ordinal number matrix allocated to the pixel group to determine the dot on-off state of each pixel. One simpler procedure of the dot on-off state determination process may receive dot number data of each pixel group and refer to one ordinal number matrix selected at random for the pixel group among multiple ordinal number matrixes stored in advance to determine the dot on-off state of each pixel. A simplest procedure may use one identical ordinal number matrix for any pixel group to determine the dot on-off state of each pixel.

The invention claimed is:

1. An image output system comprising an image processing device that makes image data subjected to a preset series of image processing and an image output device that creates dots according to a result of the preset series of image processing to form an output image on an output medium,
said image processing device comprising:
a dot number data generation module that divides a number of pixels constituting the image into multiple pixel groups, where each pixel group consists of a preset number of plural pixels, and generates dot number data of each pixel group, which represents number of dots to be created in each pixel group, according to the image data; and
a dot number data supply module that supplies the generated dot number data of each pixel group to said image output device,
said image output device comprising:
an ordinal number acquisition module that obtains ordinal numbers of respective pixels included in each pixel group as a priority order of dot creation in the pixel group;
a correlation map storage module that stores a correlation map correlating each combination of an ordinal number and a value of the dot number data to a dot on-off state in a pixel having the ordinal number;
a dot on-off state determination module that refers to the correlation map to read a dot on-off state corresponding to the received dot number data of each pixel group and the ordinal number of each pixel included in the pixel group and determines the dot on-off state in the pixel of the pixel group; and
a dot creation module that actually creates dots on the output medium according to a determination result of the dot on-off state in the number of pixels.

2. An image output system in accordance with claim 1, wherein said image output device further comprises a priority order storage module that stores multiple different priority orders of dot-on pixels in one pixel group,
said ordinal number acquisition module obtaining the ordinal number of each pixel included in each pixel group, based on one priority order selected among the multiple different priority orders,
said dot on-off state determination module using the obtained ordinal number of each pixel included in each pixel group to determine the dot on-off state in the pixel of the pixel group.

3. An image output system in accordance with claim 2, wherein said dot number data generation module generates the dot number data of each pixel group, based on a dither matrix that correlates threshold values to individual pixels in a two-dimensional arrangement, and
said priority order storage module divides the dither matrix used for generation of the dot number data into multiple blocks corresponding to the multiple pixel groups, specifies an order of pixels in each pixel group based on a magnitude relation of threshold values in a block corresponding to the pixel group, and stores the specified order of pixels as one of the multiple different priority orders of dot-on pixels.

4. An image output device that receives image data after a preset series of image processing and creates dots on an output medium according to the received image data to form an output image,
said image output device comprising:
a dot number data receiving module that receives dot number data of each pixel group, which represents number of pixels to be created in the pixel group, as the image data, where the pixel group is provided by collecting a preset number of plural pixels among a number of pixels constituting the image;
an ordinal number acquisition module that obtains ordinal numbers of respective pixels included in each pixel group as a priority order of dot creation in the pixel group;
a correlation map storage module that stores a correlation map correlating each combination of an ordinal number and a value of the dot number data to a dot on-off state in a pixel having the ordinal number;
a dot on-off state determination module that refers to the correlation map to read a dot on-off state corresponding to the received dot number data of each pixel group and the ordinal number of each pixel included in the pixel group and determines the dot on-off state in the pixel of the pixel group; and
a dot creation module that actually creates dots on the output medium according to a determination result of the dot on-off state in the number of pixels.

5. An image output device in accordance with claim 4, said image output device further comprising:
a priority order storage module that stores multiple different priority orders of dot-on pixels in one pixel group,
wherein said ordinal number acquisition module obtains the ordinal number of each pixel included in each pixel group, based on one priority order selected among the multiple different priority orders, and said dot on-off state determination module uses the obtained ordinal number of each pixel included in each pixel group to determine the dot on-off state in the pixel of the pixel group.

6. An image output device in accordance with claim 4, wherein said dot number data receiving module receives the dot number data of each pixel group, which represents numbers of multiple different types of dots having different expressing tone values to be created in the pixel group, said correlation map storage module stores the correlation map correlating each combination of an ordinal number and a value of the dot number data to a dot on-off state including a dot type to be created in a pixel having the ordinal number, said dot on-off state determination module determines the dot on-off state in each pixel included in each pixel group with regard to each of the multiple different types of dots, and said dot creation module actually creates the multiple different types of dots on the output medium according to a determination result of the dot on-off state including the dot type to be created in the number of pixels.

7. An image output device in accordance with claim 4, wherein said dot number data receiving module receives the dot number data of each pixel group, which consists of 8 to 16 pixels in a preset positional relation.

8. An image processing output device that makes image data subjected to a preset series of image processing and creates dots on an output medium according to the processed image data to form an output image, said image processing output device comprising:

a dot number data generation module that divides a number of pixels constituting the image into multiple pixel groups, where each pixel group consists of a preset number of plural pixels, and generates dot number data of each pixel group, which represents number of dots to be created in each pixel group, according to the image data;

an ordinal number acquisition module that obtains ordinal numbers of respective pixels included in each pixel group as a priority order of dot creation in the pixel group;

a correlation map storage module that stores a correlation map correlating each combination of an ordinal number and a value of the dot number data to a dot on-off state in a pixel having the ordinal number;

a dot on-off state determination module that refers to the correlation map to read a dot on-off state corresponding to the generated dot number data of each pixel group and the ordinal number of each pixel included in the pixel group and determines the dot on-off state in the pixel of the pixel group; and a dot creation module that actually creates dots on the output medium according to a determination result of the dot on-off state in the number of pixels.

9. An image processing output method that makes image data subjected to a preset series of image processing and creates dots on an output medium according to the processed image data to form an output image, said image processing output method comprising:

a first step of dividing a number of pixels constituting the image into multiple pixel groups, where each pixel group consists of a preset number of plural pixels, and generating dot number data of each pixel group, which represents number of dots to be created in each pixel group, according to the image data;

a second step of obtaining ordinal numbers of respective pixels included in each pixel group as a priority order of dot creation in the pixel group;

a third step of storing a correlation map correlating each combination of an ordinal number and a value of the dot number data to a dot on-off state in a pixel having the ordinal number;

a fourth step of referring to the correlation map to read a dot on-off state corresponding to the generated dot number data of each pixel group and the ordinal number of each pixel included in the pixel group and determining the dot on-off state in the pixel of the pixel group; and a fifth step of actually creating dots on the output medium according to a determination result of the dot on-off state in the number of pixels.

10. An image output method that receives image data after a preset series of image processing and creates dots on an output medium according to the received image data to form an output image, said image output method comprising:

a step (A) of receiving dot number data of each pixel group, which represents number of pixels to be created in the pixel group, as the image data, where the pixel group is provided by collecting a preset number of plural pixels among a number of pixels constituting the image;

a step (B) of obtaining ordinal numbers of respective pixels included in each pixel group as a priority order of dot creation in the pixel group;

a step (C) of storing a correlation map correlating each combination of an ordinal number and a value of the dot number data to a dot on-off state in a pixel having the ordinal number;

a step (D) of referring to the correlation map to read a dot on-off state corresponding to the received dot number data of each pixel group and the ordinal number of each pixel included in the pixel group and determining the dot on-off state in the pixel of the pixel group; and a step (E) of actually creating dots on the output medium according to a determination result of the dot on-off state in the number of pixels.

11. A computer program product comprising a non-transitory computer-readable medium and a program stored therein, said program being executed by a computer to actualize an image processing output method that makes image data subjected to a preset series of image processing and creates dots on an output medium according to the processed image data to form an output image, said program causing the computer to attain:

a first function of dividing a number of pixels constituting the image into multiple pixel groups, where each pixel group consists of a preset number of plural pixels, and generating dot number data of each pixel group, which represents number of dots to be created in each pixel group, according to the image data;

a second function of obtaining ordinal numbers of respective pixels included in each pixel group as a priority order of dot creation in the pixel group;

a third function of storing a correlation map correlating each combination of an ordinal number and a value of the dot number data to a dot on-off state in a pixel having the ordinal number;

a fourth function of referring to the correlation map to read a dot on-off state corresponding to the generated dot number data of each pixel group and the ordinal number of each pixel included in the pixel group and determining the dot on-off state in the pixel of the pixel group; and a fifth function of actually creating dots on the output medium according to a determination result of the dot on-off state in the number of pixels.

12. A computer program product comprising a non-transitory computer-readable medium and a program stored therein, said program being executed by a computer to actualize an image output method that receives image data after a preset series of image processing and creates dots on an output medium according to the received image data to form an output image, said program causing the computer to attain:

a function (A) of receiving dot number data of each pixel group, which represents number of pixels to be created in the pixel group, as the image data, where the pixel group is provided by collecting a preset number of plural pixels among a number of pixels constituting the image;

a function (B) of obtaining ordinal numbers of respective pixels included in each pixel group as a priority order of dot creation in the pixel group;

a function (C) of storing a correlation map correlating each combination of an ordinal number and a value of the dot number data to a dot on-off state in a pixel having the ordinal number;

a function (D) of referring to the correlation map to read a dot on-off state corresponding to the received dot number data of each pixel group and the ordinal number of each pixel included in the pixel group and determining the dot on-off state in the pixel of the pixel group; and a function (E) of actually creating dots on the output medium according to a determination result of the dot on-off state in the number of pixels.

* * * * *